US009928417B2

(12) United States Patent
Motoyama et al.

(10) Patent No.: US 9,928,417 B2
(45) Date of Patent: Mar. 27, 2018

(54) IMAGING PROCESS FOR BINARIZATION AND PUNCHED HOLE EXTRACTION

(71) Applicant: BROTHER KOGYO KABUSHIKI KAISHA, Aichi-ken (JP)

(72) Inventors: Toshiki Motoyama, Konan (JP); Tomohiko Hasegawa, Okazaki (JP); Akidi Yoshida, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/075,426

(22) Filed: Mar. 21, 2016

(65) Prior Publication Data
US 2016/0292503 A1    Oct. 6, 2016

(30) Foreign Application Priority Data

Mar. 31, 2015    (JP) ................. 2015-074552

(51) Int. Cl.
*G06K 9/00*    (2006.01)
*G06T 7/60*    (2017.01)
(Continued)

(52) U.S. Cl.
CPC ....... *G06K 9/00442* (2013.01); *G06K 9/4604* (2013.01); *G06T 5/00* (2013.01);
(Continued)

(58) Field of Classification Search
CPC . G06T 2207/20192; G06T 7/11; G06T 7/136; G06T 7/194; G06T 7/60;
(Continued)

(56) References Cited

U.S. PATENT DOCUMENTS 4,995,091 A  *  2/1991  Shimbara ............ B07C 5/3422
                                                    382/272
5,448,376 A     9/1995  Ohta
                        (Continued)

FOREIGN PATENT DOCUMENTS

JP       3170299 B2    5/2001
JP    2004-080341 A    3/2004
                (Continued)

OTHER PUBLICATIONS

U.S. Appl. No. 15/075,692, filed Mar. 21, 2016.
(Continued)

*Primary Examiner* — Kenny Cese
(74) *Attorney, Agent, or Firm* — Scully, Scott, Murphy & Presser, PC

(57) ABSTRACT

A first image data, binarized with a first threshold, represent a first image corresponding to a first portion of a specific image. A second image data, binarized with a second threshold different from the first threshold, represent a second image corresponding to a second portion of the specific image. A first area, which is extracted from the first image, includes pixels with a first color. The first color corresponding to a color of an outline of a hole image in the specific image. A second area, which is extracted from the second image, includes pixels with the first color. The first area and the second area are determined as a specific area corresponding to the hole image.

11 Claims, 44 Drawing Sheets

(51) Int. Cl.
  *G06K 9/46* (2006.01)
  *G06T 5/00* (2006.01)
  *G06T 7/73* (2017.01)
  *G06T 7/13* (2017.01)
  *G06T 7/90* (2017.01)

(52) U.S. Cl.
  CPC ............... *G06T 7/13* (2017.01); *G06T 7/60* (2013.01); *G06T 7/73* (2017.01); *G06T 7/90* (2017.01); *G06T 2207/20024* (2013.01); *G06T 2207/20192* (2013.01); *G06T 2207/30176* (2013.01)

(58) Field of Classification Search
  CPC .... G06T 5/00; G06T 7/73; G06T 7/13; G06T 7/90; G06K 9/4604; G06K 9/00442
  See application file for complete search history.

(56) References Cited

U.S. PATENT DOCUMENTS

| | | | |
|---|---|---|---|
| 6,594,401 | B1 | 7/2003 | Metcalfe et al. |
| 6,674,900 | B1 * | 1/2004 | Ma ..................... G06K 9/00469 382/176 |
| 6,944,355 | B2 | 9/2005 | Lupien, Jr. et al. |
| 7,319,542 | B2 | 1/2008 | Sievert et al. |
| 7,352,490 | B1 | 4/2008 | Tse et al. |
| 7,746,509 | B2 | 6/2010 | Rogalski, Jr. et al. |
| 8,494,304 | B2 | 7/2013 | Venable et al. |
| 8,705,887 | B2 | 4/2014 | Ma et al. |
| 8,824,822 | B2 | 9/2014 | Lei et al. |
| 8,970,920 | B2 | 3/2015 | Nakamura |
| 9,197,762 | B2 | 11/2015 | Matsui |
| 2010/0302367 | A1 * | 12/2010 | Hsu ........................... G06T 7/20 348/143 |
| 2011/0063456 | A1 * | 3/2011 | Ohnishi ................ G06T 7/0002 348/207.2 |
| 2013/0229695 | A1 * | 9/2013 | Lei ........................... H04N 1/38 358/448 |
| 2015/0002911 | A1 | 1/2015 | Matsui |
| 2015/0215493 | A1 * | 7/2015 | Du ....................... H04N 1/4095 358/453 |

FOREIGN PATENT DOCUMENTS

| | | |
|---|---|---|
| JP | 2006-244083 A | 9/2006 |
| JP | 2007-228032 A | 9/2007 |
| JP | 2015-012432 A | 1/2015 |

OTHER PUBLICATIONS

U.S. Appl. No. 15/075,832, filed Mar. 21, 2016.
Official Action dated Apr. 26, 2017 in a related application, namely, U.S. Appl. No. 15/075,692.
Official Action dated Sep. 29, 2017 from related application, namely, U.S. Appl. No. 15/075,692.
Official Action dated Aug. 25, 2017 in a related application, namely, U.S. Appl. No. 15/075,832.

* cited by examiner

FIG. 2

| ATTRIBUTION INFORMATION | | ~241 |
|---|---|---|
| ORIGINAL IMAGE HEIGHT (pixel) | Img(H) |
| ORIGINAL IMAGE WIDTH (pixel) | Img(W) |
| RESOLUTION (dpi) | Img(R) |
| COLOR (GRAYSCALE OR COLOR) | Img(C) |

| SETTING INFORMATION | | |
|---|---|---|
| RANGE | LEFT SPECIFIED RANGE (mm) | Str(left) |
| | RIGHT SPECIFIED RANGE (mm) | Str(right) |
| | UPPER SPECIFIED RANGE (mm) | Str(upper) |
| | LOWER SPECIFIED RANGE (mm) | Str(lower) |
| HOLE SIZE | MAXIMUM HOLE SIZE (mm) | Hsz(max) |
| | MINIMUM HOLE SIZE (mm) | Hsz(min) |
| BACKGROUND | BACKGROUND COLOR (GRAY OR COLOR) | Bkg(c) |
| | MAXIMUM BACKGROUND COLOR LUMINANCE | Bkg(max) |
| | MINIMUM BACKGROUND COLOR LUMINANCE | Bkg(min) |
| FILLING | FILLING AREA SHAPE (QUADRANGLE OR ACCORDING TO SHAPE OF PUNCHED-HOLE IMAGE) | Rem(met) |
| | FILLING COLOR | Rem(c) |

FIG. 4

| | PROCESSING-TARGET RANGE INFORMATION | | ~243 |
|---|---|---|---|
| LEFT | LEFT PROCESSING-TARGET RANGE (mm) | Prg(left) | |
| | LEFT EXTENDED RANGE (mm) | Prg(ex-left) | |
| RIGHT | RIGHT PROCESSING-TARGET RANGE (mm) | Prg(right) | |
| | RIGHT EXTENDED RANGE (mm) | Prg(ex-right) | |
| UPPER | UPPER PROCESSING-TARGET RANGE (mm) | Prg(upper) | |
| | UPPER EXTENDED RANGE (mm) | Prg(ex-upper) | |
| | UPPER WIDTH RANGE (LEFT) (mm) | Prg(wupper(l)) | |
| | UPPER WIDTH RANGE (RIGHT) (mm) | Prg(wupper(r)) | |
| | UPPER WIDTH EXTENDED RANGE (LEFT) (mm) | Prg(re-wupper(l)) | |
| | UPPER WIDTH EXTENDED RANGE (RIGHT) (mm) | Prg(re-wupper(r)) | |
| LOWER | LOWER PROCESSING-TARGET RANGE (mm) | Prg(lower) | |
| | LOWER EXTENDED RANGE (mm) | Prg(ex-lower) | |
| | LOWER WIDTH RANGE (LEFT) (mm) | Prg(wlower(l)) | |
| | LOWER WIDTH RANGE (RIGHT) (mm) | Prg(wlower(r)) | |
| | LOWER WIDTH EXTENDED RANGE (LEFT) (mm) | Prg(re-wlower(l)) | |
| | LOWER WIDTH EXTENDED RANGE (RIGHT) (mm) | Prg(re-wlower(r)) | |

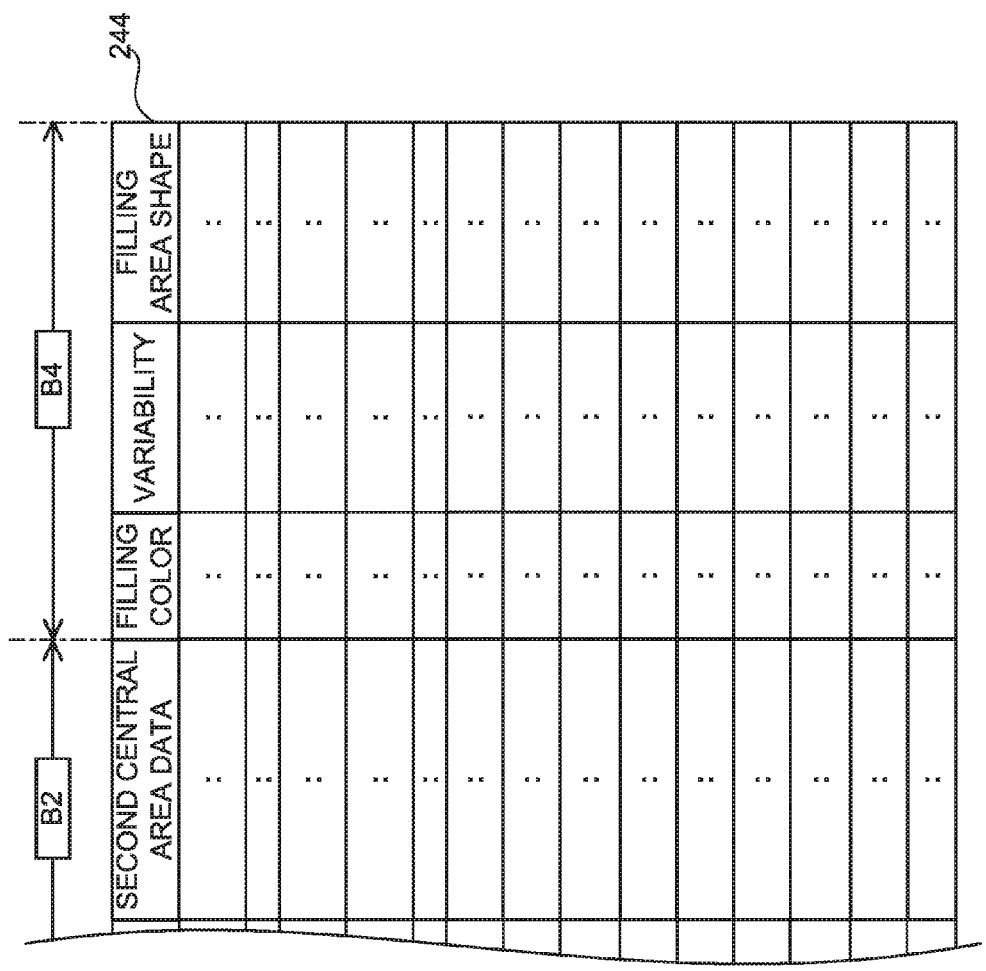

FIG. 19
| No | ARRANGEMENT PATTERN | HOLE ORIENTATION | No | ARRANGEMENT PATTERN | HOLE ORIENTATION |
|---|---|---|---|---|---|
| 1 |  | CENTER | 6 |  | LEFT |
| 2 |  | RIGHT | 7 | 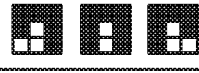 | LOWER-LEFT |
| 3 |  | UPPER-RIGHT | 8 |  | LOWER |
| 4 |  | UPPER | 9 |  | LOWER-RIGHT |
| 5 |  | UPPER-LEFT | 10 | OTHERS | OTHERS |

FIG. 21

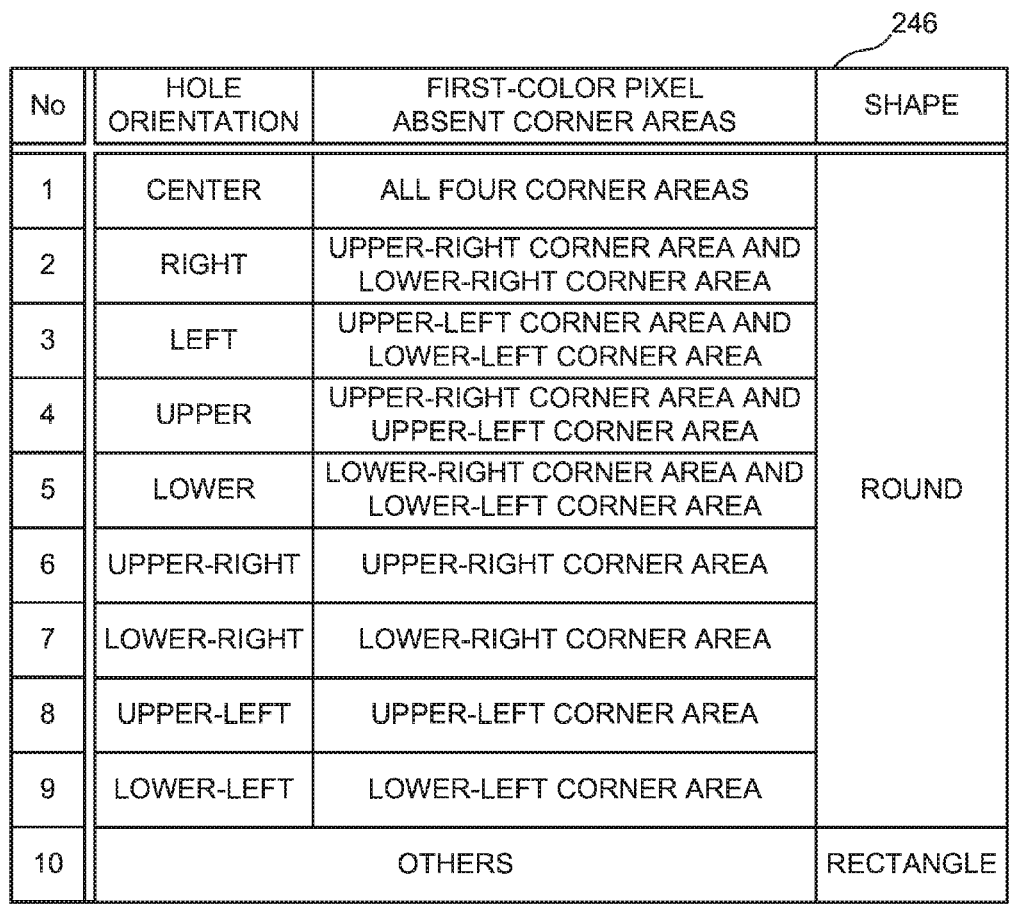

| No | HOLE ORIENTATION | FIRST-COLOR PIXEL ABSENT CORNER AREAS | SHAPE |
|---|---|---|---|
| 1 | CENTER | ALL FOUR CORNER AREAS | ROUND |
| 2 | RIGHT | UPPER-RIGHT CORNER AREA AND LOWER-RIGHT CORNER AREA | |
| 3 | LEFT | UPPER-LEFT CORNER AREA AND LOWER-LEFT CORNER AREA | |
| 4 | UPPER | UPPER-RIGHT CORNER AREA AND UPPER-LEFT CORNER AREA | |
| 5 | LOWER | LOWER-RIGHT CORNER AREA AND LOWER-LEFT CORNER AREA | |
| 6 | UPPER-RIGHT | UPPER-RIGHT CORNER AREA | |
| 7 | LOWER-RIGHT | LOWER-RIGHT CORNER AREA | |
| 8 | UPPER-LEFT | UPPER-LEFT CORNER AREA | |
| 9 | LOWER-LEFT | LOWER-LEFT CORNER AREA | |
| 10 | | OTHERS | RECTANGLE |

FIG. 22

| NO | SHAPE | HOLE ORIENTATION | DEFINITION MANNER | |
|---|---|---|---|---|
| | | | CANDIDATE AREA (PH, PW) | EXTENSION DIRECTION |
| 1 | ROUND | CENTER | (CH,CW) | NOT EXTENDED |
| 2 | | RIGHT | (CH,CH) | LEFTWARD |
| 3 | | LEFT | (CH,CH) | RIGHTWARD |
| 4 | | UPPER | (CW,CW) | DOWNWARD |
| 5 | | LOWER | (CW,CW) | UPWARD |
| 6 | | UPPER-RIGHT | (1.2×CW,1.2×CW) | DOWNWARD AND LEFTWARD |
| 7 | | UPPER-LEFT | (1.2×CW,1.2×CW) | DOWNWARD AND RIGHTWARD |
| 8 | | LOWER-LEFT | (1.2×CW,1.2×CW) | UPWARD AND RIGHTWARD |
| 9 | | LOWER-RIGHT | (1.2×CW,1.2×CW) | UPWARD AND LEFTWARD |
| 11 | RECT-ANGLE | CENTER | (CH,CW) | NOT EXTENDED |
| 12 | | RIGHT | (CH,(LONGER ONE OF CH AND CW)) | LEFTWARD |
| 13 | | LEFT | (CH,(LONGER ONE OF CH AND CW)) | RIGHTWARD |
| 14 | | UPPER | ((LONGER ONE OF CH AND CW),CW) | DOWNWARD |
| 15 | | LOWER | ((LONGER ONE OF CH AND CW),CW) | UPWARD |
| 16 | | UPPER-RIGHT | ((LONGER ONE OF CH AND CW),(LONGER ONE OF CH AND CW)) | DOWNWARD OR LEFTWARD |
| 17 | | UPPER-LEFT | ((LONGER ONE OF CH AND CW),(LONGER ONE OF CH AND CW)) | DOWNWARD OR RIGHTWARD |
| 18 | | LOWER-LEFT | ((LONGER ONE OF CH AND CW),(LONGER ONE OF CH AND CW)) | UPWARD OR RIGHTWARD |
| 19 | | LOWER-RIGHT | ((LONGER ONE OF CH AND CW),(LONGER ONE OF CH AND CW)) | UPWARD OR LEFTWARD |

FIG. 25

| No | CONTACTING END | HOLE ORIENTATION | MINIMUM JUDGMENT SIZE | MAXIMUM JUDGMENT SIZE |
|---|---|---|---|---|
| 1 | LEFT END | RIGHT | MINIMUM HOLE SIZE/2 | MAXIMUM HOLE SIZE − 1 |
| 2 | LEFT END | UPPER-RIGHT | MINIMUM HOLE SIZE/2 | |
| 3 | LEFT END | LOWER-RIGHT | MINIMUM HOLE SIZE − 1 | |
| 4 | LEFT END | OTHERS | MINIMUM HOLE SIZE − 1 | |
| 5 | RIGHT END | LEFT | MINIMUM HOLE SIZE/2 | |
| 6 | RIGHT END | UPPER-LEFT | MINIMUM HOLE SIZE − 1 | |
| 7 | RIGHT END | LOWER-LEFT | MINIMUM HOLE SIZE − 1 | |
| 8 | RIGHT END | OTHERS | MINIMUM HOLE SIZE − 1 | |
| 9 | UPPER END | LOWER | MINIMUM HOLE SIZE/2 | |
| 10 | UPPER END | UPPER-RIGHT | MINIMUM HOLE SIZE − 1 | |
| 11 | UPPER END | LOWER-LEFT | MINIMUM HOLE SIZE/2 | |
| 12 | UPPER END | OTHERS | MINIMUM HOLE SIZE − 1 | |
| 13 | LOWER END | UPPER | MINIMUM HOLE SIZE/2 | |
| 14 | LOWER END | UPPER-RIGHT | MINIMUM HOLE SIZE − 1 | |
| 15 | LOWER END | UPPER-LEFT | MINIMUM HOLE SIZE − 1 | |
| 16 | LOWER END | OTHERS | MINIMUM HOLE SIZE | |
| 17 | NONE | — | MINIMUM HOLE SIZE | MAXIMUM HOLE SIZE |

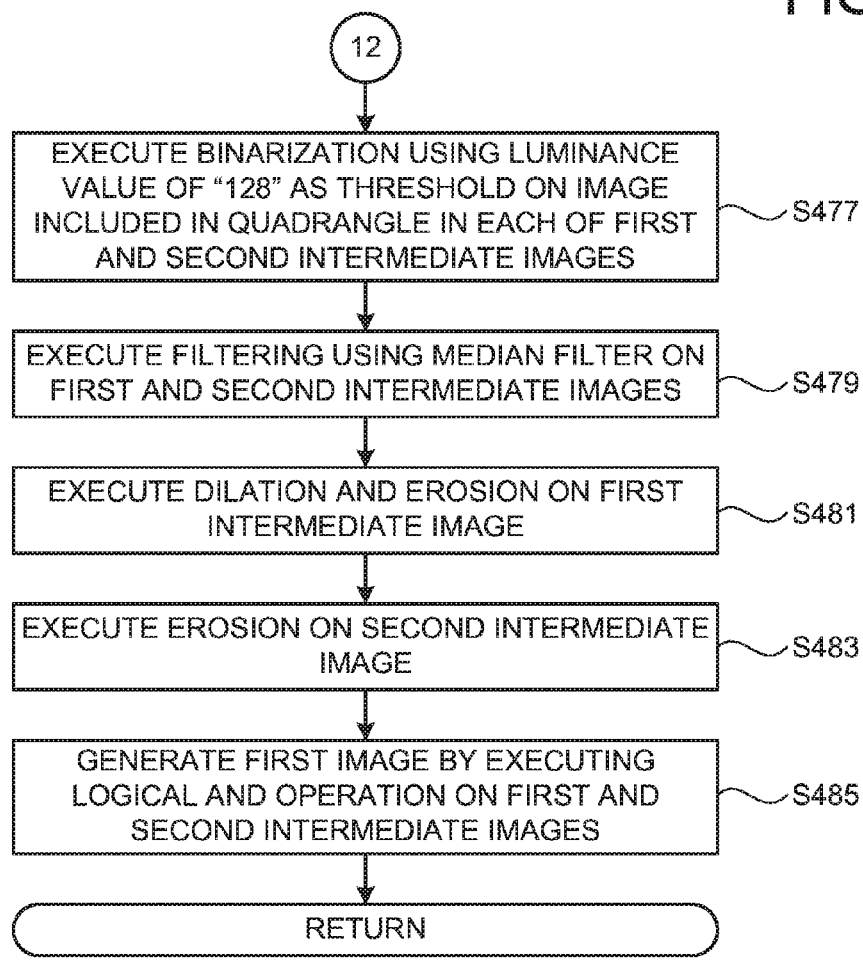

IMAGING PROCESS FOR BINARIZATION AND PUNCHED HOLE EXTRACTION

CROSS-REFERENCE TO RELATED APPLICATION

This application claims priority from Japanese Patent Application No. 2015-074552, filed on Mar. 31, 2015, which is incorporated herein by reference in its entirety.

TECHNICAL FIELD

The disclosure relates to a computer-readable storage medium storing an image processing program, an image processing device, and an image processing method, for eliminating an image corresponding to a hole in a document.

BACKGROUND

There has been known a technique for detecting, in an image of a document read by an image reader, an image corresponding to, for example, a hole (e.g., a perforation or a punched hole) formed in the document using a hole punch and eliminating the detected image from the image of the document.

For example, a known image reader obtains an image density of a reference image by reading a white reference member and obtains an image density of a document image by reading a document. The image density of the reference image is higher than the image density of a blank portion (having a color of white) of the document image. In a case that the document has a punched hole, an image density of an outline of the punched hole is lower than the image density of the blank portion. The image reader detects a circle having a lower image density than the image density of the blank portion in the document image. Thereafter, the image reader determines whether an image density of an image enclosed by the detected circle is equal to the image density of the reference image. When the image density of the image enclosed by the circle is equal to the image density of the reference image, the image reader determines that the document has a punched hole.

SUMMARY

An aspect of the present disclosure may provide a non-transitory computer readable storage medium storing computer-readable instructions, when executed by processor of an image processing device, causing the image processing device to perform processes. The processes comprise an obtaining process, a first generation process, a second generation process, a first extraction process, a second extraction process, and a first determination process. The obtaining process obtains specific image data representing a specific image. The first generation process generates a first image data binarized with a first threshold. The first image data represents a first image corresponding to a first portion of the specific image. The second generation process generates a second image data binarized with a second threshold. The second threshold being different from the first threshold. The second image data represents a second image corresponding to a second portion of the specific image. The second portion of the specific image includes at least the first portion of the specific image. The first extraction process extracts a first area from the first image. The first area includes pixels with a first color. The first color corresponds to a color of an outline of a hole image in the specific image. The second extraction process extracts a second area from the second image. The second area includes pixels with the first color. The first determination process determines the first area and the second area as a specific area corresponding to the hole image.

Another aspect of the present disclosure may provide an image processing device comprising a processor and a storage. The storage stores computer-readable instructions, when executed by the processor, causing the image processing device to perform processes. The processes comprise an obtaining process, a first generation process, a second generation process, a first extraction process, a second extraction process, and a first determination process. The obtaining process obtains specific image data representing a specific image. The first generation process generates a first image data binarized with a first threshold. The first image data represents a first image corresponding to a first portion of the specific image. The second generation process generates a second image data binarized with a second threshold. The second threshold being different from the first threshold. The second image data represents a second image corresponding to a second portion of the specific image. The second portion of the specific image includes at least the first portion of the specific image. The first extraction process extracts a first area from the first image. The first area includes pixels with a first color. The first color corresponds to a color of an outline of a hole image in the specific image. The second extraction process extracts a second area from the second image. The second area includes pixels with the first color. The first determination process determines the first area and the second area as a specific area corresponding to the hole image.

Yet another aspect of the present disclosure may provide an image processing method. The method comprise an obtaining step, a first generation step, a second generation step, a first extraction step, a second extraction step, and a first determination step. The obtaining step obtains specific image data representing a specific image. The first generation step generates a first image data binarized with a first threshold. The first image data represents a first image corresponding to a first portion of the specific image. The second generation step generates a second image data binarized with a second threshold. The second threshold being different from the first threshold. The second image data represents a second image corresponding to a second portion of the specific image. The second portion of the specific image includes at least the first portion of the specific image. The first extraction step extracts a first area from the first image. The first area includes pixels with a first color. The first color corresponds to a color of an outline of a hole image in the specific image. The second extraction step extracts a second area from the second image. The second area includes pixels with the first color. The first determination step determines the first area and the second area as a specific area corresponding to the hole image.

BRIEF DESCRIPTION OF THE DRAWINGS

For a more complete understanding of the present disclosure, needs satisfied thereby, and the objects, features, and advantages thereof, reference now is made to the following descriptions taken in connection with the accompanying drawings.

FIG. 2 illustrates an example first table in the illustrative embodiment according to one or more aspects of the disclosure.

FIG. 3 illustrates an example second table in the illustrative embodiment according to one or more aspects of the disclosure.

FIG. 4 illustrates an example third table in the illustrative embodiment according to one or more aspects of the disclosure.

FIGS. 6A and 6B illustrate an example fourth table in the illustrative embodiment according to one or more aspects of the disclosure.

FIG. 19 illustrates an example fifth table in the illustrative embodiment according to one or more aspects of the disclosure.

FIG. 21 illustrates an example sixth table in the illustrative embodiment according to one or more aspects of the disclosure.

FIG. 22 illustrates an example seventh table in the illustrative embodiment according to one or more aspects of the disclosure.

FIG. 25 illustrates an example eighth table in the illustrative embodiment according to one or more aspects of the disclosure.

FIGS. 43A and 43B are flowcharts depicting another example of punched-hole image separation processing in a variation of the illustrative embodiment according to one or more aspects of the disclosure.

DETAILED DESCRIPTION

The image density of the outline of the punched hole may vary depending on, for example, a thickness of a document to be used and/or a size of a punched hole. Therefore, in a case that an image density threshold against which to detect a circle is relatively high, the circle might not be detected. In contrast to this, in a case that the image density threshold is relatively low, an unintended image, e.g., an object drawn on the document, may be detected mistakenly as a circle. In a case that it is recognized that such an object drawn on the document and the circle belong in the same kind of group, a shape of the circle might not be detected.

Accordingly, one or more aspects of the disclosure provide for a computer-readable storage medium storing an image processing program, an image processing device, and an image processing method, for enabling detection of an outline of a hole having a relatively lower density and for enabling reduction of influence of an object included in a document (e.g., an object drawn on a document) on the detection of the hole when the hole in the document is detected based on an image density of the document.

<Overview of Image Processing System 10>

Figure 1:
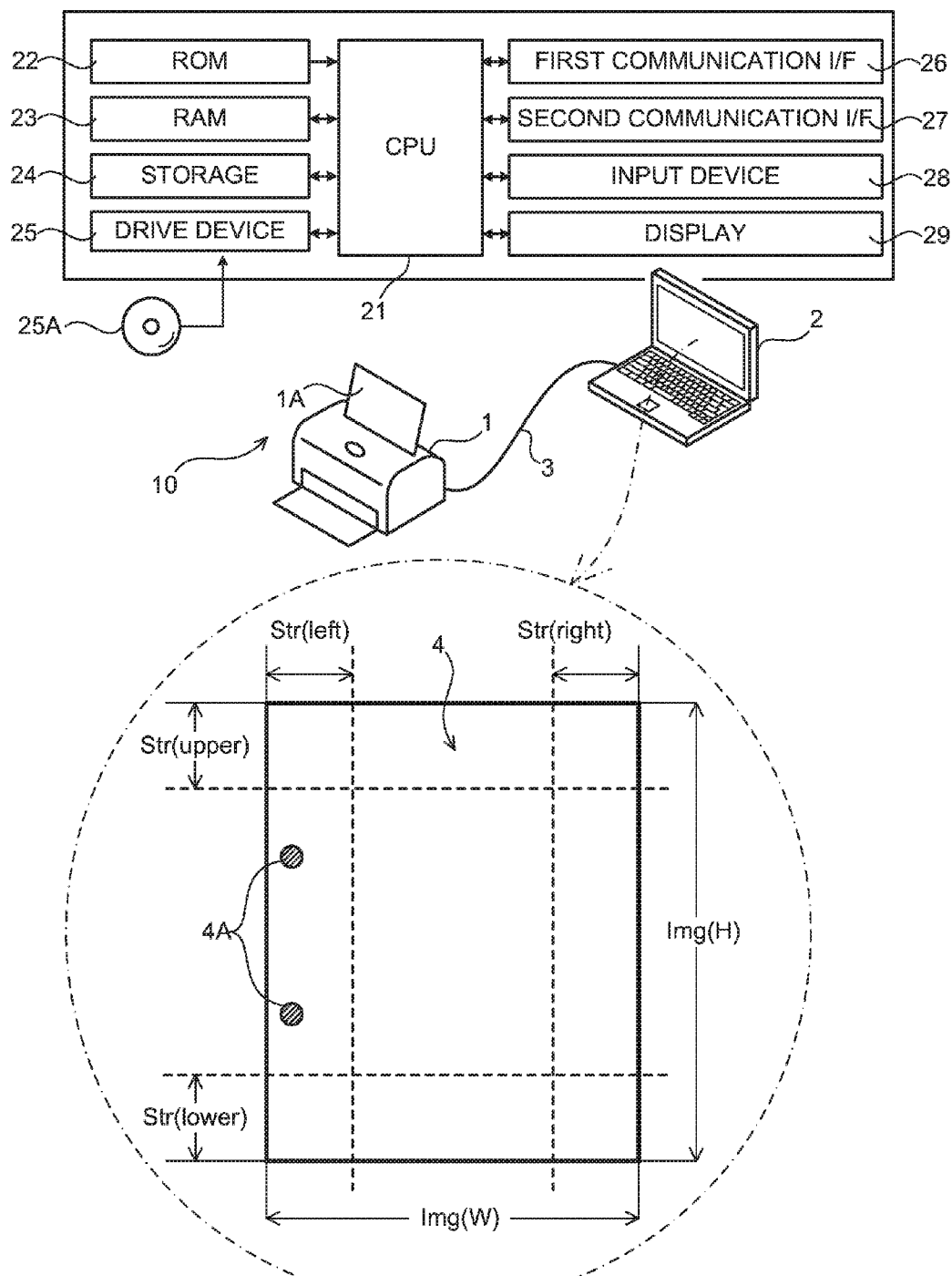
FIG. 1 illustrates an overview of an image processing system, an electrical configuration of a personal computer, and an original image in an illustrative embodiment according to one or more aspects of the disclosure.

An illustrative embodiment will be described with reference to the accompanying drawings. Referring to FIG. 1, an image processing system 10 will be described. The image processing system 10 includes an image reader 1 and a personal computer ("PC") 2. The image reader 1 and the PC 2 are connected to each other via a communication cable 3. The image reader 1 is equipped with an image sensor therein and reads an image from a document 1A using the image sensor. More specifically, for example, the image sensor reads an image from the document 1A by emitting light to the document 1A and detecting a reflecting light from the document 1A. The image reader 1 generates image data from the read image. Hereinafter, the image of the document 1A read by the image reader 1 may be referred to as an "original image", and data generated from the original image may be referred to as "original image data". The image reader 1 outputs original image data to the PC 2 via the communication cable 3. In the illustrative embodiment, the image reader 1 may be a known sheet-feed scanner. In the illustrative embodiment, the original image data may be data in bitmap format. The PC 2 receives the original image data outputted from the image reader 1 via the communication cable 3. The PC 2 detects, in the original image 4 represented by the received original image data, an image 4A corresponding to a hole (e.g., a punched hole formed in the document 1A using a hole punch) included in the document 1A (hereinafter, referred to as a "punched-hole image 4A").

When the image reader 1 reads a document 1A having a punched hole, the image sensor reads a surface of the document 1A and a member facing the image sensor (hereinafter, referred to as a "background member") through the punched hole. At the time the image sensor reads the document 1A, there is a gap between the document 1A and the image sensor. Therefore, a shadow is cast along an edge of the punched hole by light emitted from the image sensor. Thus, the image sensor also reads the shadow appearing around the punched hole. Therefore, the PC 2 detects an outline corresponding to the shadow cast along the edge of the punched hole and a portion of the background member enclosed by the outline, as a punched-hole image 4A. Accordingly, the color corresponding to the punched-hole image 4A includes a color corresponding to the outline and a color corresponding to the background member. In a case that a ground color of the document 1A and the color of the background member are the same or similar to each other, a read image might not include the punched hole clearly but only include the outline corresponding to the shadow appearing around the punched hole.

The PC 2 changes the color of pixels corresponding to the detected punched-hole image 4A to reduce obtrusiveness of the punched-hole image 4A. Hereinafter, reducing obtrusiveness of a punched-hole image may also be referred to as "eliminating a punched-hole image". In the illustrative embodiment, the punched hole may include, for example, a round punched hole and a quadrangular punched hole.

The image reader 1 might not be limited to the specific example, e.g., the sheet-feed scanner. In other embodiments, for example, the image reader 1 may be another known image scanner, e.g., a flat-bed scanner. The original image data might not also be limited to the specific example, e.g., data in bitmap format. In other embodiments, for example, the original image data may be data in another format, e.g., data in JPG, GIF, or PNG format. The number of punched holes included in a document might not be limited to the specific number. A document 1A may have any number of punched holes, e.g., 1, 2, 3, 4, 6, 22, 26, or 30 punched holes. The shape of a punched hole might not also be limited to the specific example, e.g., a round or quadrangle. In other embodiments, for example, the punched hole may have any shape. The punched hole may include a hole formed by a user in a document 1A and a hole pre-formed in a document 1A before the user obtains the document 1A. For example, the punched hole may include a plurality of holes pre-formed in a document 1A for binding (e.g., a plurality of holes in a loose sheet).

<Electrical Configuration>

An electrical configuration of the PC 2 will be described. The PC 2 includes a central processing unit ("CPU") 21 for controlling the PC 2. The CPU 21 electrically connects to a read-only memory ("ROM") 22, a random access memory ("RAM") 23, a storage 24, a drive device 25, a first communication interface ("I/F") 26, a second communication I/F 27, an input device 28, and a display 29. The ROM 22 stores a boot program and a basic input output system ("BIOS"). The RAM 23 is configured to store data therein temporarily. The storage 24 may include a non-transitory computer-readable storage medium, e.g., a hard disk. The storage 24 stores an application program for allowing the CPU 21 to execute processing (hereinafter, simply referred to as a "program") and an operation system. The storage 24 is configured to store a first table 241, a second table 242, a third table 243, a fourth table 244, a fifth table 245, a sixth table 246, a seventh table 247, and an eighth table 248.

The drive device 25 is capable of reading information stored in a recording medium 25A. The CPU 21 is configured to read a program stored in the recording medium 25A, e.g., an optical media, using the drive device 25 and store the read information in the storage 24. The first communication I/F 26 may be an interface element for establishing a connection between the PC 2 and the image reader 1 via the communication cable 3. The second communication I/F 27 may be an interface element for establishing a connection between the PC 2 and another device via a network (not depicted). The input device 28 includes, for example, a button, a keyboard, and a mouse. The display 29 may be a liquid crystal display ("LCD").

The storage 24 may include a non-transitory storage medium, for example, a hard disk drive ("HDD"), a flash memory, and/or a ROM. The non-transitory storage medium may include any storage medium that is capable of storing information regardless of storage duration of information. The non-transitory storage medium might not include a transitory storage medium (e.g., a transmission signal). A general purpose processor may be used as the CPU 21. One or more processing executed by the CPU 21 may be executed by another electronic component (e.g., an application specific integrated circuit ("ASIC")). The processing executed by the CPU 21 may be distributed among a plurality of electronic devices (e.g., a plurality of CPUs). The program may be downloaded from a server connected to a network (not depicted) (e.g., may be transmitted as transmission signals) and stored in the storage 24. In this case, the program may be stored in a non-transitory storage medium, e.g., an HDD of the server.

<Attribution Information, Setting Information, and Processing-Target Range Information>

Referring to FIGS. 2, 3, and 4, the first table 241, the second table 242, and the third table 243 stored in the storage 24 will be described. As depicted in FIG. 2, the first table 241 is configured to store attribution information. Attribution information may be outputted by the image reader 1 at the same time original image data is outputted by the image reader 1. The attribution information may be included in a header of the original image data or may be outputted as metadata separately from the original image data. The attribution information includes an original image height, an original image width, resolution, and color. As depicted in FIG. 1, the original image height represents a dimension of an original image 4 in an upper-lower direction (Img(H)) in pixels, and the original image width represents a dimension of the original image 4 in a right-left direction (Img(W)) in pixels. The resolution represents resolution of the original image 4 in dot per inch ("dpi"). The color represents the color of the original image 4, e.g., grayscale or color.

As depicted in FIG. 3, the second table 242 is configured to store setting information inputted through the input device 28. The setting information includes a range, hole size, background, and filling. The range includes a left specified range, a right specified range, an upper specified range, and a lower specified range. The hole size includes a maximum hole size and a minimum hole size. The background includes a background color, a maximum background color luminance, and a minimum background color luminance. The filling includes a filling area shape and a filling color.

As depicted in FIG. 1, the range defines areas along respective four sides of the original image 4 inside a boundary of the original image 4. The range is specified by the user to define areas subject to detection of a punched-hole image 4A by the PC 2. The left specified range (Str(left)) represents a distance (in millimeters) from a left end of the original image 4 to an end (e.g., an inside boundary) of the left specified range in an inward direction. The right specified range (Str(right)) represents a distance (in millimeters) from a right end of the original image 4 to an end (e.g., an inside boundary) of the right specified range in the inward direction. The upper specified range (Str (upper)) represents a distance (in millimeters) from an upper end of the original image 4 to an end (e.g., an inside boundary) of the upper specified range in the inward direction. The lower specified range (Str(lower)) represents a distance (in millimeters) from a lower end of the original image 4 to an end (e.g., an inside boundary) of the lower specified range in the inward direction. The left specified range defines an area extending along a left side of the original image 4 and having a dimension of "Str(left)" in the right-left direction. The right specified range defines an area extending along a right side of the original image 4 and having a dimension of "Str(right)" in the right-left direction. The upper specified range defines an area extending along an upper side of the original image 4 and having a dimension of "Str(upper)" in the upper-lower direction. The lower specified range defines an area extending along a lower side of the original image 4 and having a dimension of "Str (lower)" in the upper-lower direction.

Hereinafter, the areas defined by the left specified range, the right specified range, the upper specified range, and the lower specified range may be referred to as a "left specified area", a "right specified area", an "upper specified area", and a "lower specified area", respectively. The "left specified area", the "right specified area", the "upper specified area", and the "lower specified area" may be collectively referred to as "specified areas". When one of the specified areas includes a half or more portion of a punched-hole image 4A, the PC 2 determines the punched-hole image 4A as a target of elimination. When one of the specified areas includes a less than half portion of the punched-hole image 4A, the PC 2 determines the punched-hole image 4A as a non-target of elimination.

As depicted in FIG. 3, the hole size specifies a size range of a punched hole. The maximum hole size represents an upper size limit for each punched hole in millimeters. The minimum hole size represents a lower size limit for each punched hole in millimeters. For a round punched hole, the maximum hole size represents an upper limit for a diameter of the round punched hole and the minimum hole size represents a lower limit for a diameter of the round punched hole. For a quadrangular punched hole, the maximum hole size represents an upper limit for each of a longer side and a shorter side of the quadrangular punched hole and the minimum hole size represents a lower limit for each of the longer side and the shorter side of the quadrangular punched hole. In other example, for a quadrangular punched hole, the maximum hole size and minimum hole size for the longer side and the maximum hole size and minimum hole size for the shorter side may be specified independently.

The background specifies an image read by the image sensor without a document in the image reader 1 (hereinafter, referred to as a "background image"). The background color represents the color of the background image, e.g., gray or white. The maximum background color luminance represents an upper-limit luminance value of the background image. The minimum background color luminance represents a lower-limit luminance value of the background color. The background image corresponds to an image obtained by reading of the background member by the image sensor of the image reader 1. Therefore, the background information is specified in accordance with the color and material of the background member.

In the illustrative embodiment, it is assumed that gray or white is specified as the color of the background image. Nevertheless, information to be stored as the color of the background image may be changed in accordance of the color of the background member. In other embodiments, for example, when the color of the background member is black, black may be specified as the color of the background image.

The filling specifies a manner of changing the color of pixels representing a target punched-hole image. The filling area shape represents a manner of determining a shape of a target area that includes pixels whose color is to be changed. For example, the determination manner includes determining a shape of a target area in accordance with the shape of a target punched-hole image (e.g., round or quadrangle) and determining a shape of a target area as quadrangle irrespective of the shape of a target punched-hole image. The filling color represents color to be specified for changing the color of pixels representing the target punched-hole image, e.g., white or the color of a surrounding portion of the target punched-hole image.

As depicted in FIG. 4, the third table 243 is configured to store processing-target range information. The processing-target range information is determined in accordance with the setting information (refer to FIG. 3). The processing-target range information represents areas subject to processing when the CPU 21 executes processing for detecting a punched-hole image. The processing-target range information defines areas along the respective four sides of the original image 4 inside the boundary of the original image 4, similar to the ranges in the setting information (refer to FIG. 3). The processing-target range information includes a left processing-target range, a left extended range, a right processing-target range, a right extended range, an upper processing-target range, an upper extended range, an upper width range (left), an upper width range (right), an upper width extended range (left), an upper width extended range (right), a lower processing-target range, a lower extended range, a lower width range (left), a lower width range (right), a lower width extended range (left), and a lower width extended range (right).

Hereinafter, areas defined by the left processing-target range, the right processing-target range, the left extended range, and the right extended range may be referred to as a "left processing-target area", a "right processing-target area", a "left extended area", and a "right extended area", respectively. An area defined by the upper processing-target range, the upper width range (left), and the upper width range (right) may be referred to as an "upper processing-target area". An area defined by the lower processing-target range, the lower width range (left), and the lower width range (right) may be referred to as a "lower processing-target area". An area defined by the upper extended range, the upper width extended range (left), and the upper width extended range (right) may be referred to as an "upper extended area". An area defined by the lower extended range, the lower width extended range (left), the lower width extended range (right) may be referred to as a "lower extended area". The left processing-target area, the right processing-target area, the upper processing-target area, and the lower processing-target area may be collectively referred to as "processing-target areas". The left extended area, the right extended area, the upper extended area, and the lower extended area may be referred to as "extended areas".

The left processing-target range and the left extended range each represent a distance (in millimeters) from the left end of the original image 4 to an end (e.g., an inside boundary) of each of the left processing-target range and the left extended range, respectively, in the inward direction. The right processing-target range and the right extended range each represent a distance (in millimeters) from the right end of the original image 4 to an end (e.g., an inside boundary) of each of the right processing-target range and the right extended range, respectively, in the inward direction. The upper processing-target range and the upper extended range each represent a distance (in millimeters) from the upper end of the original image 4 to an end (e.g., an inside boundary) of each of the upper processing-target range and the upper extended range, respectively, in the inward direction. The lower processing-target range and the lower extended range each represent a distance (in millimeters) from the lower end of the original image 4 to an end (e.g., an inside boundary) of each of the lower processing-target range and the lower extended range, respectively, in the inward direction. The left extended range, the right extended range, the upper extended range, and the lower extended range define respective areas, each of which is extended inwardly by a predetermined distance from a corresponding one of the areas defined by the left processing-target range, the right processing-target range, the upper processing-target range, and the lower processing-target range. Therefore, the left extended range, the right extended range, the upper extended range, and the lower extended range are greater than the left processing-target range, the right processing-target range, the upper processing-target range, and the lower processing-target range, respectively.

The upper width range (left) represents a distance from the left end of the original image to a left end of the upper processing-target area. The upper width range (right) represents a distance from the right end of the original image to a right end of the upper processing-target area. The lower width range (left) represents a distance from the left end of the original image to a left end of the lower processing-target area. The lower width range (right) represents a distance from the right end of the original image to a right end of the lower processing-target area. The upper width extended range (left) represents a distance from the left end of the original image to a left end of the upper extended area. The upper width extended range (right) represents a distance from the right end of the original image to a right end of the upper extended area. The lower width extended range (left) represents a distance from the left end of the original image to a left end of the lower extended area. The lower width extended range (right) represents a distance from the right end of the original image to a right end of the lower extended area.

<Outline of Processing Executed by CPU 21>

Figure 5A:
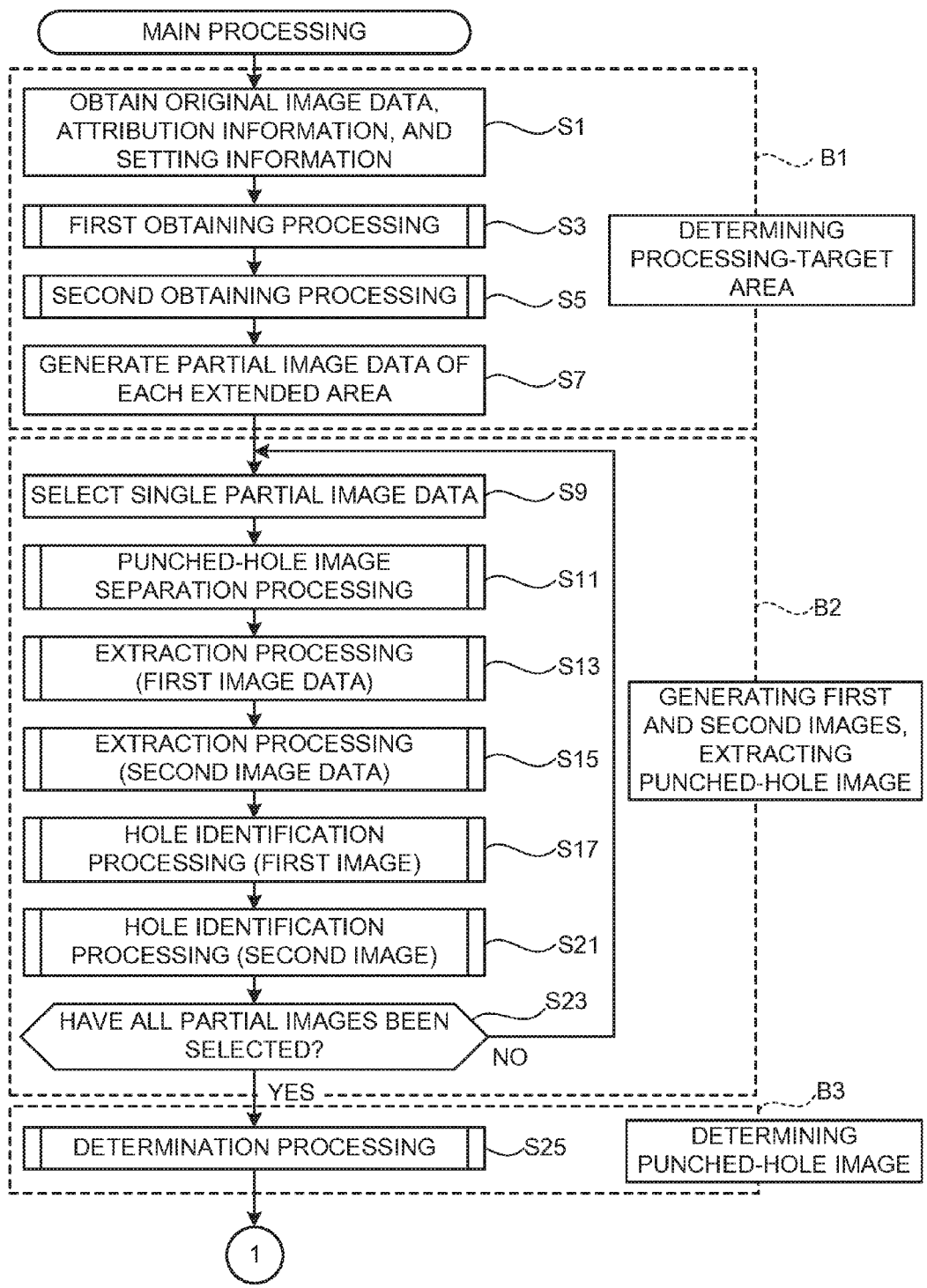
FIGS. 5A and 5B are flowcharts depicting an example of main processing in the illustrative embodiment according to one or more aspects of the disclosure.
Figure 5B:
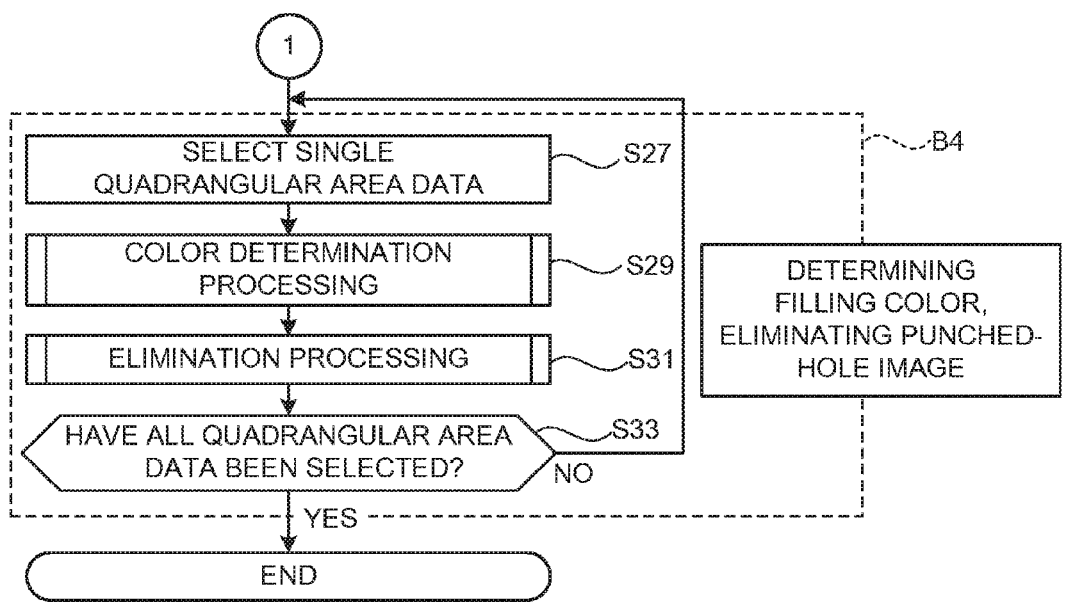

Referring to FIGS. 5A and 5B, processing for eliminating a punched-hole image (e.g., main processing) executed by the CPU 21 of the PC 2 will be described. In stage B1 (e.g., steps S1, S3, S5, and S7), one or more processing-target areas, each of which is a target of punched-hole image detection, are determined in an original image. The original image is segmented into extended areas corresponding to the one or more specified processing-target areas, respectively, and one or more partial images are generated for the original image. In stage B2 (e.g., steps S9, S11, S13, S15, S17, S21, and S23), two images (e.g., a first image and a second image) are generated based on each of the one or more partial images. Then, an area as a candidate for a punched-hole image is extracted from each of the first and second images. In stage B3 (e.g., step S25), a punched-hole image is determined based on the areas as the candidates for the punched-hole image extracted from the first and second images generated in stage B2. In stage B4 (e.g., steps S27, S29, S31, and S33), a filling color to be used for changing the color of pixels corresponding to the punched-hole image determined in stage B3 is determined. Then, the color of the pixels corresponding to the punched-hole image is changed using the determined filling color to eliminate a punched hole.

Figure 6A:
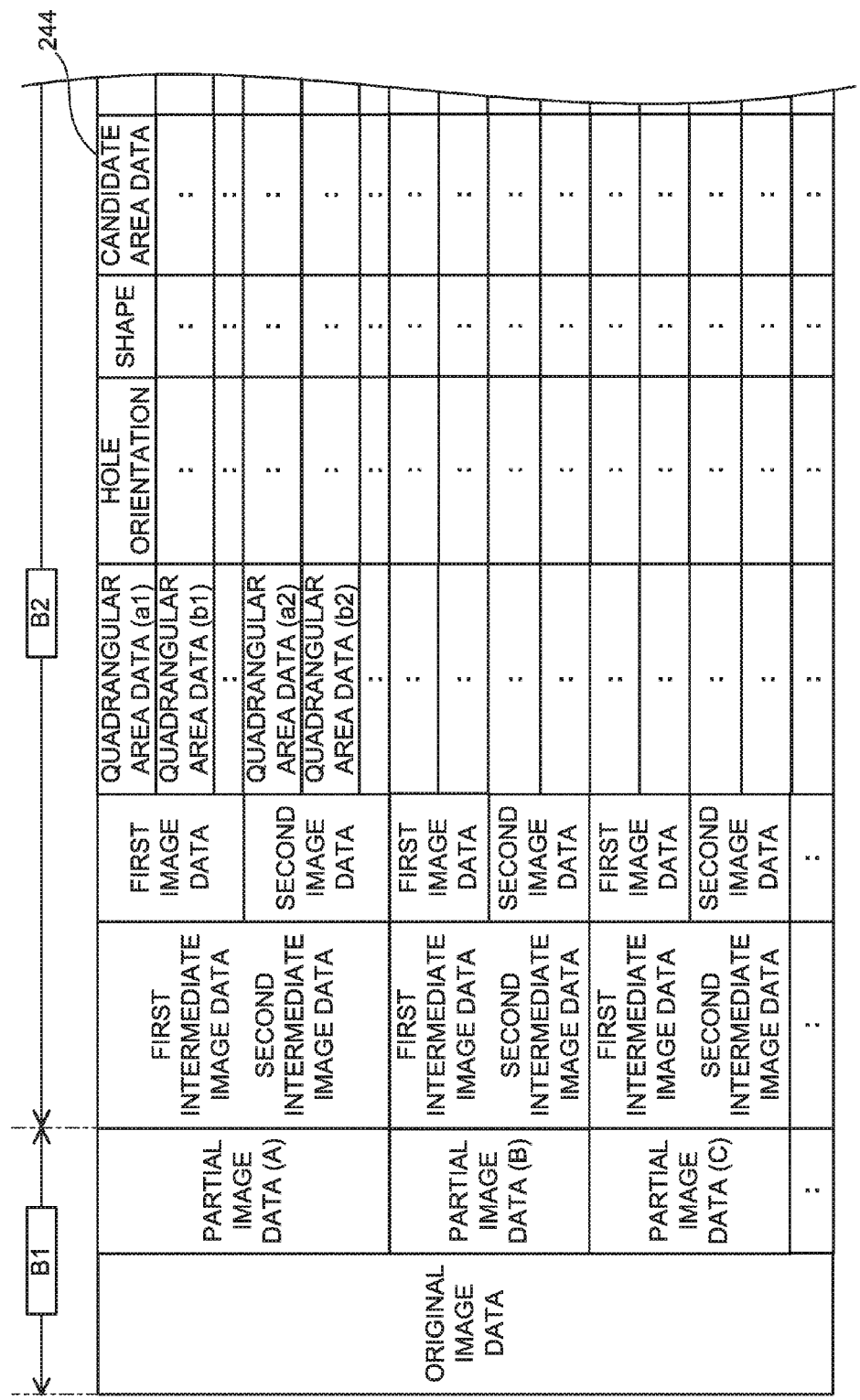

FIGS. 6A and 6B illustrate the fourth table 244 stored in the storage 24. In stage B1, original image data and partial image data are stored in the fourth table 244. In stage B2, first intermediate data, second intermediate data, first image data, second image data, quadrangular area data, hole orientation, shape, candidate area data, and second central area data are stored in the fourth table 244. In stage B4, filling color, variability, and filling area are stored in the fourth table 244.

<Details of Processing Executed by CPU 21>

The main processing executed by the CPU 21 of the PC 2 will be described in detail. It is assumed that the CPU 21 has already stored setting information in the second table 242 (refer to FIG. 3) in response to input of the setting information through the input device 28 before starting the main processing. Upon receipt of original image data outputted from the image reader 1 via the communication cable 3, the CPU 21 starts the main processing by executing an appropriate program stored in the storage 24. The CPU 21 stores the received original image data in the fourth table 244 (refer to FIGS. 6A and 6B). The CPU 21 also stores, in the first table 241 (refer to FIG. 2), attribution information received together with the original image data.

<Stage B1: First Obtaining Processing and Second Obtaining Processing>

As depicted in FIGS. 5A and 5B, the CPU 21 obtains the original image data from the fourth table 244 (e.g., step S1). The CPU 21 obtains the attribution information from the first table 241 (e.g., step S1). The CPU 21 obtains the setting information from the second table 242 (e.g., step S1). Subsequent to step S1, the CPU 21 executes first obtaining processing (refer to FIGS. 7A and 7B) (e.g., step S3). In the description below, attribution information and setting information refer to the attribution information and the setting information obtained in step S1.

Figure 7A:
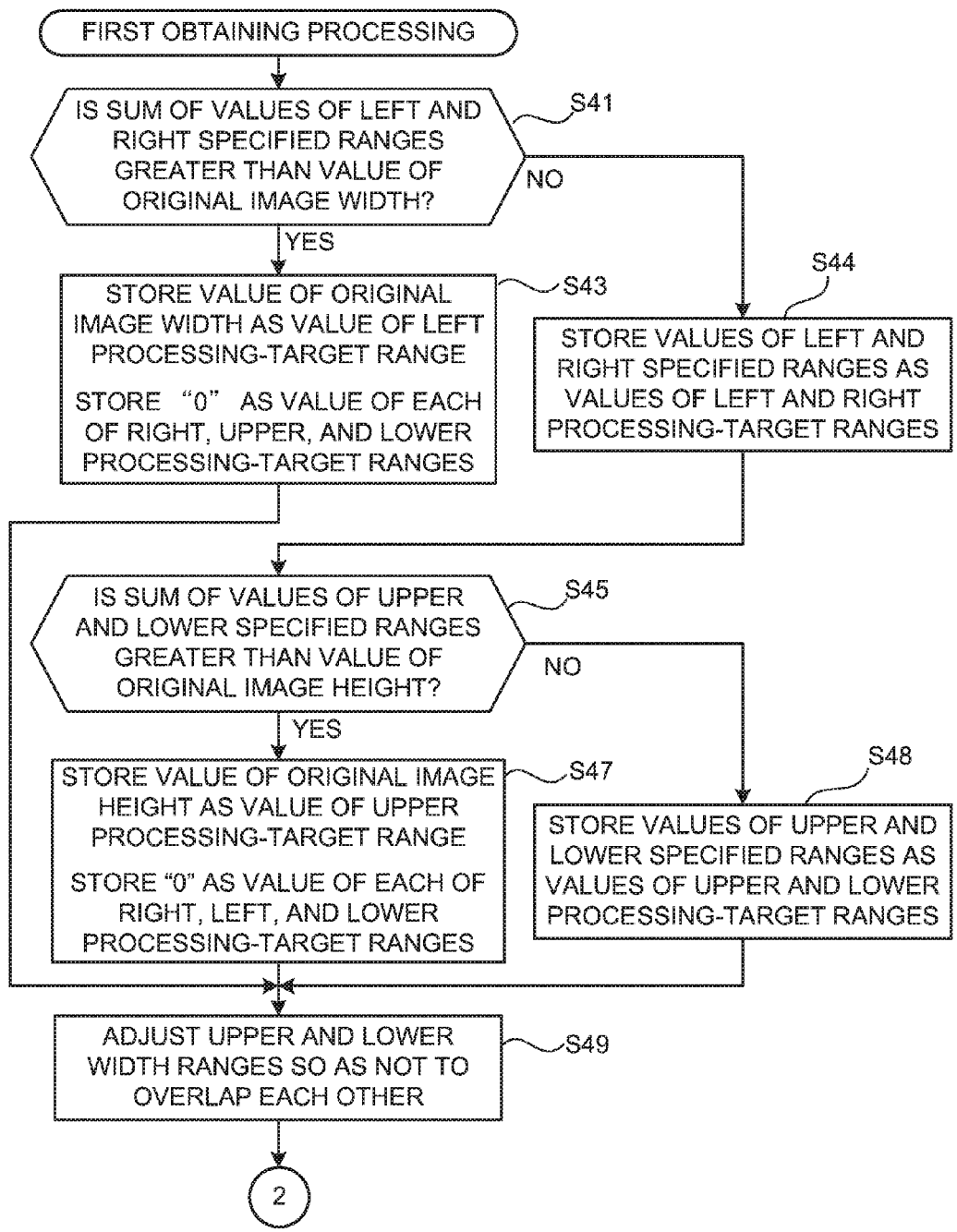
FIGS. 7A and 7B are flowcharts depicting an example of first obtaining processing in the illustrative embodiment according to one or more aspects of the disclosure.
Figure 7B:
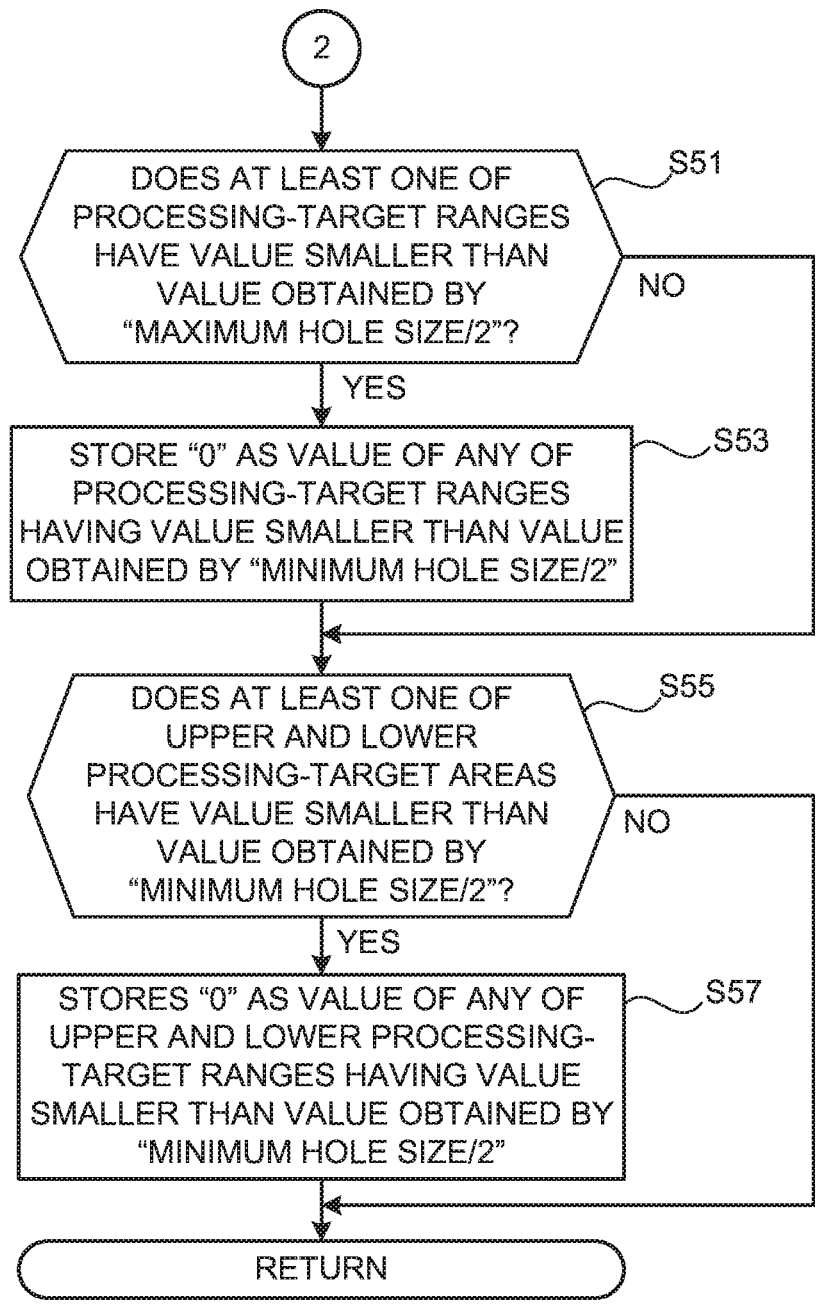

Referring to FIGS. 7A and 7B, the first obtaining processing will be described in detail. The CPU 21 determines whether a sum of values of the left and right specified ranges in the setting information is greater than a value obtained by conversion of an original image width in the attribution information into millimeters (e.g., step S41). When the CPU 21 determines that the sum of the values of the left and right specified ranges is greater than the value obtained by the conversion (e.g., YES in step S41), the CPU 21 stores the value obtained by the conversion as a value of the left processing-target range in the third table 243 (refer to FIG. 4) (e.g., step S43). The CPU 21 stores "0 (zero)" as a value of each of the right processing-target range, the upper processing-target range, and the lower processing-target range in the third table 243 (e.g., step S43). Subsequent to step S43, the routine proceeds to step S49. When the sum of the values of the left and right specified ranges is smaller than or equal to the value obtained by the conversion (e.g., NO in step S41), the CPU 21 stores the value of the left specified range as a value of the left processing-target range in the third table 243 (e.g., step S44). The CPU 21 stores the value of the right specified range as a value of the right processing-target range in the third table 243 (e.g., step S44). Subsequent to step S44, the routine proceeds to step S45.

Figure 8:
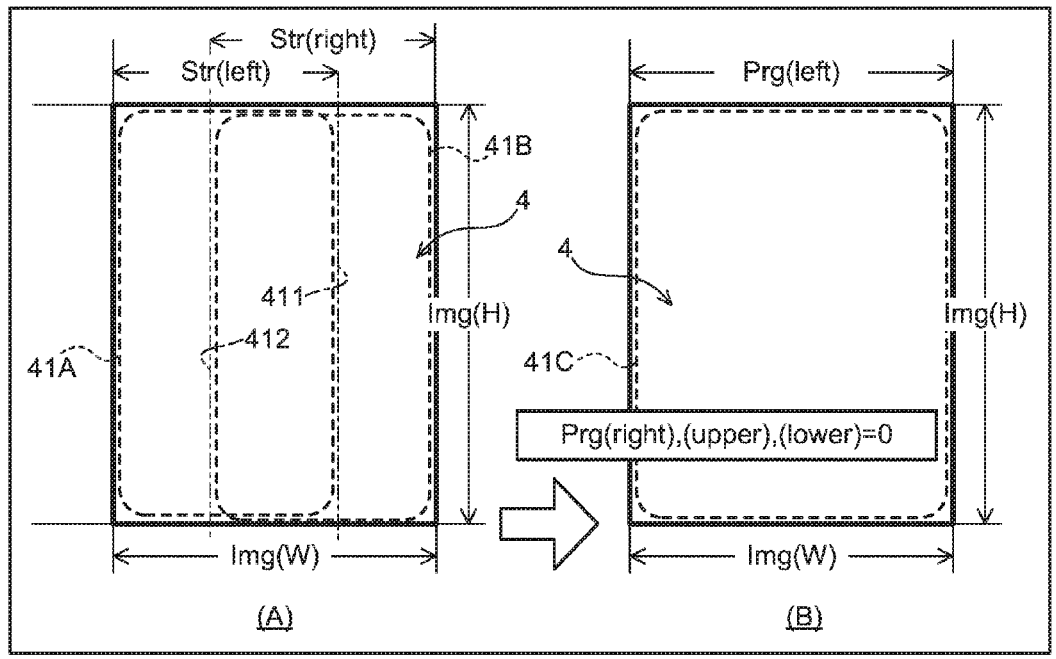
FIG. 8 illustrates how to change ranges of a left specified area and a right specified area in the illustrative embodiment according to one or more aspects of the disclosure.

Steps S41, S43, and S44 will be described in detail using a specific example. In (A) of FIG. 8, a left specified area 41A is defined as an area located to the left of a dashed line 411, which extends in the upper-lower direction and is positioned to the right of the left end of the original image 4 while being spaced from the left end of the original image 4 by the left specified range (Str(left)) in the original image 4. The right specified area 41B is defined as an area located to the right of a dashed line 412, which extends in the upper-lower direction and is positioned to the left of the right end of the original image 4 while being spaced from the right end of the original image 4 by the right specified range (Str(right)) in the original image 4. As depicted in (A) of FIG. 8, in a case that a right portion of the left specified area 41A and a left portion of the right specified area 41B overlap each other, a sum of the values of the left specified range (Str(left)) and the right specified range (Str(right)) in the setting information is greater than the value obtained by conversion of the original image width (Img(W)) in the attribution information into millimeters (e.g., YES in step S41). In this case, when partial images are generated from the original image 4 based on the respective specified areas, the same processing may be duplicated on the overlapping portions of the partial images. Therefore, as depicted in (B) of FIG. 8, the CPU 21 stores the value obtained by conversion of the original image width (Img(W)) into millimeters as a value of the left processing-target range (Prg(left)) in the third table 243 (e.g., step S43), and stores "0" as a value of each of the right processing-target range (Prg(right)), the upper processing-target range (Prg(upper)), and the lower processing-target range (Prg(lower)) in the third table 243 (e.g., step S43). In this case, the left processing-target area 41C is valid and the right processing-target area, the upper processing-target area, and the lower processing-target area are invalid. Accordingly, even when partial images are generated based on the respective specified areas, the partial images might not overlap each other.

As depicted in FIGS. 7A and 7B, the CPU 21 determines whether a sum of values of the upper and lower specified ranges in the setting information is greater than a value obtained by conversion of the original image height in the attribution information into millimeters (e.g., step S45). When the CPU 21 determines that the sum of the values of the upper and lower specified ranges is greater than the value obtained by the conversion (e.g., YES in step S45), the CPU 21 stores the value obtained by the conversion as a value of the upper processing-target range in the third table 243 (e.g., step S47). The CPU 21 stores "0" as a value of each of the left processing-target range, the right processing-target range, and the lower processing-target range in the third table 243 (e.g., step S47) and the routine proceeds to step S49. When the CPU 21 determines that the sum of the values of the upper and lower specified ranges is smaller than or equal to the value obtained by the conversion (e.g., NO in step S45), the CPU 21 stores the value of the upper specified range as a value of the upper processing-target range in the third table 243 (e.g., step S48). The CPU 21 stores the value of the lower specified range as a value of the lower processing-target range (e.g., step S48) and the routine proceeds to step S49.

Steps S45, S47, and S48 will be described in detail using a specific example. In (A) of FIG. 9, an upper specified area 42A is defined as an area located above a dashed line 413, which extends in the right-left direction and is positioned below the upper end of the original image 4 while being spaced from the upper end of the original image 4 by the upper specified range (Str(upper)) in the original image 4. The lower specified area 42B is defined as an area located below a dashed line 414, which extends in the right-left direction and is positioned above the lower end of the original image 4 while being spaced from the lower end of the original image 4 by the lower specified range (Str (lower)) in the original image 4.

Figure 9:
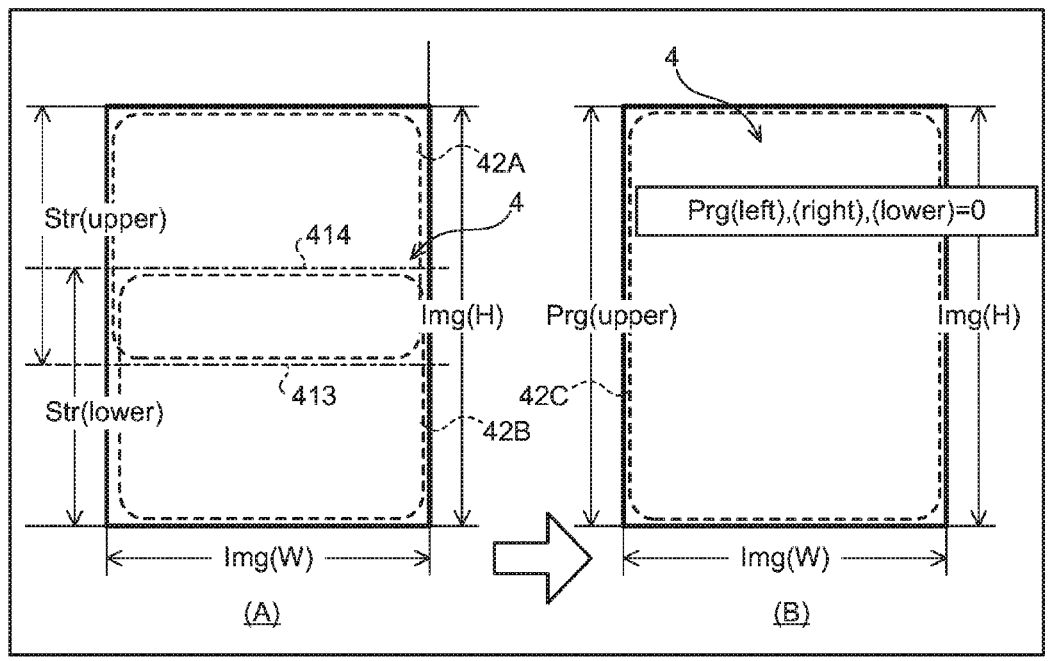
FIG. 9 illustrates how to change ranges of an upper specified area and a lower specified area in the illustrative embodiment according to one or more aspects of the disclosure.

As depicted in (A) of FIG. 9, in a case that a lower portion of the upper specified area 42A and an upper portion of the lower specified area 42B overlap each other, a sum of the values of the upper specified range (Str(upper)) and the lower specified range (Str(lower)) in the setting information is greater than the value obtained by conversion of the original image height (Img(H)) in the attribution information into millimeters (e.g., YES in step S45). In this case, when partial images are generated from the original image 4 based on the respective specified areas, the same processing may be duplicated on the overlapping portions of the partial images. Therefore, as depicted in (B) of FIG. 9, the CPU 21 stores the value obtained by conversion of the original image height (Img(H)) into millimeters as a value of the upper processing-target range (Prg(upper)) in the third table 243 (e.g., step S47), and stores "0" as a value of each of the left processing-target range (Prg(left)), the right processing-target range (Prg(right)), and the lower processing-target range (Prg(lower)) in the third table 243 (e.g., step S47). In this case, the upper processing-target area 42C is valid and the left processing-target area, the right processing-target area, and the lower processing-target area are invalid. Accordingly, even when partial images are generated based on the respective specified areas, the partial images might not overlap each other.

As depicted in FIGS. 7A and 7B, the CPU 21 adjusts the upper width range (left), the upper width range (right), the lower width range (left), and the lower width range (right) stored in the third table 243 such that the left processing-target area, the right processing-target area, the upper processing-target area, and the lower processing-target area stored in the third table 243 through S41 to S48 do not overlap each other (e.g., step S49). More specifically, for example, the CPU 21 stores the value of the left processing-target range in the third table 243 as a value of the upper width range (left) in the third table 243, and the value of the right processing-target range in the third table 243 as a value of the upper width range (right) in the third table 243.

Step S49 will be described in detail using a specific example. In (A) of FIG. 10, a left processing-target area 43A is defined as an area located to the left of a dashed line 415, which extends in the upper-lower direction and is positioned to the right of the left end of the original image 4 while being spaced from the left end of the original image 4 by the left processing-target range (Prg(left)) in the original image 4. A right processing-target area 43B is defined as an area located to the right of a dashed line 416, which extends in the upper-lower direction and is positioned to the left of the right end of the original image 4 while being spaced from the right end of the original image 4 by the left processing-target range (Prg(right)) in the original image 4. An upper processing-target area 43C is defined as an area located above a dashed line 417, which extends in the right-left direction and is positioned below the upper end of the original image 4 while being spaced from the upper end of the original image 4 by the upper processing-target range (Prg(upper)). A lower processing-target area 43D is defined as an area located below a dashed line 418, which extends in the right-left direction and is positioned above the lower end of the original image 4 while being spaced from the lower end of the original image 4 by the lower processing-target range (Prg(lower)) in the original image 4.

Figure 10:
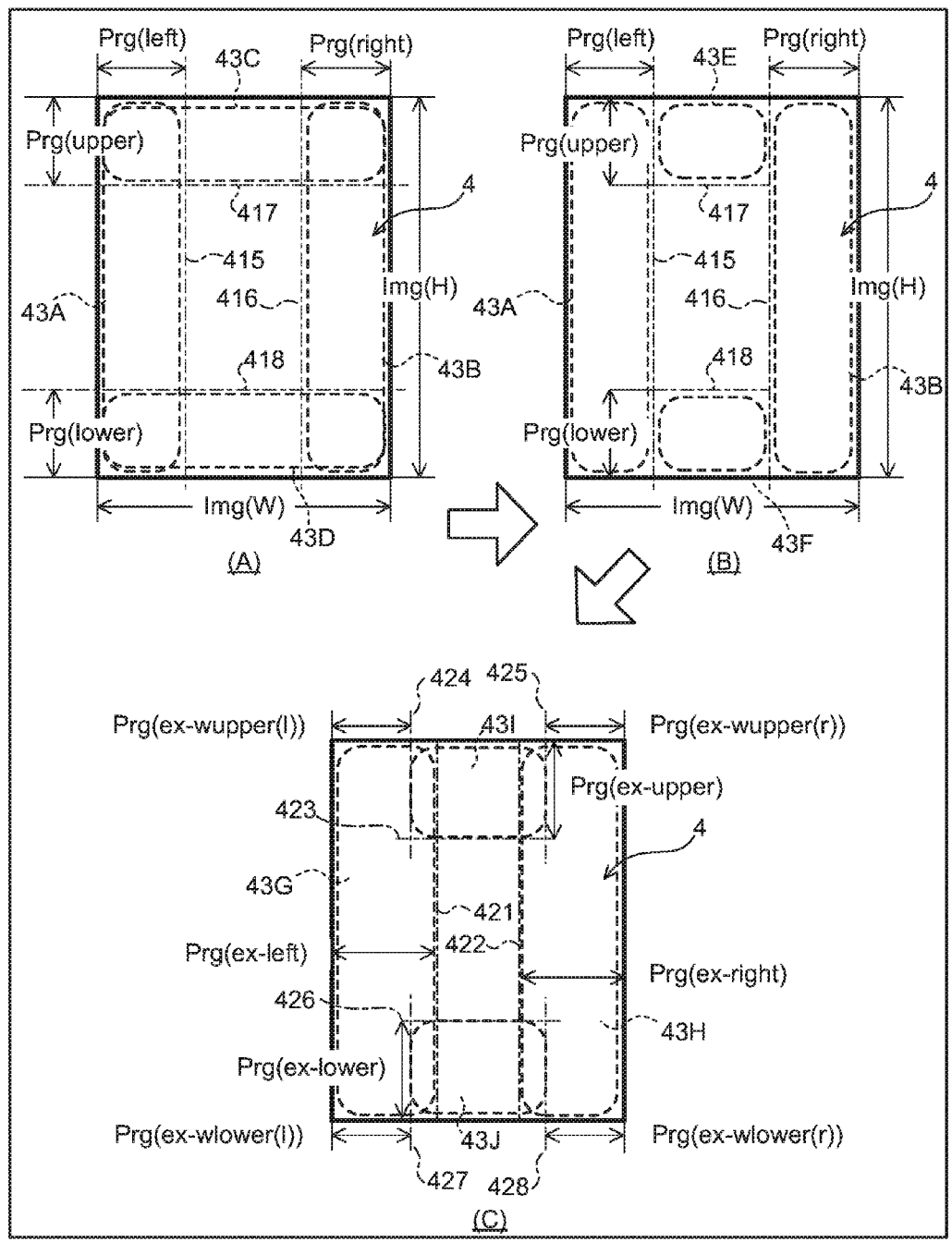
FIG. 10 illustrates how to extend specified areas in the illustrative embodiment according to one or more aspects of the disclosure.

In an example depicted in (A) of FIG. 10, a sum of values of the left processing-target range (Prg(left)) and the right processing-target range (Prg(right)) in the processing-target range information is smaller than the value obtained by conversion of the original image width (Img(W)) into millimeters (e.g., NO in step S41) and a sum of values of the upper processing-target range (Prg(upper)) and the lower processing-target range (Prg(lower)) in the processing-target range information is smaller than the value obtained by conversion of the original image height (Img(H)) into millimeters (e.g., NO in step S45). In this case, an upper portion of the left processing-target area 43A and a left portion of the upper processing-target area 43C overlap each other, an upper portion of the right processing-target area 43B and a right portion of the upper processing-target area 43C overlap each other, a lower portion of the left processing-target area 43A and a left portion of the lower processing-target area 43D overlap each other, and a lower portion of the right processing-target area 43B and a right portion of the lower processing-target area 43D overlap each other. Thus, if partial images are generated from the original image 4 based on the respective specified areas, the same processing may be duplicated on the overlapping portions of the partial images.

Therefore, the CPU 21 stores the value of the left processing-target range (Prg(left)) in the setting information as a value of the upper width range (left) in the third table 243. The CPU 21 stores the value of the right processing-target range (Prg(right)) in the setting information as a value of the upper width range (right) in the third table 243. The CPU 21 stores the value of the left processing-target range (Prg(left)) in the setting information as a value of the lower width range (left) in the third table 243. The CPU 21 stores the value of the right processing-target range (Prg(right)) in the setting information as a value of the lower width range (right) in the third table 243 (e.g., step S49). Thus, as depicted in (B) of FIG. 10, an upper processing-target area 43E and a lower processing-target area 43F are both defined between the left processing-target area 43A and the right processing-target area 43B in a width direction. Accordingly, the processing-target areas might not overlap each other.

As depicted in FIGS. 7A and 7B, subsequent to step S49, the CPU 21 determines whether the left processing-target range stored in the third table 243 has a value that is smaller than a value obtained by division of the minimum hole size (refer to FIG. 3) in the setting information by "2" (hereinafter, referred to as "minimum hole size/2") (e.g., step S51). The CPU 21 determines whether the right processing-target range stored in the third table 243 has a value that is smaller than the value obtained by "minimum hole size/2" (e.g., step S51). The CPU 21 determines whether the upper processing-target range stored in the third table 243 has a value that is smaller than the value obtained by "minimum hole size/2" (e.g., step S51). The CPU 21 determines whether the lower processing-target range stored in the third table 243 has a value that is smaller than the value obtained by "minimum hole size/2" (e.g., step S51). This determination is made because in a case that a processing-target area is narrower than the size of "minimum hole size/2", the CPU 21 might not be able to determine whether a half or more portion of a punched-hole image is included in the processing-target area. The CPU 21 stores "0" (e.g., step S53) as a value of any of the four processing-target ranges in the third table 243 that have the value smaller than the value obtained by "minimum hole size/2" (e.g., YES in step S51) (e.g., step S53). Subsequent to step S53, the routine proceeds to step S55. The CPU 21 might not store "0" as a value of any of the four processing-target ranges in the third table 243 that have a value greater than or equal to the value obtained by "minimum hole size/2" (e.g., NO in step S51). Subsequent to step S51, the routine proceeds to step S55.

The CPU 21 determines whether a value obtained by reduction of the sum of the values of the upper width range (left) and the upper width range (right) of the third table 243 from the value obtained by conversion of the original document width (refer to FIG. 2) in the attribution information into millimeters is smaller than the value obtained by "minimum hole size/2" (e.g., step S55). The CPU 21 determines whether a value obtained by reduction of the sum of the values of the lower width range (left) and the lower width range (right) in the third table 243 from the value obtained by conversion of the original document width (refer to FIG. 2) in the attribution information into millimeters is smaller than the value obtained by "minimum hole size/2" (e.g., step S55). When the CPU 21 determines that at least one of the obtained values is smaller than the value obtained by "minimum hole size/2" (e.g., YES in step S55), the CPU 21 stores "0", in accordance with the determination, as a value of any of the pair of the upper width range (left) and the upper width range (right) and the pair of the lower width range (left) and the lower width range (right) in the third table 243, on which a positive determination is made in step S55. The CPU 21 also stores "0", in accordance with the determination, as a value of a corresponding one or both of the upper processing-target range and the lower processing-target range in the third table 243 (e.g., step S57). This determination is made because in a case that the width of the upper processing-target area and the width of the lower processing-target area are narrower than the size of "minimum hole size/2", the CPU 21 might not be able to determine whether a half or more portion of a punched-hole image is included in the processing-target area. Subsequent to step S57, the CPU 21 ends the first obtaining processing and the routine returns to the main processing (refer to FIGS. 5A and 5B). When the CPU 21 determines that both of the obtained values are greater than or equal to the value obtained by "minimum hole size/2" (e.g., NO in step S55), the CPU 21 ends the first obtaining processing and the routine returns to the main processing (refer to FIGS. 5A and 5B).

Through the first obtaining processing, dimensions of each of the four processing-target areas (e.g., the left processing-target area, the right processing-target area, the upper processing-target area, and the lower processing-target area) in the upper-lower direction and in the right-left direction are determined as being greater than or equal to the value obtained by "minimum hole size/2". Thus, the CPU 21 is capable of determining a punched-hole image whose half or more portion is included in any of the processing-target areas, as a target of elimination.

Figure 11A:
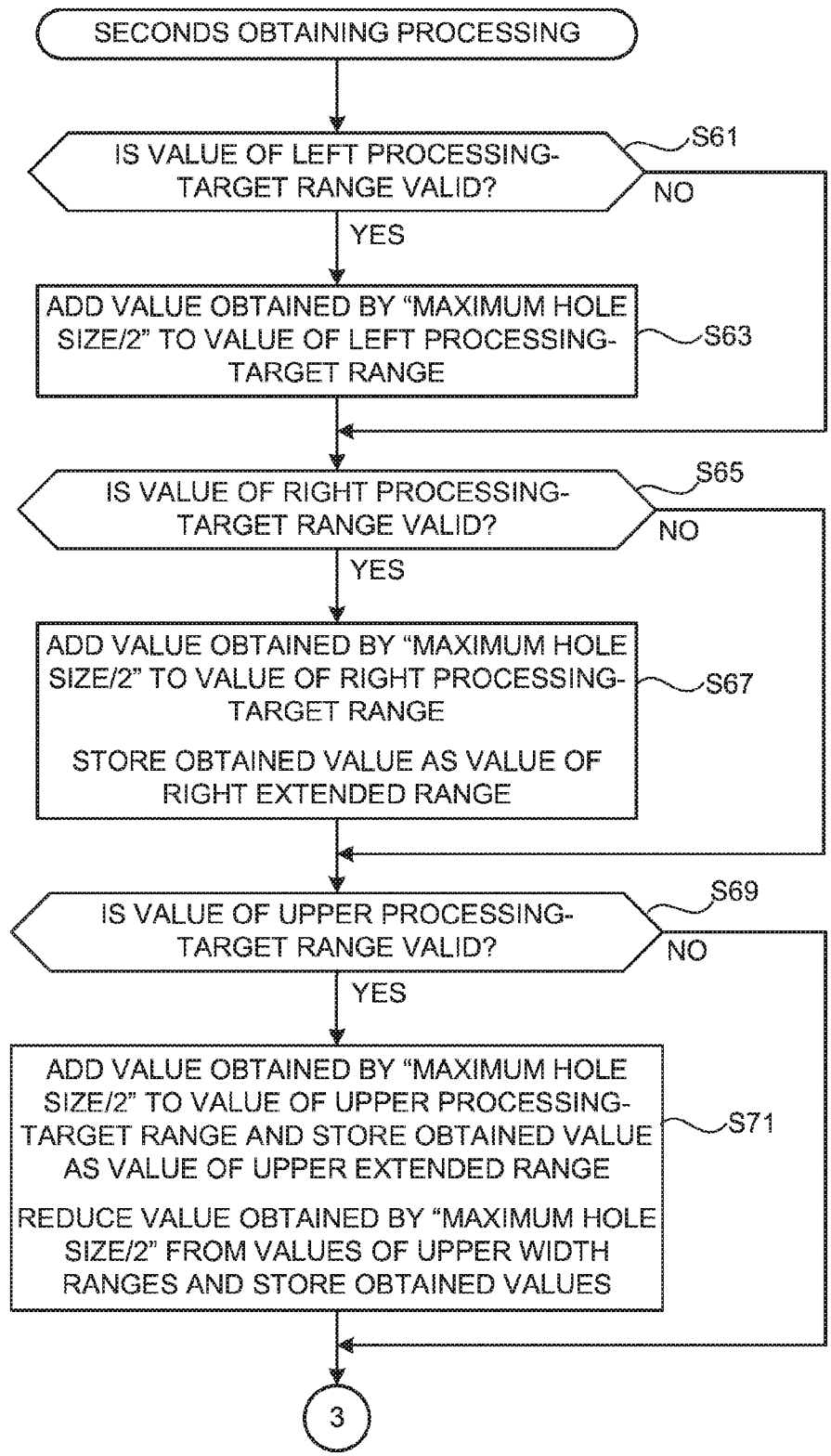
FIGS. 11A and 11B are flowcharts depicting an example of second obtaining processing in the illustrative embodiment according to one or more aspects of the disclosure.
Figure 11B:
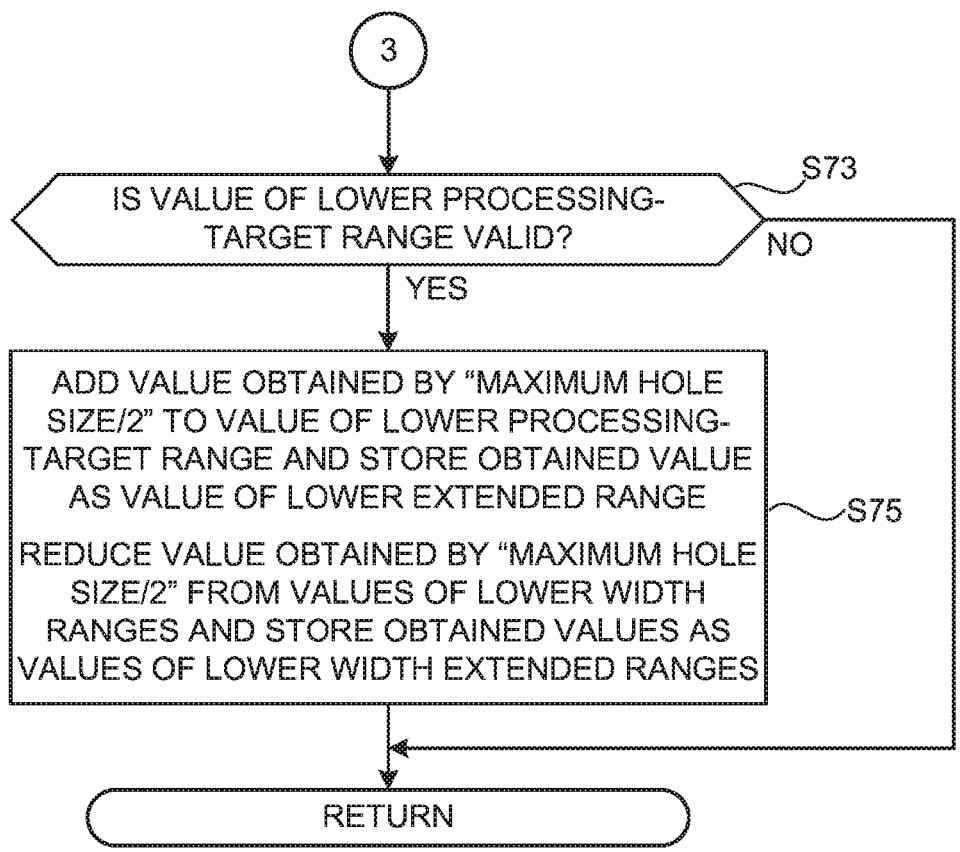

As depicted in FIGS. 5A and 5B, subsequent to the first obtaining processing (e.g., step S3), the CPU 21 executes second obtaining processing (refer to FIGS. 11A and 11B) (e.g., step S5). Referring to FIGS. 11A and 11B, the second obtaining processing will be described in detail. The CPU 21 determines, based on the value of the left processing-target range, whether the left processing-target range in the third table 243 is valid (e.g., step S61). When the left processing-target range has a value other than "0", the CPU 21 determines that the left processing-target range is valid (e.g., YES in step S61). The CPU 21 adds a value obtained by division of the maximum hole size in the setting information by "2" (hereinafter, referred to as "maximum hole size/2") to the value of the left processing-target range and stores the obtained value as a value of a left extended range in the third table 243 (e.g., step S63). Thus, a left extended area that the left processing-target area is extended rightward is defined by the left extended range. Subsequent to step S63, the routine proceeds to step S65. When the left processing-target range has a value of "0" (e.g., NO in step S61), the routine proceeds to step S65.

The CPU 21 determines, based on the value of the right processing-target range, whether the right processing-target range in the third table 243 is valid (e.g., step S65). When the right processing-target range has a value other than "0", the CPU 21 determines that the right processing-target range is valid (e.g., YES in step S65). The CPU 21 adds the value obtained by "maximum hole size/2" to the value of the right processing-target range and stores the obtained value as a value of a right extended range in the third table 243 (e.g., step S67). Thus, a right extended area that the right processing-target area is extended leftward is defined by the right extended range. Subsequent to step S67, the routine proceeds to step S69. When the right processing-target range has a value of "0" (e.g., NO in step S65), the routine proceeds to step S69.

The CPU 21 determines, based on the value of the upper processing-target range, whether the upper processing-target range in the third table 243 is valid (e.g., step S69). When the upper processing-target range has a value other than "0", the CPU 21 determines that the upper processing-target range is valid (e.g., YES in step S69). The CPU 21 adds the value obtained by "maximum hole size/2" to the value of the upper processing-target range and stores the obtained value as a value of an upper extended range in the third table 243 (e.g., step S71). The CPU 21 also reduces the value obtained by "maximum hole size/2" from the value of the upper width range (left) and stores the obtained value as a value of an upper width extended range (left) in the third table 243 (e.g., step S71). The CPU 21 also reduces the value obtained by "maximum hole size/2" from the value of the upper width range (right) and stores the obtained value as a value of an upper width extended range (right) in the third table 243 (e.g., step S71). Thus, an upper extended area that the upper processing-target area is extended downward, leftward, and rightward is defined by the upper extended range, the upper width extended range (left), and the upper width extended range (right). Subsequent to step S71, the routine proceeds to step S73. When the upper processing-target range has a value of "0" (e.g., NO in step S69), the routine proceeds to step S73.

The CPU 21 determines, based on the value of the lower processing-target range, whether the lower processing-target range in the third table 243 is valid (e.g., step S73). When the lower processing-target range has a value other than "0", the CPU 21 determines that the lower processing-target range is valid (e.g., YES in step S73). The CPU 21 adds the value obtained by "maximum hole size/2" to the value of the lower processing-target range and stores the obtained value as a value of a lower extended range in the third table 243 (e.g., step S75). The CPU 21 also reduces the value obtained by "maximum hole size/2" from the value of the lower width range (left) and stores the obtained value as a value of a lower width extended range (left) in the third table 243 (e.g., step S75). The CPU 21 also reduces the value obtained by "maximum hole size/2" from the value of the lower width range (right) and stores the obtained value as a value of a lower width extended range (right) in the third table 243 (e.g., step S75). Thus, a lower extended area that the lower processing-target area is extended upward, leftward, and rightward is defined by the lower extended range, the lower width extended range (left), and the lower width extended range (right). Subsequent to step S75, the CPU 21 ends the second obtaining processing and the routine returns to the main processing (refer to FIGS. 5A and 5B). When the lower processing-target range has a value of "0" (e.g., NO in step S73), the CPU 21 ends the second obtaining processing and the routine returns to the main processing (refer to FIGS. 5A and 5B).

The second obtaining processing will be described in detail using a specific example. It is assumed that the left processing-target area 43A, the right processing-target area 43B, the upper processing-target area 43E, and the lower processing-target area 43F are defined. As depicted in (B) of FIG. 10, when the value obtained by "maximum hole size/2" is added to the left processing-target range (e.g., step S63), a right boundary of the left processing-target area 43A is shifted rightward by the amount of "maximum hole size/2". Therefore, as depicted in (C) of FIG. 10, a left extended area 43G that the left processing-target area 43A is extended rightward is defined. When the value obtained by "maximum hole size/2" is added to the value of the right processing-target range (e.g., step S67), a left boundary of the right processing-target area 43B is shifted leftward by the amount of "maximum hole size/2". Therefore, a right extended area 43H that the right processing-target area 43B is extended leftward is defined. That is, each of the left extended area 43G and the right extended area 4314 is defined by inward shifting of an inner boundary of a corresponding one of the left processing-target area 43A and the right processing-target area 43B. The inner boundary of each of the left processing-target area 43A and the right processing-target area 43B may be an opposite end to an end (e.g., an outer boundary) that corresponds to one of the four sides of the original image 4 in the right-left direction.

When the value obtained by "maximum hole size/2" is added to the value of the upper processing-target range and reduced from each value of the upper-width processing-target range (left) and the upper-width processing-target range (right) (e.g., step S71), a lower boundary of the upper processing-target area 43E is shifted downward by the amount of "maximum hole size/2", a left boundary of the upper processing-target area 43E is shifted leftward by the amount of "maximum hole size/2", and a right boundary of the upper processing-target area 43E is shifted rightward by the amount of "maximum hole size/2". Therefore, an upper extended area 43I that the upper processing-target area 43E is extended downward, leftward, and rightward is defined. When the value obtained by "maximum hole size/2" is added to the value of the lower processing-target range and reduced from each value of the lower-width processing-target range (left) and the lower-width processing-target range (right) (e.g., step S75), an upper boundary of the lower processing-target area 43F is shifted upward by the amount of "maximum hole size/2", a left boundary of the lower processing-target area 43F is shifted leftward by the amount of "maximum hole size/2", and a right boundary of the lower processing-target area 43F is shifted rightward by the amount of "maximum hole size/2". Therefore, a lower extended area 43J that the lower processing-target area 43F is extended upward, leftward, and rightward is defined. That is, each of the upper extended area 43I and the lower extended area 43J is defined by inward shifting of an inner boundary of each of the upper processing-target area 43E and the lower processing-target area 43F. The inner boundary of each of the upper processing-target area 43E and the lower processing-target area 43F may be an opposite end to an end (e.g., an outer boundary) that corresponds to one of the four sides of the original image 4 in the up-down direction.

As depicted in FIGS. 5A and 5B, subsequent to the second obtaining processing (e.g., step S5), the CPU 21 obtains, based on the processing-target range information (refer to FIG. 4), a partial image of each extended area from the original image (refer to FIGS. 6A and 6B) represented by the original image data, and extracts (e.g., generates) partial image data representing a respective partial image (e.g., step S7). The CPU 21 stores, in the fourth table 244 (refer to FIGS. 6A and 6B), the plurality of pieces of partial image data representing the respective partial images extracted from the original image.

Step S7 will be described in detail using a specific example. As depicted in (C) of FIG. 10, it is assumed that the left extended area 43Q the right extended area 43H, the upper extended area 43I, and the lower extended area 43J are defined. In (C) of FIG. 10, the left extended area 43G is defined as an area located to the left of a dashed line 421, which extends in the upper-lower direction and is positioned to the right of the left end of the original image 4 while being spaced from the left end of the original image 4 by the left extended range (Prg(ex-left)). The right extended area 43H is defined as an area located to the right of a dashed line 422, which extends in the upper-lower direction and is positioned to the left of the right end of the original image 4 while being spaced from the right end of the original image 4 by right extended range (Prg(ex-right)). The upper extended area 43I is defined as an area located above a dashed line 423, to the right of a dashed line 424, and to the left of a dashed line 425. The dashed line 423 extends in the right-left direction and is positioned below the upper end of the original image 4 while being spaced from the upper end of the original image 4 by the upper extended range (Pre (ex-upper)). The dashed line 424 extends in the upper-lower direction and is positioned to the right of the left end of the original image 4 while being spaced from the left end of the original image 4 by the upper width extended range (left) (Prg(ex-wupper) (l)). The dashed line 425 extends in the upper-lower direction and is positioned to the left of the right end of the original image 4 while being spaced from the right end of the original image 4 by the upper width extended range (right) (Prg(ex-wupper)(r)). The lower extended area 43J is defined as an area located below a dashed line 426, to the right of a dashed line 427, and to the left of a dashed line 428. The dashed line 426 extends in the right-left direction and is positioned above the lower end of the original image 4 while being spaced from the lower end of the original image 4 by the lower specified range (Prg(lower)). The dashed line 427 extends in the upper-lower direction and is positioned to the right of the left end of the original image 4 while being spaced from the left end of the original image 4 by the lower width extended range (left) (Prg(ex-wlower)(l)). The dashed line 428 extends in the upper-lower direction and is positioned to the left of the right end of the original image 4 while being spaced from the right end of the original image 4 by the lower width extended range (right) (Prg(ex-wlower) (r)).

The CPU 21 extracts data representing an image of the left extended area 43G of the original image 4 as partial image data, based on the left extended range in the third table 243. The CPU 21 extracts data representing an image of the right extended area 43H of the original image 4 as partial image data, based on the right extended area in the third table 243. The CPU 21 extracts data representing an image of the upper extended area 43I of the original image 4 as partial image data, based on the upper extended range and the upper width extended range in the third table 243. The CPU 21 extracts data representing an image of the lower extended area 43J of the original image 4 as partial image data, based on the lower extended range and the lower width extended range in the third table 243.

Figure 12:
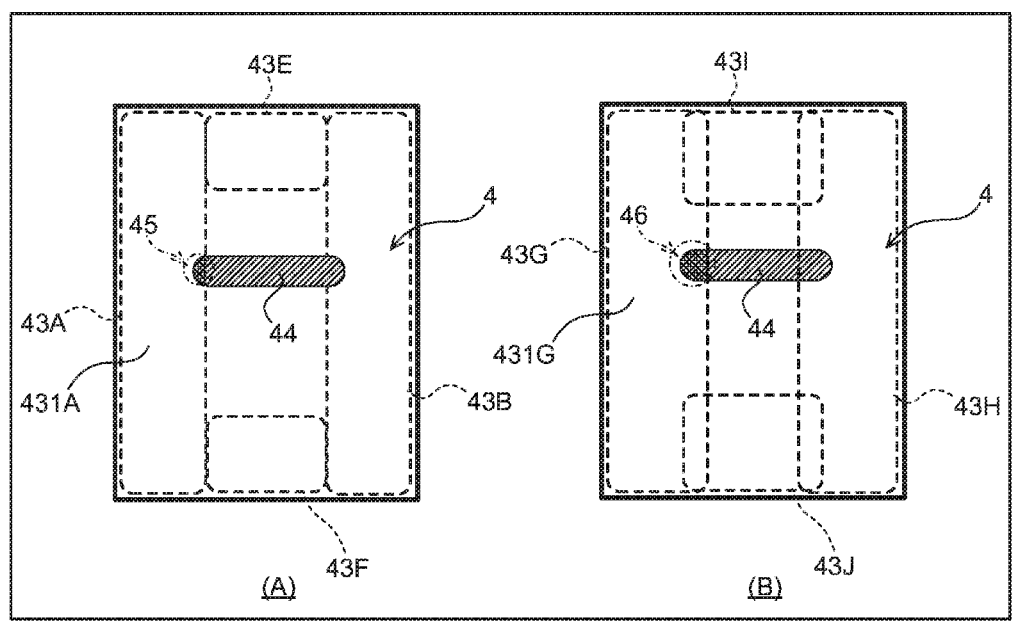
FIG. 12 is an explanatory diagram for explaining how to determine a punched-hole image based on extended processing-target areas in the illustrative embodiment according to one or more aspects of the disclosure.

For reasons below, the extended areas are defined by extension of the processing-target areas through the second obtaining processing (refer to FIGS. 11A and 11B). As depicted in (A) of FIG. 12, if processing is performed on an object (e.g., an oval object) 44 included in the original image 4 based on a partial image 431A corresponding to the left processing-target area 43A, the partial image 431A includes a portion (e.g., a portion indicated by an arrow 45) of the oval object 44. In this case, the portion of the oval object 44 has a similar shape to an expected punched-hole image, whereby the CPU 21 may determine the oval object 44 as a punched-hole image mistakenly. On the contrary to the above case, as depicted in (B) of FIG. 12, when processing is performed on the oval object 44 included in the original image 4 based on a partial image 431G corresponding to the left extended area 43G, the partial image 431G includes a greater portion (e.g. a portion indicated by an arrow 46) of the oval object 44 than the partial image 431A. In this case, the portion of the oval object 44 has a greater dimension than an expected punched-hole image in the width direction. Therefore, the CPU 21 may be able to appropriately determine that the oval object 44 is not a punched-hole image.

<Stage B2: Punched-Hole Image Separation Processing>

As depicted in FIGS. 5A and 5B, subsequent to step S7, the CPU 21 selects one of the plurality of pieces of partial image data stored in the fourth table 244 (refer to FIGS. 6A and 6B) (e.g., step S9). Hereinafter, the partial image data selected in step S9 may be referred to as "selected partial image data" and a partial image represented by the selected partial image data may be referred to as a "selected partial image". The CPU 21 executes punched-hole image separation processing (refer to FIGS. 13 and 14) based on the selected partial image data (e.g., step S11).

Figure 13:
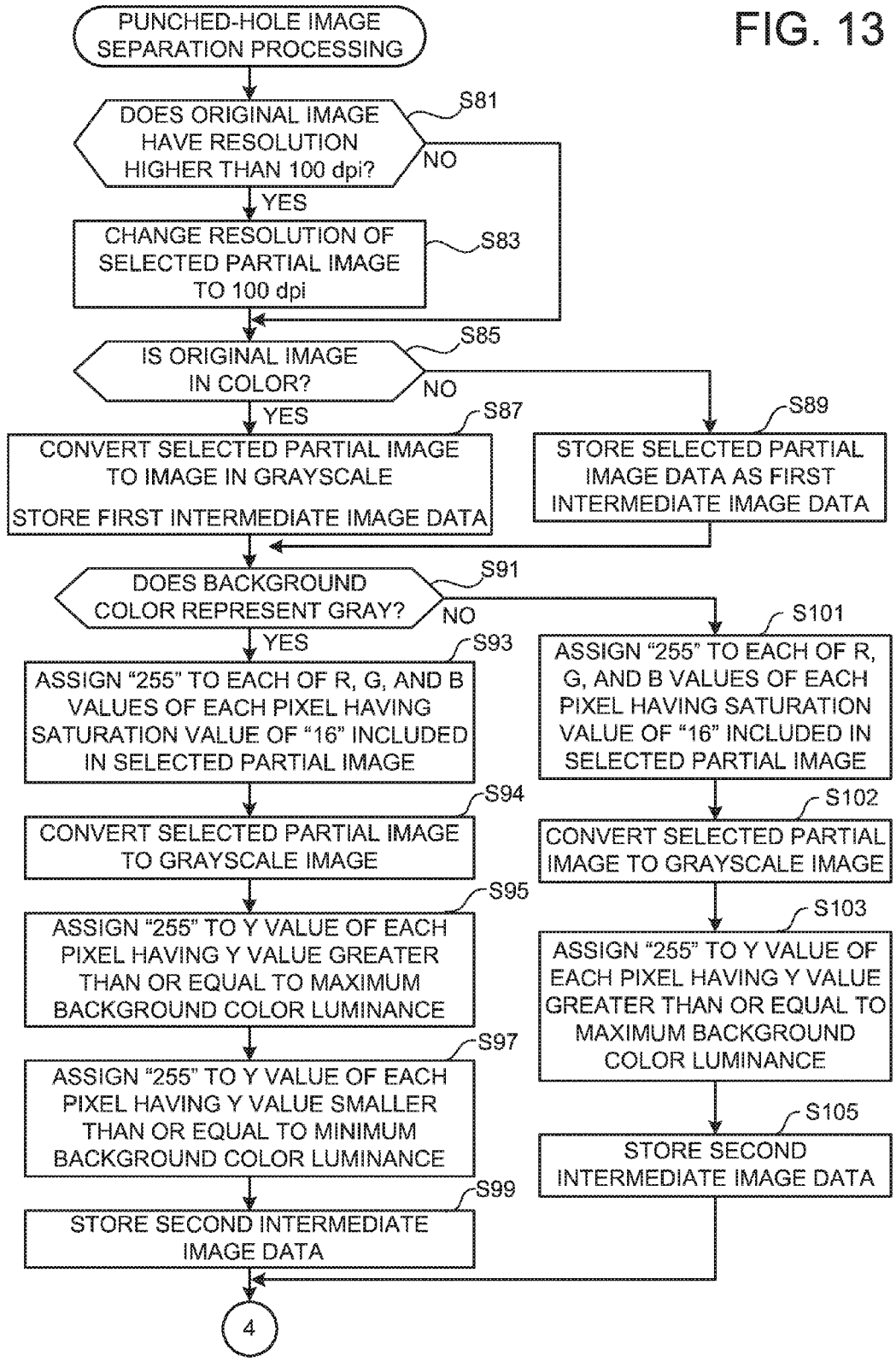
FIG. 13 is a flowchart depicting an example of punched-hole image separation processing in the illustrative embodiment according to one or more aspects of the disclosure.

Referring to FIG. 13, the punched-hole image separation processing will be described in detail. The CPU 21 determines, based on the resolution in the attribution information (refer to FIG. 2), whether the original image has a resolution higher than 100 dpi (e.g., step S81). When the CPU 21 determines that the original image has a resolution higher than 100 dpi (e.g., YES in step S81), the CPU 21 changes a resolution of the selected partial image to 100 dpi (e.g., step S83). Changing the resolution of the selected partial image to 100 dpi may enable reduction of a load of subsequent processing. Subsequent to step S83, the routine proceeds to step S85. When the CPU 21 determines that the original image has a resolution lower than or equal to 100 dpi (e.g., NO in step S81), the routine proceeds to step S85.

The CPU 21 determines, based on the color in the attribution information (refer to FIG. 2), whether the original image is in color (e.g., step S85). When the CPU 21 determines that the original image is in color (e.g., YES in step S85), the CPU 21 converts the selected partial image to an image in grayscale (hereinafter, referred to as a "grayscale image") (e.g., step S87). For example, the CPU 21 calculates, based on red ("R"), green ("G"), and blue ("B") values of each pixel included in the selected partial image, a Y value (e.g., a luminance value) of each of the pixels by applying Equation (1). Note that ">>10" indicates a bit shift operation of shifting to right by ten bits, i.e., multiplying by "$2^{-10}$ ($=1/1024$)".

$$Y \text{ value(luminance value)} = (306 \times R + 601 \times G + 117 \times B) >> 10 \quad (1)$$

The CPU 21 assigns each of the obtained Y values to a corresponding one of the pixels, as a replacement for its R, G, and B values (i.e., the CPU 21 replaces a pixel value with a corresponding Y value), thereby converting the selected partial image to a grayscale image. For example, when each pixel included in the original image has a total data amount of 24 bits in which each pixel has an R value of 8 bits, a G value of 8 bits, and a B value of 8 bits, a data amount of each pixel included in the selected partial image after conversion to a grayscale image has a Y value of 8 bits. Hereinafter, the selected partial image data converted in step S87 may be referred to as "first intermediate image data" and an image corresponding to the first intermediate image data may be referred to as a "first intermediate image". The CPU 21 stores the first intermediate image data in the fourth table 244 (refer to FIGS. 6A and 6B) in association with the selected partial image data (e.g., step S87). Subsequent to step S87, the routine proceeds to step S91.

When the CPU 21 determines that the original image is a grayscale image (e.g., NO in step S85), the CPU 21 stores the selected partial image data in the fourth table 244, as first intermediate image data, in association with the selected partial image data (e.g., step S89). In this case, the first intermediate image data is generated by duplication of the selected partial image data. Subsequent to step S89, the routine proceeds to step S91.

The CPU 21 determines whether the background color (refer to FIG. 3) in the setting information represents gray (e.g., step S91). When the CPU 21 determines that the background color represents gray (e.g., YES in step S91), the CPU 21 calculates, based on the R, and B values of each pixel included in the selected partial image, a chroma value (e.g., a blue-difference value (e.g., a Cb value) and a red-difference value (e.g., a Cr value)) of each of the pixels by applying Equations (2) and (3).

$$Cb = (-174 \times R - 338 \times G + 512 \times B) >> 10 \quad (2)$$

$$Cr = (512 \times R - 430 \times G - 82 \times B) >> 10 \quad (3)$$

Then, the CPU 21 calculates a saturation value of each of the pixels using a corresponding one of obtained pairs of Cb and Cr values by applying Equation (4).

$$\text{Saturation value} = \sqrt{(Cb \text{ value}^2 + Cr \text{ value}^2)} \quad (4)$$

The CPU 21 extracts one or more pixels having a saturation value of "16" or greater from the pixels included in the selected partial image. The CPU 21 assigns a value of "255" to each of the R, G, and B values of the one or more extracted pixels (e.g., step S93). Therefore, the CPU 21 excludes the one or more pixels having a saturation value of "16" or greater from targets of punched-hole image detection. Hereinafter, assigning a value of "255" to each of the R, G, and B values of the one or more extracted pixels may also be referred to as "eliminating a pixel". Since the image of the background member detected as a punched-hole image in the selected partial image has achromatic color (e.g., gray), any pixel having a saturation value of "16" or greater might not correspond to the image of the background member. Therefore, one or more pixels having a saturation value of "16" or greater may be excluded from the targets of punched-hole image detection.

In the illustrative embodiment, Equations (1), (2), (3), and (4) are used as a specific example of the calculation based on a YCbCr color space. In other embodiments, for example, a parameter may be calculated based on another color space, e.g., an RGB color space. In this case, other equations may be used. The threshold (e.g., "16") for saturation value may be changed to another value in accordance with the color space to be used.

Subsequent to step S93, the CPU 21 converts the selected partial image on which step S93 has been executed, to a grayscale image (e.g., step S94). In step S94, the selected partial image may be converted to a grayscale image in the same or similar manner to step S87. The CPU 21 extracts one or more pixels having a Y value (e.g., a luminance value) greater than or equal to the maximum background color luminance (refer to FIG. 3) in the setting information from the pixels included in the selected partial image on which step S94 has been executed. The CPU 21 assigns a value of "255" to each of the one or more extracted pixels as their Y value (e.g., a luminance value) to eliminate the extracted one or more pixels (e.g., step S95). Since a luminance range of the background member detected as a punched-hole image in the selected partial image is smaller than the maximum background color luminance, any pixel having a luminance value greater than or equal to the maximum background color luminance is eliminated. Therefore, the pixel having a luminance value greater than or equal to the maximum background color luminance might not correspond to the image of the background member, whereby the pixel having a luminance value greater than or equal to the maximum background color luminance may be excluded from the targets of punched-hole image detection.

Subsequent to step S95, the CPU 21 extracts one or more pixels having a Y value (e.g., a luminance value) smaller than or equal to the minimum background color luminance (refer to FIG. 3) in the setting information from the pixels included in the selected partial image on which step S95 has been executed. The CPU 21 assigns a value of "255" to each of the one or more extracted pixels as their Y value (e.g., a luminance value) (e.g., step S97). Since a luminance range of the background member detected as a punched-hole image in the selected partial image includes values greater than the minimum background color luminance, any pixel having a luminance value smaller than or equal to the minimum background color luminance is eliminated. Therefore, the pixel having a luminance value smaller than or equal to the minimum background color luminance might not correspond to the image of the background member, whereby the pixel having a luminance value smaller than or equal to the minimum background color luminance may be excluded from the targets of punched-hole image detection.

The partial image converted through steps S93, S94, S95, and S97 may also be referred as a "second intermediate image". Data representing the second intermediate image may be referred to as "second intermediate image data". In other words, the second intermediate image data is generated from the selected partial image data through steps S93, S94, S95, and S97. Subsequent to step S97, the CPU 21 stores the second intermediate image data in the fourth table 244 (refer to FIGS. 6A and 6B) in association with the selected partial image data (e.g., step S99). Subsequent to step S99, the routine proceeds to step S107 (refer to FIG. 14).

When the CPU 21 determines that the background color (refer to FIG. 3) in the setting information represents white (e.g., NO in step S91), the CPU 21 calculates, based on the R, G, and B values of each pixel included in the selected partial image, a Cb value and a Cr value of each of the pixels by applying Equations (2) and (3). Then, the CPU 21 calculates a saturation value of each of the pixels using a corresponding one of obtained pairs of Cb and Cr values by applying Equation (4). The CPU 21 extracts one or more pixels having a saturation value of "16" or greater from the pixels included in the selected partial image. The CPU 21 assigns a value of "255" to each of the R, G, and B values of the one or more extracted pixels to eliminate the extracted one or more pixels (e.g., step S101). Any pixel having a saturation value of "16" or greater is eliminated for the same reason as for the case where the background color represents gray.

Subsequent to step S102, the CPU 21 converts the selected partial image on which step S101 has been executed, to a grayscale image (e.g., step S102). In step S102, the selected partial image may be converted to a grayscale image in the same or similar manner as step S87. The CPU 21 extracts one or more pixels having a Y value (e.g., a luminance value) greater than or equal to the maximum background color luminance (refer to FIG. 3) in the setting information from the pixels included in the selected partial image on which step S102 has been executed. The CPU 21 assigns a value of "255" to each of the one or more extracted pixels as their Y value (e.g., a luminance value) to eliminate the extracted one or more pixels (e.g., step S103). Any pixel having a Y value (e.g., a luminance value) greater than or equal to the maximum background color luminance is eliminated for the same reason as for the case where the background color represents gray. Hereinafter, the selected partial image on which steps S101, S102, and S103 have been executed may be also referred to as a "second intermediate image". Data representing the second intermediate image may be referred to as "second intermediate image data". Subsequent to step S103, the CPU 21 stores the second intermediate image data in the fourth table 244 (refer to FIGS. 6A and 6B) in association with the selected partial image data (e.g., step S105). Subsequent to step S105, the routine proceeds to step S107 (refer to FIG. 14).

In contrast to the case where the background color represents gray, when the background color represents white, a pixel having a luminance value smaller than or equal to the minimum background color luminance might not be eliminated. In a case that the background color represents white and the ground color of the original image is also white, it may be possible to detect a punched-hole image based on only an outline representing a shadow cast along an edge of a corresponding punched hole. Accordingly, any pixel having a luminance value smaller than or equal to the minimum background color luminance is not eliminated so as not to eliminate one or more pixels representing the outline. In a case that the background color represents gray and the ground color of the original image is white, it may be possible to detect a punched-hole image based on a color boundary between the background color (e.g., gray) of the background member and the ground color (e.g., white) of the original image. Therefore, in this case, elimination of one or more pixels having a luminance value smaller than or equal to the minimum background color luminance might not influence punched-hole image detection.

Figure 14:
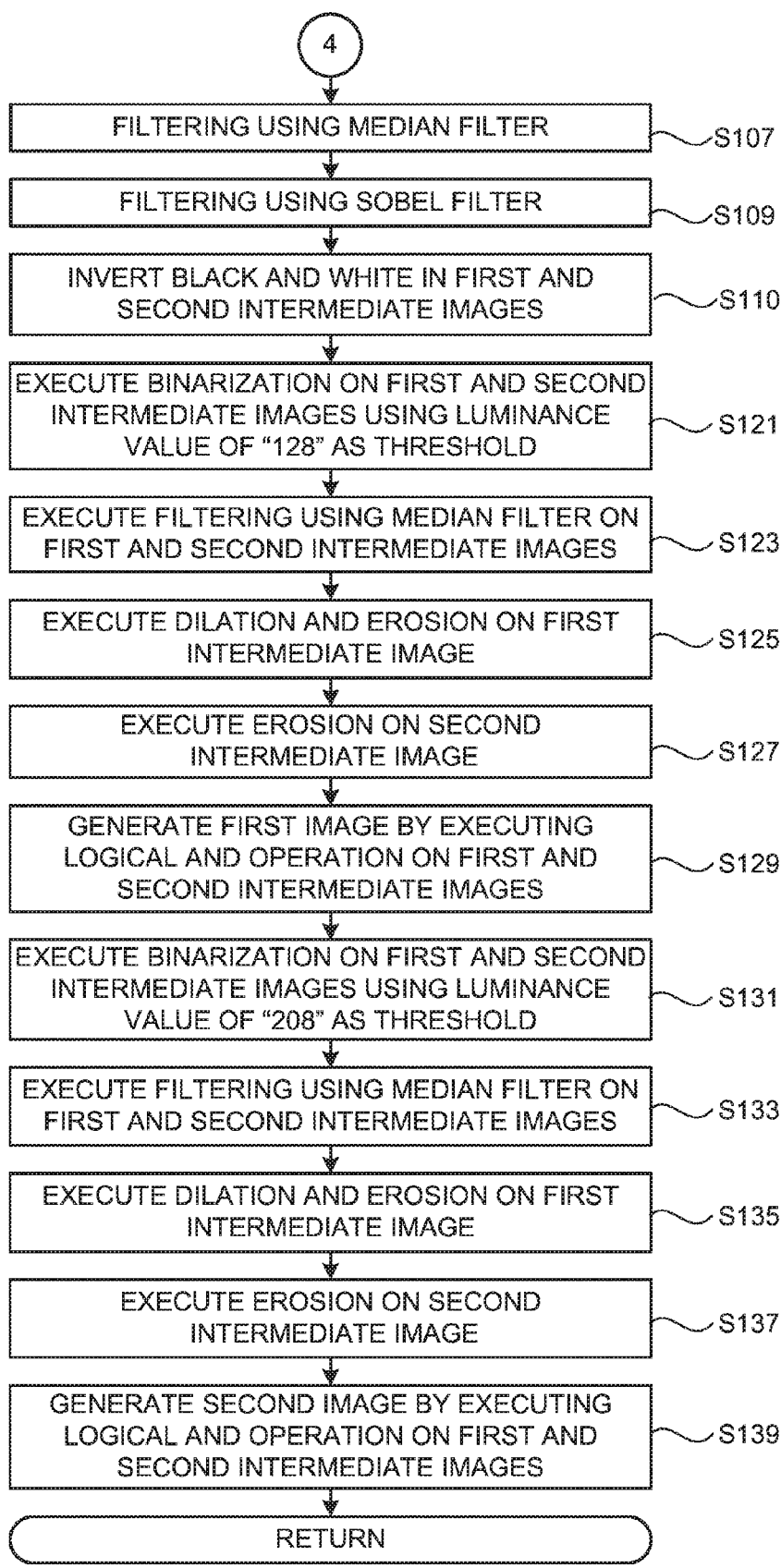
FIG. 14 is a continuation of the flowchart of FIG. 13 depicting the example of punched-hole image separation processing in the illustrative embodiment according to one or more aspects of the disclosure.

Subsequent to step S99 or S105, the CPU 21 executes filtering using a known median filter, on each of the first and second intermediate images based on the first intermediate image data and the second intermediate image data each stored in the fourth table 244 in association with the selected partial image data (e.g., step S107 in FIG. 14). In the median filter, a filter region including pixels to be used for calculating a median value might not be limited to a specific example. The filter region may be any n×n ("n" is an arbitrary integer, e.g., "3") pixel region including a target pixel at its center. Through filtering using the median filter, noise may be removed from each of the first image and the second image.

Subsequent to step S107, the CPU 21 executes another filtering using a known Sobel filter on each of the first and second intermediate images on which step S107 has been executed (e.g., each of the median-filtered first and second intermediate images) (e.g., step S109). Any known matrix and coefficient may be used in the Sobel filter. In the illustrative embodiment, for example, the Sobel filter using a 3×3 pixel filter region for edge detection in an x-axis direction and the Sobel filter using a 3×3 pixel filter region for edge detection in a y-axis direction may be both performed on each of the median-filtered first and second intermediate images. The CPU 21 implements filtering in step S109 by calculating a route-sum-square of an edge intensity obtained through the Sobel filter.

Filtering using the Sobel filter is an example of edge enhancement for enhancing an edge in an image. In other embodiments, for example, another known filter (e.g., the Laplacian filter) for implementing edge detection (or enhancement) may be used in step S109 instead of the Sobel filter. An edge is enhanced in each of the first intermediate image and the second intermediate image by filtering using the Sobel filter.

Subsequent to step S109, the CPU 21 inverts black and white in each of the first intermediate image and the second intermediate image on which step S109 has been executed (e.g., step S110). Subsequent to step S110, the routine proceeds to step S121.

The CPU 21 executes binarization on each of the first and second intermediate images on which step S110 (refer to FIG. 14) has been executed (e.g., step S121). In binarization in step S121, a luminance value of "128" may be used as a first threshold. The luminance value of "128" (e.g., the first threshold) represents a median value of values between the minimum luminance value (e.g., "0") and the maximum luminance value (e.g., "255"). Since black and white has been inverted in each of the first and second intermediate images in step S110 (refer to FIG. 14), the minimum luminance value of "0" after binarization represents a luminance value of the color corresponding to the outline of the punched-hole image (hereinafter, referred to as a "first color"). The maximum luminance value of "255" after binarization represents a luminance value of the color not corresponding to the outline of the punched-hole image (hereinafter, referred to as a "second color").

In other embodiments, for example, the luminance value range for binarization might not be limited to a range of "0 to 255", and another value range may be used. Therefore, the minimum luminance value corresponding to the first color after binarization might not also be limited to "0" but may be another value, and the maximum luminance value corresponding to the second color after binarization might not also be limited to "255" but may be another value. In another example, a luminance value may correspond to one of binary values of "0" (e.g., corresponding to the first color) and "1" (e.g., corresponding to the second color).

Subsequent to step S121, the CPU 21 executes another filtering using the known median filter on each of the first and second intermediate images on which binarization has been executed in step S121 (e.g., step S123). Subsequent to step S123, the CPU 21 executes a known dilation on the first intermediate image on which filtering has been executed in step S123 and then executes a known erosion on the dilated first intermediate image (e.g., step S125). That is, a known closing is executed on the first intermediate image. The CPU 21 executes the known dilation on the second intermediate image on which filtering has been executed in step S123 (e.g., step S127). Nevertheless, erosion might not be executed on the second intermediate image in contrast to the case of the first intermediate image. Each data generated through steps S121 to S127 may be temporary data newly generated apart from the original first intermediate image data and the original second intermediate image data, thereby not influencing the original first intermediate image data and the original second intermediate image data.

Subsequent to step S127, the CPU 21 generates a first image by executing a logical AND operation on the first intermediate image on which step S125 has been executed and the second intermediate image on which step S127 has been executed (e.g., step S129). For example, the CPU 21 compares luminance values between pixels coinciding in the first intermediate image and the second intermediate image (hereinafter, referred to as "coinciding pixels") in each coinciding pixel pair. When each of the coinciding pixels has a luminance value of "0", the CPU 21 assigns "0" to a luminance value of their corresponding pixel in the first image. When one of the coinciding pixels has a luminance value of "255", the CPU 21 assigns "255" to a luminance value of their corresponding pixel in the first image. The CPU 21 stores first image data representing the generated first image in the fourth table 244 (refer to FIGS. 6A and 6B) in association with the selected partial image data. Subsequent to step S129, the routine proceeds to step S131.

The CPU 21 executes binarization on each of the first and second intermediate images on which step S110 (refer to FIG. 14) has been executed (e.g., step S131). In binarization in step S131, a luminance value of "208" may be used as a second threshold. The second threshold, e.g., the luminance value "208", is farther from the minimum luminance value of "0" than the median value of "128" between the minimum luminance value of "0" and the maximum luminance value of "255". Since black and white are inverted in each of the first and second intermediate images in step S110, the luminance value of "208" may be farther from the luminance value corresponding to the first color (e.g., the luminance value of "0") corresponding to the outline of the punched-hole image.

Subsequent to step S131, the CPU 21 executes another filtering on each of the first and second intermediate images on which binarization has been executed in S131, using the known median filter (e.g., step S133). Subsequent to step S133, the CPU 21 executes the known dilation on the first intermediate image on which filtering has been executed in step S133 and then executes the known erosion on the dilated first intermediate image (e.g., step S135). Subsequent to step S135, the CPU 21 executes the known dilation on the second intermediate image on which filtering has been executed in step S133 (e.g., step S137). That is, similar to the case where binarization is executed using the luminance value of "128" as the first threshold, erosion might not be executed on the second intermediate image either. Each data generated through steps S131 to S137 may also be temporary data newly generated apart from the original first intermediate image data and the original second intermediate image data, thereby not influencing the original first intermediate image data and the original second intermediate image data.

Subsequent to step S137, the CPU 21 generates a second image by executing a logical AND operation on the first intermediate image on which step S135 has been executed and the second intermediate image on which step S137 has been executed (e.g., step S139). The CPU 21 stores second image data representing the generated second image in the fourth table 244 (refer to FIGS. 6A and 6B) in association with the selected partial image data. Subsequent to this, the CPU 21 ends the punched-hole image separation processing and thus the routine returns to the main processing (refer to FIGS. 5A and 5B).

While the first image is generated through binarization in which the luminance value of "128" is used as the threshold, the second image is generated through binarization in which another threshold (e.g., the luminance value of "208") is used. The luminance value of "208" is farther from the luminance value corresponding to the first color which is the color of the punched-hole image. Therefore, as compared with the first image, a punched-hole image having a relatively lighter color (i.e., a low contrast) in the original image may easily appear in the second image. In addition, another image (e.g., noise) other than the punched-hole image may also easily appear in the second image.

The punched-hole image separation processing will be described in detail using specific examples. In the description below, while processing for generating a first image (e.g., steps S121 to S129) will be described, a description for processing for generating a second image (e.g., steps S131 to S139) will be omitted. For the sake of convenience, unless otherwise specified, black-and-white inversion in step S110 (refer to FIG. 14) is not executed in the specific examples.

Figure 15:
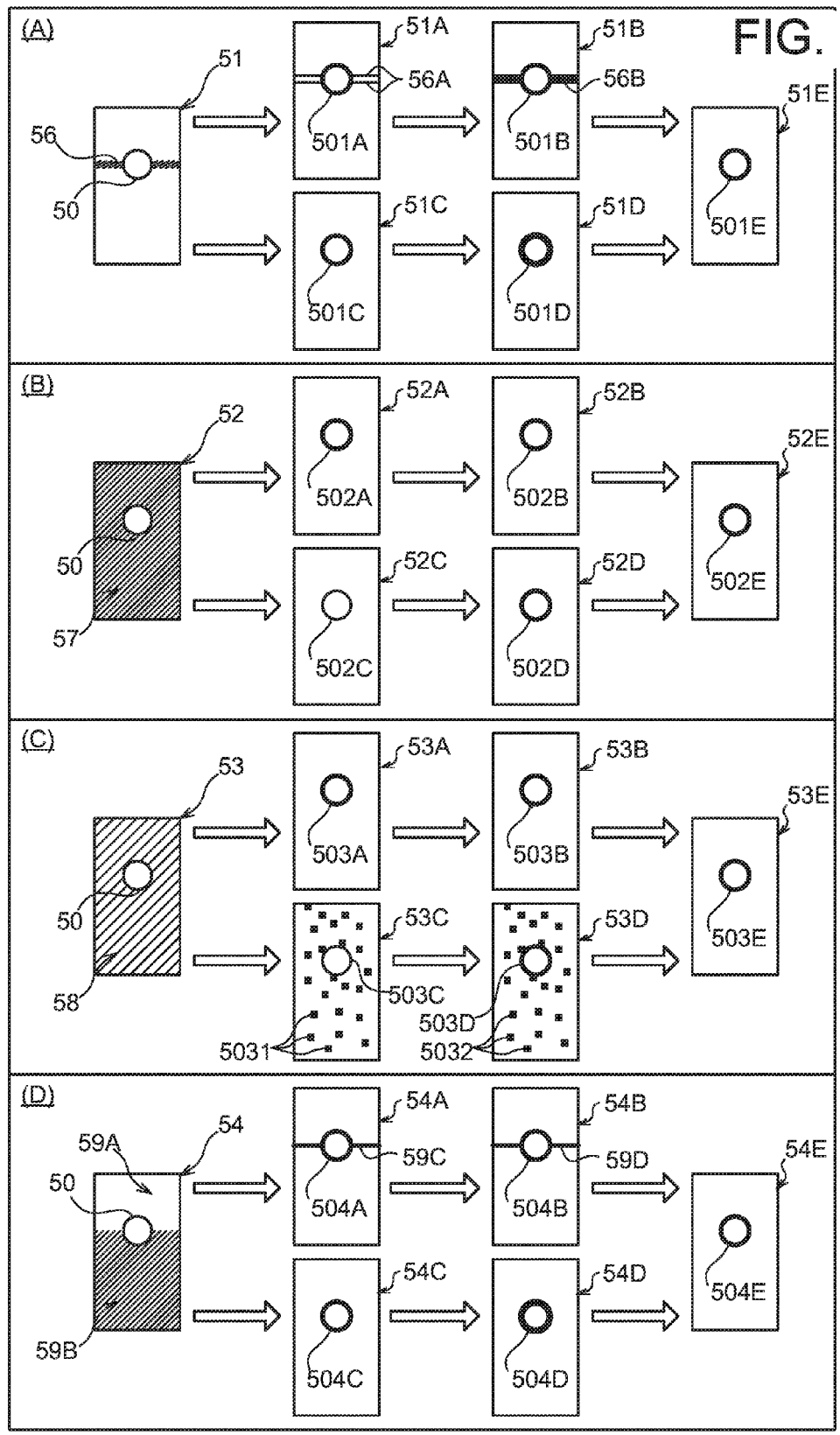
FIG. 15 illustrates how to generate a first image in the illustrative embodiment according to one or more aspects of the disclosure.

As depicted in (A) of FIG. 15, it is assumed that a partial image 51 having a ground color of white includes an object (e.g., a lateral line) 56 overlapping a punched-hole image 50 and having color that meets one of the following conditions (a), (b), and (c):

(a) A saturation value is greater than "16";

(b) A luminance value is greater than or equal to the maximum background color luminance; and (c) A luminance value is smaller than or equal to the minimum background color luminance.

In this case, the first intermediate image generated in step S87 or S89 (refer to FIG. 13) includes the lateral line 56 in grayscale. Through filtering (refer to steps S107 and S109) and binarization (refer to step S121), a first intermediate image 51A is generated. Through the filtering using the Sobel filter, edges are detected in the first intermediate image. Therefore, the first intermediate image 51A includes an outline 501A of the punched-hole image 50. In some cases, the first intermediate image 51A may further include two boundary lines 56A representing boundaries between the lateral line 56 and the blank portion of the ground. Then, another filtering (refer to step S123), dilation and erosion (refer to step S125) are executed on the first intermediate image 51A to generate a first intermediate image 51B. In a case that the boundary lines 56A are spaced apart from each other by an amount of one pixel, white pixels located between the boundary lines 56A are converted to black pixels by dilation and erosion. Therefore, in the first intermediate image 51B, a lateral line 56 overlaps an outline 501B corresponding to the punched-hole image.

When a second intermediate image is generated, one or more pixels having a saturation value of "16" or greater are eliminated in step S93 or S101 (refer to FIG. 13). Further, one or more pixels having a luminance value greater than or equal to the maximum background color luminance are eliminated in step S95 or S103 (refer to FIG. 13). Then, one or more pixels having a luminance value smaller than or equal to the minimum background color luminance are eliminated in step S97 (refer to FIG. 13). Thus, the lateral line 56 having color that meets one of the conditions (a), (b), and (c) is eliminated from the second intermediate image. A second intermediate image 51C generated through filtering (refer to steps S107 and S109) and binarization (e.g., step S121) includes an outline 501C of the punched-hole image 50 but might not include an image corresponding to the lateral line 56.

Filtering (refer to step S123) and dilation (refer to step S127) are executed on the second intermediate image 51C to generate a second intermediate image 51D. In contrast to the case of the first intermediate image 51B, erosion might not be executed on the second intermediate image 51D. Therefore, an outline 501D included in the second intermediate image 51D may have a thickness thicker than the outline 501B included in the first intermediate image 51B by a predetermined amount (e.g., by an amount of one pixel).

A logical AND operation is executed on the first intermediate image 51B and the second intermediate image 51D to generate a first image 51E (refer to step S129). With this operation, the generated first image 51E might not include the lateral line 56 included in the first intermediate image 51B. The thickness of the outline 501E in the first image 51E is equalized to the thickness of the outline 501B in the first intermediate image 51B. As described above, even when the partial image 51 includes the lateral line 56 overlapping the punched-hole image 50, the first image 51E including the outline 501E corresponding to the punched-hole image 50 only is generated by the punched-hole image separation processing.

As depicted in (B) of FIG. 15, it is assumed that a partial image 52 has a ground color 57 that meets one of the conditions (a), (b), and (c). In this case, a first intermediate image 52A is generated through filtering (refer to steps S107 and 109) and binarization (refer to step S121). Through the filtering using the Sobel filter, only an edge corresponding to an outline of the punched-hole image 50 is detected. Therefore, the first intermediate image 52A includes an outline 502A of the punched-hole image 50 only. Then, another filtering (refer to step S123), dilation, and erosion (refer to step S125) are executed on the first intermediate image 52A to generate a first intermediate image 52B. The first intermediate image 52B includes an outline 502B.

When a second intermediate image is generated, one or more pixels having a saturation value of "16" or greater are eliminated in step S93 or S101 (refer to FIG. 13). Further, one or more pixels having a luminance value greater than or equal to the maximum background color luminance are eliminated in step S95 or S103 (refer to FIG. 13). Then, one or more pixels having a luminance value smaller than or equal to the minimum background color luminance are eliminated in step S97 (refer to FIG. 13). Thus, the ground color 57 that meets one of the conditions (a), (b), and (c) is eliminated from the second intermediate image. In some cases, when one or more pixels having a saturation value of "16" or greater are eliminated in step S93 or S101 (refer to FIG. 13), the size of the outline of the punched-hole image may be reduced because a boundary between the punched-hole image 50 and the ground color 57 includes both colors of the punched-hole image 50 and the ground color 57 due to, for example, color shift. Therefore, a second intermediate image 52C generated through filtering (refer to steps S107 and S109) and binarization (e.g., step S121) may include an outline 502C that has a thickness thinner than the outline 502A included in the first intermediate image 52A.

Filtering (refer to step S123) and dilation (refer to step S127) are executed on the second intermediate image 52C to generate a second, intermediate image 52D. In contrast to the case of the first intermediate image 52B, erosion might not be executed on the second intermediate image 52D. Therefore, an outline 502D included in the second intermediate image 52D may have a thickness thicker than the outline 502C included in the second intermediate image 52C. As a result of this, the outline 502D included in the second intermediate image 52D has a thickness equal to the thickness of the outline 502B of the first intermediate image 52B.

A logical AND operation is executed on the first intermediate image 52B and the second intermediate image 52D to generate a first image 52E (refer to step S129). The first image 52E includes an outline 502E that has substantially the same shape as the outlines 502B and 502D. As described above, even when the partial image 52 includes the ground color 57 that meets one of the conditions (a), (b), and (c), the first image 52E including the outline 502E corresponding to the punched-hole image 50 only is generated by the punched-hole image separation processing.

As depicted in (C) of FIG. 15, it is assumed that a partial image 53 has a ground color 58 that meets one of the following conditions (d) and (e):

(d) A saturation value is close to "16"; and (e) A luminance value is close to the minimum background color luminance or the maximum background color luminance.

In this case, a first intermediate image 53A is generated through filtering (refer to steps S107 and S109) and binarization (e.g., step S121). Through the filtering using the Sobel filter, only an edge corresponding to an outline of the punched-hole image 50 is detected. Therefore, the first intermediate image 53A includes an outline 503A of the punched-hole image 50 only. Then, another filtering (refer to step S123), dilation, and erosion (refer to step S125) are executed on the first intermediate image 53A to generate a first intermediate image 53B. The first intermediate image 53B includes an outline 503B.

When a second intermediate image is generated, one or more pixels of the ground color 58 having a saturation value smaller than "16" might not be eliminated in step S93 or S101 (refer to FIG. 13) and thus such pixels may remain in places. Further, one or more pixels of the ground color 58 having a luminance value smaller than the maximum background color luminance might not be eliminated in step S93 or S101 (refer to FIG. 13) and thus such pixels may remain in places. In addition, one or more pixels of the ground color 58 having a luminance value greater than the minimum background color luminance might not be eliminated in step S97 (refer to FIG. 13) and thus such pixels may remain in places. Therefore, a second intermediate image 53C generated through filtering (refer to steps S107 and S109) and binarization (e.g., step S121) may include an outline 503C and noise 5031 left based on the ground color 58. Similar to the example depicted in (B) of FIG. 15, the outline 503C may have a thickness thinner than the outline 503A in the first intermediate image 53A. Filtering (refer to step S123) and dilation (refer to step S127) are executed on the second intermediate image 53C to generate a second intermediate image 53D. In contrast to the case of the first intermediate image 53B, erosion might not be executed on the second intermediate image 53D. Therefore, an outline 503D included in the second intermediate image 53D has a thickness equal to the thickness of the outline 503B of the first intermediate image 53B. The second intermediate image 53D also includes noise 5032 corresponding to the noise 5031 included in the second intermediate image 53C.

A logical AND operation is executed on the first intermediate image 53B and the second intermediate image 53D to generate a first image 53E (refer to step S129). The generated first image 53E might not include the noise 5032 included in the second intermediate image 53D. The first image 53E includes an outline 503E that has substantially the same shape as the outlines 503B and 503D. As described above, even when the partial image 53 includes the ground color 58 that meets one of the conditions (d) and (e), the first image 53E including the outline 503E of the punched-hole image 50 only is generated by the punched-hole image separation processing.

As depicted in (D) of FIG. 15, it is assumed that a partial image 54 has a ground color 59A of white and a ground color 59B that that meets one of the conditions (a), (b), and (c), and a boundary between the ground colors 59A and 59B overlaps the punched-hole image 50. In this case, a first intermediate image 54A is generated through filtering (refer to steps S107 and 109) and binarization (refer to step S121). Through the filtering using the Sobel filter, an edge corresponding to an outline of the punched-hole image 50 is detected. Therefore, the first intermediate image 54A includes an outline 504A of the punched-hole image 50. The first intermediate image 54A may also include a lateral line 59C representing the boundary between the ground colors 59A and 59B. Then, another filtering (refer to step S123), dilation, and erosion (refer to step S125) are executed on the first intermediate image 54A to generate a first intermediate image 54B. The first intermediate image 54B includes an outline 504B and a lateral line 59D.

When a second intermediate image is generated, one or more pixels of the ground color 59B that meets one of the conditions (a), (b), and (c) are eliminated in steps S93, S95, and S97 or in steps S101 and S103 (refer to FIG. 13). Therefore, a second intermediate image 54C generated through filtering (refer to steps S107 and S109) and binarization (e.g., step S121) includes only an outline 504C having a relatively thin thickness. Filtering (refer to step S123) and dilation (refer to step S127) are executed on the second intermediate image 54C to generate a second intermediate image 54D. In contrast to the case of the first intermediate image 54B, erosion might not be executed on the second intermediate image 54D. Therefore, an outline 504D included in the second intermediate image 54D has a thickness thicker than an outline 504B included in the first intermediate image 54B by a predetermined amount (e.g., by an amount of one pixel).

A logical AND operation is executed on the first intermediate image 54B and the second intermediate image 54D to generate a first image 54E (e.g., step S129). The first image 54E includes an outline 504E that has substantially the same shape as the outline 504B. As described above, even when partial image 54 includes the boundary between the ground colors 59A and 59B that overlaps the punched-hole image 50, the first image 54E including the outline 504E corresponding to the punched-hole image 50 only is generated by the punched-hole image separation processing.

<Stage B2: Extraction Processing>

Figure 16:
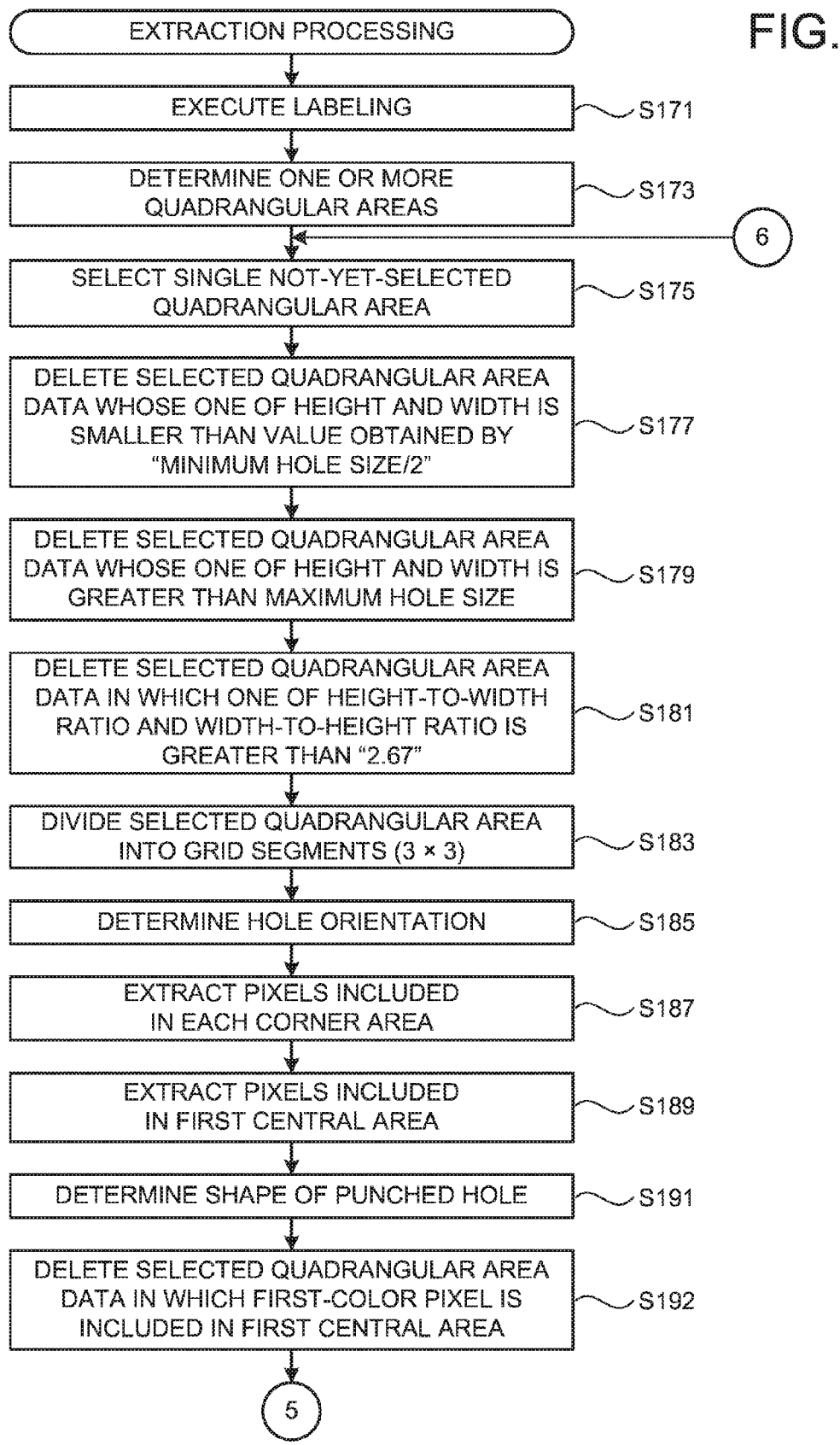
FIG. 16 is a flowchart depicting an example of extraction processing in the illustrative embodiment according to one or more aspects of the disclosure.

As depicted in FIGS. 5A and 5B, subsequent to the punched-hole image separation processing (e.g., step S11), the CPU 21 executes extraction processing (refer to FIG. 16) on the first image data associated with the selected partial image data selected in step S9 in the fourth table 244 (refer to FIGS. 6A and 6B) (e.g., step S13). Referring to FIG. 16, the extraction processing will be described in detail. The CPU 21 executes labeling using a known labeling algorism, e.g., a label propagation algorism or a label equivalence algorism, on pixels included in the first image (e.g., step S171). In labeling in step S171, one or more groups of pixels are extracted from the pixels assigned with the respective binary values in binarization (refer to step S121 in FIG. 14). Each group of pixels includes pixels having the first color corresponding to the outline of the punched-hole image, wherein such pixels are in line successively. Hereinafter, a pixel having the first color may be referred to as a "first-color pixel", and each area occupied by a respective group of pixels may be referred to as an "isolated area".

The CPU 21 determines a quadrangle (e.g., a rectangle or a square) circumscribing an isolated area and defines an area enclosed by the quadrangle (e.g., step S173). Hereinafter, a defined quadrangular area may be referred to as a "quadrangular area". In a case that a plurality of isolated areas are extracted, a quadrangular area is defined for each of the plurality of isolated areas, whereby a plurality of quadrangular areas are defined. The CPU 21 stores one or more pieces of quadrangular area data each representing a corresponding quadrangular area in the fourth table 244 (refer to FIGS. 6A and 6B) in association with corresponding first image data. The CPU 21 selects one of the one or more defined quadrangular areas from the fourth table 244 (e.g., step S175). Hereinafter, the quadrangular area selected in step S175 may be referred to as a "selected quadrangular area" and data representing the selected quadrangular area may be referred to as "selected quadrangular area data".

The CPU 21 determines whether one of a height and a width of the selected quadrangular area is smaller than a value obtained by division of the minimum hole size (refer to FIG. 3) in the setting information by "2" (hereinafter, referred to as "minimum hole size/2"). When the CPU 21 determines that one of the height and the width of the selected quadrangular area is smaller than the value obtained by "minimum hole size/2", the CPU 21 deletes the selected quadrangular area data from the fourth table 244 (e.g., step S177). Since there is a lower possibility that the image included in the quadrangular area whose one of the height and the width is smaller than the value obtained by "minimum hole size/2" is a punched-hole image, the selected quadrangular area data is deleted from the fourth table 244. The judgment criteria of "minimum hole size/2" may enable the CPU 21 to detect an image corresponding to a punched-hole image even when a half of the image corresponding to the punched-hole image is missing.

When the selected quadrangular area data remains in the fourth table 244 after step S177 has been executed, the CPU 21 determines whether one of the height and the width of the selected quadrangular area is greater than the maximum hole size (refer to FIG. 3) in the setting information. When the CPU 21 determines that one of the height and the width of the selected quadrangular area is greater than the maximum hole size, the CPU 21 deletes the selected quadrangular area data from the fourth table 244 (e.g., step S179). Since there is a lower possibility that the image included in the quadrangular area whose one of the height and the width is greater than the maximum hole size is a punched-hole image, the selected quadrangular area data is deleted from the fourth table 244.

When the selected quadrangular area data remains in the fourth table 244 after step S179 has been executed, the CPU 21 determines whether one of a ratio of the height to the width of the selected quadrangular area ("height/width") (hereinafter, referred to as a "height-to-width ratio") and a ratio of the width to the height of the selected quadrangular area ("width/height") (hereinafter, referred to as a "width-to-height ratio") is greater than "2.67", which may be a maximum value of a ratio of a height to a width of a punched hole having a common size (e.g., height: 8 mm, width: 3 mm). When the CPU 21 determines that one of the height-to-width ratio and the width-to-height ratio is greater than "2.67", the CPU 21 deletes the selected quadrangular area data from the fourth table 244 (e.g., step S181). Since there is a lower possibility that the image in which one of the height-to-width ratio and the width-to-height ratio is greater than "2.67" is a punched-hole image, the selected quadrangular area data is deleted from the fourth table 244.

When the selected quadrangular area data remains in the fourth table 244 after step S181 has been executed, the CPU 21 divides the selected quadrangular area into three equal areas both in the height direction and in the width direction to define nine (i.e., 3×3) segments in the quadrangular area (e.g., step S183). The CPU 21 determines, from the divided nine segments (hereinafter, referred to as "grid segments"), a grid segment including one or more first-color pixels as a "first grid segment", and determines a grid segment including no first-color pixel as a "second grid segment". The CPU 21 determines, based on the determined first and second grid segments, a hole orientation that represents a direction that the outline of the punched hole occupies (e.g., step S185). The CPU 21 stores the determined hole orientation in the fourth table 244 (refer to FIGS. 6A and 6B) in association with the selected quadrangular area data.

Referring to (A) to (J) of FIG. 18 and (A) to (J) of FIG. 20, steps S183 and S185 will be described in detail using specific examples. In (A) to (J) of FIG. 18 and (A) to (J) of FIG. 20, each of quadrangular areas 62A to 62I (refer to FIG. 18) and quadrangular areas 67A to 67I (refer to FIG. 20) may have a square shape. Nevertheless, in some cases, an actual quadrangular area may have a rectangular shape in accordance with the outline shape.

Figure 18:
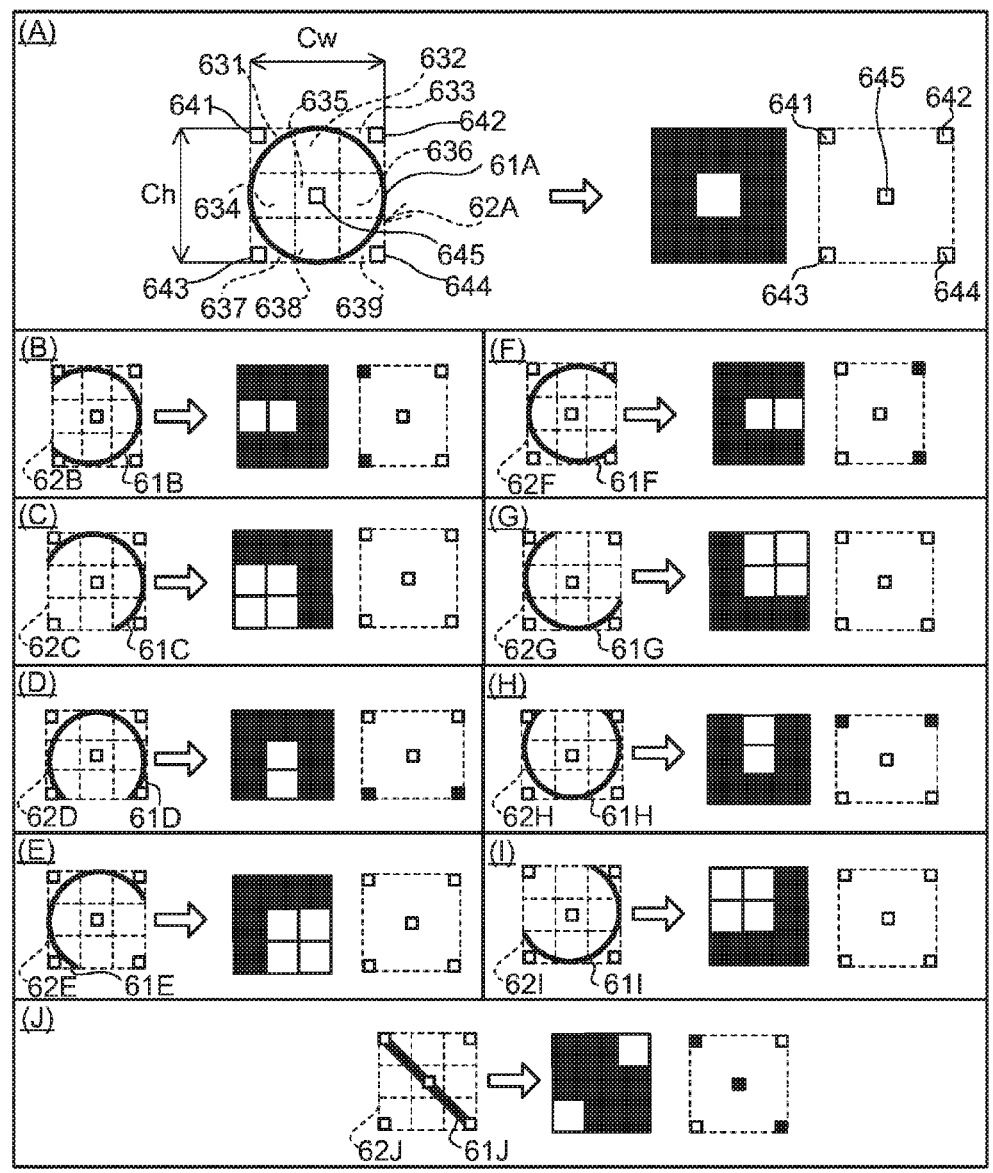
FIG. 18 illustrates how to determine a hole orientation and a shape (e.g., round) in the illustrative embodiment according to one or more aspects of the disclosure.

As depicted in (A) of FIG. 18, it is assumed that a first image includes a circular outline 61A corresponding to a round punched hole. In this case, in step S173, the CPU 21 defines a quadrangular area (e.g., a square area) 62A circumscribing the outline 61A. In step S183, the CPU 21 divides the quadrangular area 62A into nine grid segments 631, 632, 633, 634, 635, 636, 637, 638, and 639. The CPU 21 determines each of the grid segments 631, 632, 633, 634, 636, 637, 638, and 639 as a first grid segment that includes one or more first-color pixels, from the grid segments 631, 632, 633, 634, 635, 636, 637, 638, and 639. The CPU 21 determines the grid segment 635 as a second grid segment that includes no first-color pixel.

The CPU 21 refers to the fifth table 245 (refer to FIG. 19). As depicted in FIG. 19, the fifth table 245 stores various arrangement patterns of first grid segments (e.g., grid segments filled with black in FIG. 19) and second grid segments (e.g., grid segments filled with white in FIG. 19), and various hole orientations in association with each other. When an arrangement pattern of the first and second grid segments depicted in (A) of FIG. 18 is determined based on the outline 61A, in step S185, the CPU 21 determines "center" of "No. 1" in the fifth table 245 (i.e., no specific direction) as a hole orientation that represents a direction that the outline 61A occupies.

In some cases, as depicted in (B) to (I) of FIG. 18, a first image includes a circular outline with a missing portion, e.g., a partially-missing circular outline 61B, 61C, 61D, 61E, 61F, 61G, 61H, or 61I, as an outline corresponding to a round punched hole. The image sensor of the image reader 1 (refer to FIG. 1) reads a shadow cast along an edge of a punched hole and generates original image data based on the read image. Therefore, the conditions of the shadow may influence the read image, resulting in causing missing of a portion of the outline in the original image. When such a situation occurs, in step S173, the CPU 21 defines one of quadrangular areas (e.g., square areas) 62B to 62I circumscribing corresponding outlines 61B to 61I, respectively. In step S183, the CPU 21 divides the defined quadrangular area into nine grid segments. As depicted in (B) to (I) of FIG. 18, the CPU 21 determines first and second grid segments. In step S185, the CPU 21 determines one of "right" of "No. 2" (e.g., the outline 61B), "upper-right" of "No. 3" (e.g., the outline 61C), "upper" of "No. 4" (e.g., the outline 61D), "upper-left" of "No. 5" (e.g., the outline 61E), "left" of "No. 6" (e.g., the outline 61F), "lower-left" of "No. 7" (e.g., the outline 61G), "lower" of "No. 8" (e.g., the outline 61H), "lower-right" of "No. 9" (e.g., the outline 61I) in the fifth table 245, as a hole orientation of the target outline.

The hole orientation of a circular outline determined as described above may refer to a direction that a normal extends toward the outside of a quadrangular area from a point located on an outline and equidistance from ends of the outline. The normal extending direction is represented by a direction approximate to one of "right", "upper-right", "upper", "upper-left", "left", "lower-left", "lower", and "lower-right". In other words, the hole orientation may also refer to a direction that a line extends from the center of a quadrangular area toward a point located on an outline and equidistance from ends of the outline. The line extending direction is represented by a direction approximate to one of "right", "upper-right", "upper", "upper-left", "left", "lower-left", "lower", and "lower-right". When an outline has no end or no missing portion, the hole orientation is determined as "center". In other words, the hole orientation may also refer to an opposite direction to a direction that a line extends toward the midpoint of a line segment extending between ends of an outline, from a point located on the outline and equidistance from the ends of the outline (e.g., an opposite direction to a direction in which the outline has a missing portion).

As depicted in (J) of FIG. 18, it is assumed that a first image includes a line segment 61J not corresponding to a punched hole. In this case, in step S173, the CPU 21 determines a quadrangular area (e.g., a square area) 62J circumscribing the line segment 61J. In step S183, the CPU 21 divides the quadrangular area 62J into nine grid segments. As depicted in (J) of FIG. 18, the CPU 21 determines first and second grid segments. In step S185, the CPU 21 determines "others" of "No. 10" in the fifth table 245 as a hole orientation. In an example depicted in (J) of FIG. 20, the CPU 21 determines a hole orientation in the same or similar manner to the example depicted in (J) of FIG. 18.

Figure 20:
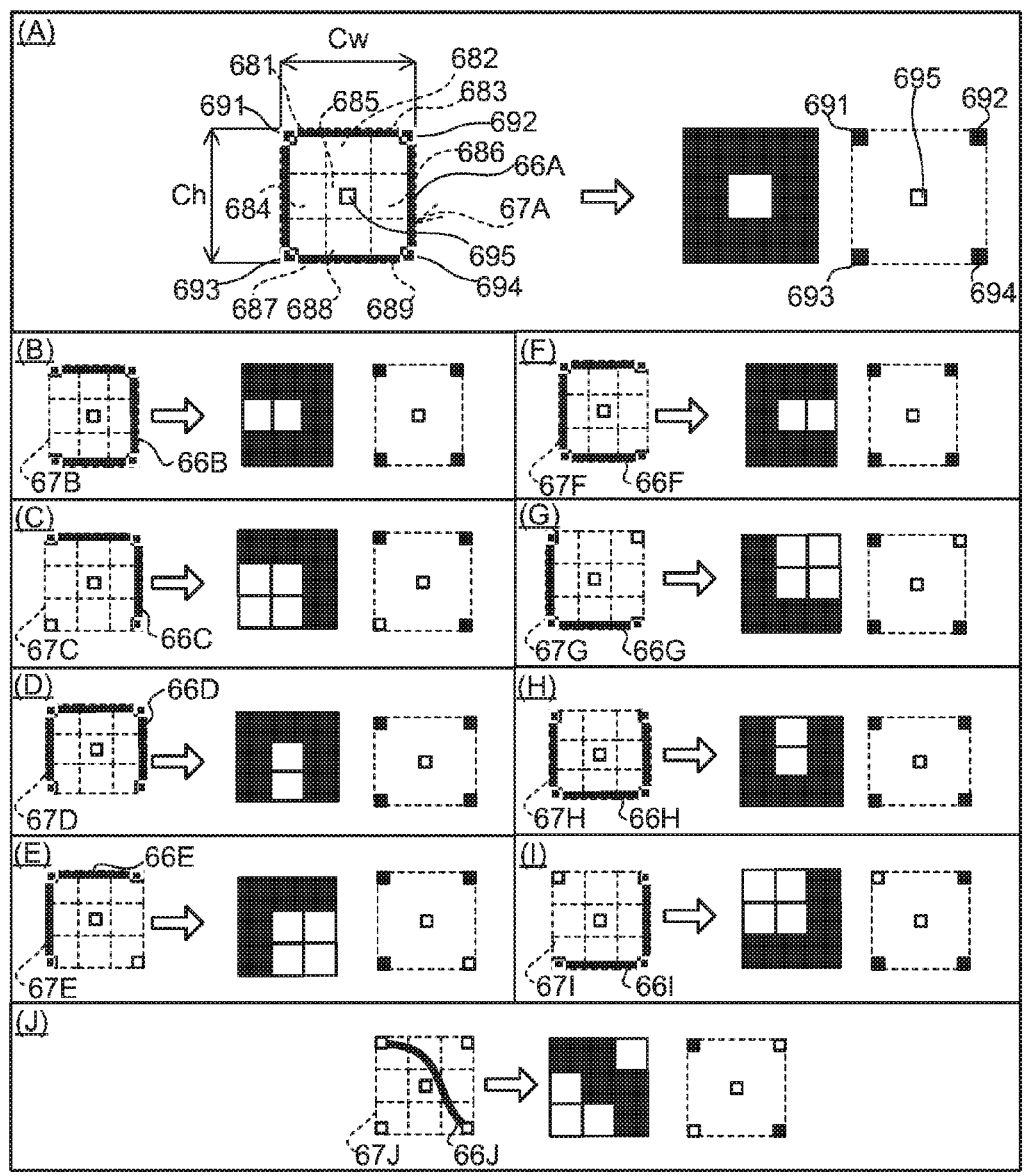
FIG. 20 illustrates how to determine a hole orientation and a shape (e.g., quadrangle) in the illustrative embodiment according to one or more aspects of the disclosure.

As depicted in (A) of FIG. 20, it is assumed that a first image includes an outline 66A corresponding to a quadrangular punched hole. In this case, the CPU 21 determines a hole orientation of the outline 66A in the same or similar manner to the example depicted in (A) of FIG. 18 in which the first image includes the outline 61A corresponding to a round punched hole. In step S173, the CPU 21 determines a quadrangular area (e.g., a square area) 67A circumscribing the outline 66A. In step S183, the CPU 21 divides the quadrangular area 67A into nine grid segments 681, 682, 683, 684, 685, 686, 687, 688, and 689. The CPU 21 determines each of the grid segments 681, 682, 683, 684, 686, 687, 688, and 689 as a first grid segment, and the grid segment 685 as a second grid segment. In step S185, the CPU 21 determines "center" of "No. 1" in the fifth table 245 (refer to FIG. 19) as a hole orientation that represents the direction that the outline 66A occupies. In some cases, as depicted in (B) to (I) of FIG. 20, a first image includes a quadrangle with a missing portion, e.g., a partially-missing quadrangular outline 66B, 66C, 66D, 66E, 66F, 66G, 66H, or 66I, as an outline corresponding to a quadrangular punched hole. In each of these cases, the CPU 21 determines a hole orientation in the same or similar manner to one of the examples depicted in (B) to (I) of FIG. 18 in which the first image includes one of the outlines 61B to 61I each corresponding to a round punched hole.

The hole orientation of a quadrangular outline determined as described above may refer to a direction that a line extends from the center of a quadrangular area toward a point located on an outline and equidistance from ends of the outline. The line extending direction is represented by a direction approximate to one of "right", "upper-right", "upper", "upper-left", "left", "lower-left", "lower", and "lower-right". When an outline has no end or no missing portion, the hole orientation is determined as "center".

As depicted in FIG. 16, subsequent to step S185 in which the hole orientation is determined, the CPU 21 determines four particular corner areas (hereinafter, referred to as "corner areas") and a particular central area (hereinafter, referred to as a "first central area") in the selected quadrangular area. Each of the corner areas and the first central area has a quadrangular shape. Each of the corner areas and the first central area has a width that is one-tenth the width of the selected quadrangular area and a height that is one-tenth the height of the selected quadrangular area. The CPU 21 extracts pixels included in each of the corner areas (e.g., step S187). The CPU 21 extracts pixels included in the first central area (e.g., step S189).

The CPU 21 determines a side or a vertex corresponding to the hole orientation determined in step S185, from the four sides and four vertexes of the selected quadrangular area. For example, when the hole orientation is one of "left", "right", "upper", and "lower", one of the sides of a "left side", a "right side", an "upper side", and a "lower side" is determined, respectively, as a corresponding side of the selected quadrangular area. When the hole orientation is one of "upper-left", "lower-left", "upper-right", and "lower-right", one of the vertexes of "upper-left", "lower-left", "upper-right", and "lower-right" is determined, respectively, as a corresponding vertex of the selected quadrangular area. When the hole orientation is "center", all of the four sides of the "left side", the "right side", the "upper side", and the "lower side", are determined as corresponding sides of the selected quadrangular area.

The CPU 21 determines whether a first-color pixel is included in each ends of the determined side or in the determined vertex. In one example, when one of the "left side", the "right side", the "upper side", and the "lower side" of the selected quadrangular area corresponding to the hole orientations of "left", "right", "upper", and "lower", respectively, is determined, the CPU 21 determines whether a first-color pixel is included in each corner area located at one of the ends of the determined side. In another example, when the "upper-left" vertex corresponding to the hole orientation of "upper-left" is determined, the CPU 21 determines whether a first-color pixel is included in an upper-left corner area. When the hole orientation is one of "lower-left", "upper-right", and "lower-right", the CPU 21 determines whether a first-color pixel is included in a corner area located at a corresponding one of the "lower-left" vertex, the "upper-right" vertex, and the "lower-right" vertex. When all of the four sides of the selected quadrangular area corresponding to the hole orientation of "center" are determined, the CPU 21 determines whether a first-color pixel is included in each of the four corner areas. Hereinafter, the corner area subject to such a judgment may be referred to as a "judgment-target corner area".

When none of the one or more judgment-target corner areas includes a first-color pixel, the CPU 21 determines the shape of the punched hole corresponding to the outline included in the selected quadrangular area as "round" (e.g., step S191). When at least one of the one or more judgment-target corner areas includes a first-color pixel, the CPU 21 determines the shape of the punched hole corresponding to the outline included in the selected quadrangular area as "quadrangle" (e.g., step S191). The CPU 21 stores the determined shape in the fourth table 244 (refer to FIGS. 6A and 6B) in association with the selected quadrangular area data. When the punched hole has a round shape, its corresponding outline has a curved line. Therefore, there is a higher possibility that the outline might not overlap any judgment-target corner area of the determined side or vertex. When the punched hole is a quadrangular shape, its corresponding outline has one or more right-angled portions. Therefore, there is a higher possibility that the outline overlaps each of the judgment-target corner areas of the determined side or the judgment-target corner area of the determined vertex. Accordingly, the shape of the punched hole may be determined in the above-described manner.

Steps S187 to S191 will be described in detail using specific examples. As depicted in (A) of FIG. 18, it is assumed that the hole orientation has been determined as "center" based on the outline 61A corresponding to the round punched hole (e.g., step S185). The CPU 21 determines corner areas 641, 642, 643, and 644, and a first central area 645 in the quadrangular area 62A. The corner areas 641, 642, 643, and 644 correspond to an upper-left corner area, an upper-right corner area, a lower-left corner area, and a lower-right corner area, respectively, in the quadrangular area 62A. The CPU 21 extracts pixels included in each of the corner areas 641, 642, 643, and 644 (e.g., step S187). The CPU 21 extracts pixels included in the first central area 645 (e.g., step S189). As depicted in (A) of FIG. 18, for the outline 61A corresponding to a round punched hole, none of the corner areas 641, 642, 643, and 644, and the first central area 645 include a first-color pixel. Thus, all of the four sides of the quadrangular area 62A are determined as sides corresponding to the hole orientation of "center". In this case, the shape of the punched hole corresponding to the outline 61A is determined in accordance with whether a first-color pixel is included in at least one of the corner areas 641, 642, 643, and 644.

The CPU 21 refers to the sixth table 246 (refer to FIG. 21). As depicted in FIG. 21, the sixth table 246 stores various hole orientations, corner areas in which a first-color pixel is absent (hereinafter, referred to as "first-color pixel absent corner areas", and shapes in association with each other. In the example depicted in (A) of FIG. 18, the CPU 21 has determined, in step S185, that the hole orientation is "center" and, in steps S187 and S189, that none of the corner areas 641, 642, 643, and 644, and the first central area 645 includes a first-color pixel. Therefore, the determined hole orientation and the determined first-color pixel absent corner areas match the conditions of "No. 1" in the sixth table 246. Thus, the CPU 21 determines the shape of the punched hole corresponding to the outline 61A as "round" (e.g., step S191).

As depicted in (B) of FIG. 18, it is assumed that the hole orientation has been determined as "right" based on the partially-missing circular outline 61B corresponding to a round punched hole (e.g., step S185). The CPU 21 extracts pixels included in each of four corner areas and a first central area in the quadrangular area 62B (e.g., steps S187 and S189). As depicted in (B) of FIG. 18, for the outline 61B that corresponds to a round punched hole and whose hole orientation is "right", an upper-left corner area and a lower-left corner area each include a first-color pixel and the remainder of the corner areas include no first-color pixel. Therefore, the CPU 21 determines that the determined hole orientation and the determined first-color pixel absent corner areas match the conditions of "No. 2" in the sixth table 246 (refer to FIG. 21) by referring to the sixth table 246. Thus, the CPU 21 determines the shape of the punched hole corresponding to the outline 61B as "round" (e.g., step S191).

As depicted in (C) of FIG. 18, it is assumed that the hole orientation has been determined as "upper-right" based on the partially-missing circular outline 61C corresponding to a round punched hole (e.g., step S185). The CPU 21 extracts pixels in each of four corner areas and a first central area in the quadrangular area 62C (e.g., steps S187 and S189). As depicted in (C) of FIG. 18, for the outline 61C that corresponds to a round punched hole and whose hole orientation is "upper-right", none of the four corner areas and the first central area includes a first-color pixel. Therefore, the CPU 21 determines that the determined hole orientation and the determined first-color pixel absent corner areas match the conditions of "No. 6" in the sixth table 246 (refer to FIG. 21) by referring to the sixth table 246. Thus, the CPU 21 determines the shape of the punched hole corresponding to the outline 61C as "round" (e.g., step S191).

As depicted in (A) of FIG. 20, is assumed that the hole orientation has been determined as "center" based on the quadrangular outline 66A corresponding to a quadrangular punched hole (e.g., step S185). The CPU 21 determines corner areas 691, 692, 693, and 694 and a first central area 695 in the quadrangular area 67A. The corner areas 691, 692, 693, and 694 correspond to an upper-left corner area, an upper-right corner area, a lower-left corner area, and a lower-right corner area, respectively, in the quadrangular area 67A. The CPU 21 extracts pixels included in each of the corner areas 691, 692, 693, and 694 (e.g., step S187). The CPU 21 extracts pixels included in the first central area 695 (e.g., step S189). As depicted in (A) of FIG. 20, for the outline 66A corresponding to a quadrangular punched hole, while all of the four corner areas 691, 692, 693, and 694 include a first-color pixel, the first central area 645 include no first-color pixel. In this case, the shape of the punched hole corresponding to the outline 66A is determined in accordance with whether a first-color pixel is included in at least one of the corner areas 691, 692, 693, and 694.

The CPU 21 refers to the sixth table 246 (refer to FIG. 21). The CPU 21 has determined, in step S185, that the hole orientation is "center" and, in steps S187 and S189, that all of the corner areas 691, 692, 693, and 694 include a first-color pixel and the first central area 695 includes no first-color pixel. Therefore, the determined hole orientation and the determined first-color pixel absent corner areas match the conditions of "No. 10" in the sixth table 246. Thus, the CPU 21 determines the shape of the punched hole corresponding to the outline 66A as "quadrangle" (e.g., step S191).

As depicted in (B) of FIG. 20, it is assumed that the hole orientation has been determined as "right" based on the partially-missing quadrangular outline 66B that has a missing portion and corresponds to a quadrangular punched hole (e.g., step S185). The CPU 21 extracts pixels included in each of four corner areas and a first central area in the quadrangular area 67B (e.g., steps S187 and S189). As depicted in (B) of FIG. 20, for the outline 66B that corresponds to a quadrangular punched hole and whose hole orientation is "right", all of the four corner areas include a first-color pixel and the first central area includes no first-color pixel. Therefore, the CPU 21 determines that the determined hole orientation and the determined first-color pixel absent corner areas match the conditions "No. 10" in the sixth table 246 (refer to FIG. 21) by referring to the sixth table 246. Thus, the CPU 21 determines the shape of the punched hole corresponding to the outline 66B as "quadrangle" (e.g., step S191).

As depicted in (C) of FIG. 20, it is assumed that the hole orientation has been determined as "upper-right" based on the partially-missing outline 66C that has a missing portion and corresponds to a quadrangular punched hole (e.g., step S185). The CPU 21 extracts pixels in each of four corner areas and a first central area in the quadrangular area 67C (e.g., steps S187 and S189). As depicted in (C) of FIG. 20, for the outline 66C that corresponds to a quadrangular punched hole and whose hole orientation is "upper-right", the upper-left corner area, the upper-right corner area, and the lower-right corner area each include a first-color pixel and the first central area includes no first-color pixel. Therefore, the CPU 21 determines that the determined hole orientation and the determined first-color pixel absent corner areas match the conditions of "No. 10" in the sixth table 246 (refer to FIG. 21) by referring to the sixth table 246. Thus, the CPU 21 determines the shape of the punched hole corresponding to the outline 66C as "quadrangle" (e.g., step S191).

As depicted in (J) of FIG. 18, it is assumed that the hole orientation has been determined as "others" based on the line segment 61J not corresponding to a punched hole (e.g., step S185). The CPU 21 extracts pixels included in each of four corner areas and a first central area in the quadrangular area 62J (e.g., steps S187 and S189). As depicted in (J) of FIG. 18, for the line segment 61J whose hole orientation is "others", the upper-left corner area, the lower-right corner area, and the first central area each include a first-color pixel, and the upper-right corner area and the lower-right corner area include no first-color pixel. Therefore, the determined hole orientation and the determined first-color pixel absent corner areas match the conditions of "No. 10" in the sixth table 246 (refer to FIG. 21) by referring to the sixth table 246. Thus, the CPU 21 determines the shape corresponding to the line segment 61J as "quadrangle" (e.g., step S191).

As depicted in (J) of FIG. 20, it is assumed that the hole orientation had been determined as "others" based on a line segment 66J not corresponding to a punched hole (e.g., step S185). The CPU 21 extracts pixels included in each of four corner areas and a first central area in the quadrangular area 67J (e.g., steps S187 and S189). As depicted in (J) of FIG. 20, for the line segment 66J whose hole orientation is "others", the upper-left corner area and the lower-right corner area each include a first-color pixel and the upper-right corner area, the lower-right corner, and the first central area each include no first-color pixel. Therefore, the determined hole orientation and the determined first-color pixel absent corner areas match the conditions of "No. 10" in the sixth table 246 (refer to FIG. 21) by referring to the sixth table 246. Thus, the CPU 21 determines the shape corresponding to the line segment 66J as "quadrangle" (e.g., step S191).

As depicted in FIG. 16, the CPU 21 determines whether the first central area includes a first-color pixel. When the CPU 21 determines that the first central area includes a first-color pixel, the CPU 21 deletes the selected quadrangular area data from the fourth table 244 (refer to FIGS. 6A and 6B) (e.g., step S192). When the first central area includes a first-color pixel, noise may be included at a central portion of the area enclosed by the outline. Therefore, the selected quadrangular area data is deleted. When an outline corresponds to a punched hole, a central portion of an area enclosed by the outline corresponds to a portion of a background image, and thus the central portion might not include noise. Thus, when the first central area includes a first-color pixel, there is a lower possibility that the image corresponding to the outline is a punched-hole image, whereby the selected quadrangular area data is deleted from the fourth table 244. The above-described processing may enable the CPU 21 to delete, from the fourth table 244, any of selected quadrangular area data corresponding to an image other than a punched-hole image and having a shape similar to an outline corresponding to a punched-hole image.

For example, as depicted in (J) of FIG. 18, when the first central area includes a first-color pixel, the CPU 21 deletes the selected quadrangular area data from the fourth table 244.

Figure 17:
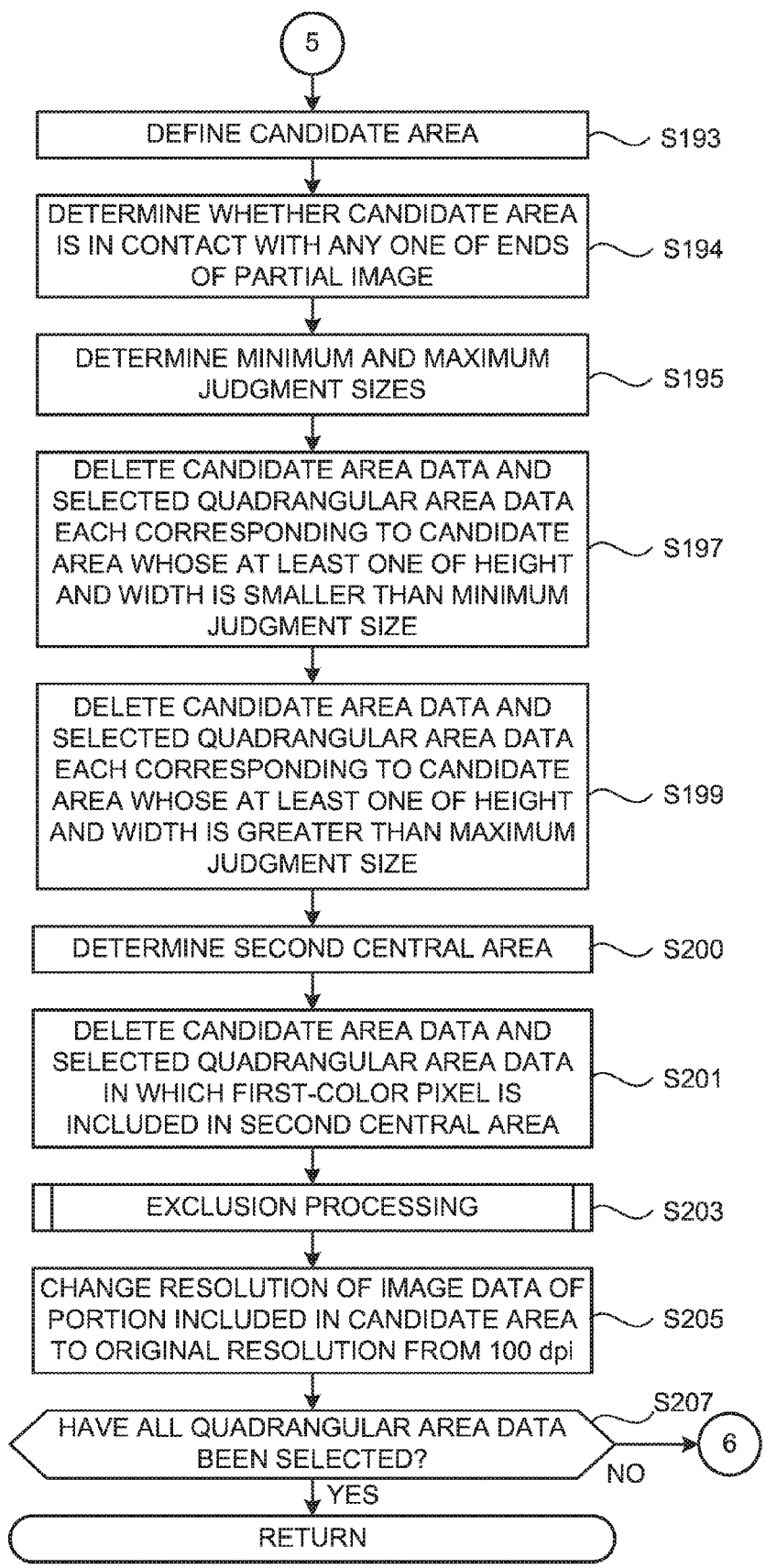
FIG. 17 is a continuation of the flowchart of FIG. 16 depicting the example of extraction processing in the illustrative embodiment according to one or more aspects of the disclosure.

As depicted in FIG. 17, when the selected quadrangular area data remains in the fourth table 244 after step S192 (refer to FIG. 16) has been executed, the CPU 21 defines a candidate area that is defined by extension of the selected quadrangular area in a particular direction (e.g., step S193). The candidate area is defined such that the selected quadrangular area is extended in a direction that extends along one of sides of the selected quadrangular area and corresponds to (e.g., forms the smallest angle with) a direction opposite to the hole orientation determined in step S185 (refer to FIG. 16) (hereinafter, referred to as an "extension direction").

The selected quadrangular area is extended within a range of the selected partial image selected in step S9 (refer to FIGS. 5A and 5B), and thus, the selected quadrangular area might not be extended beyond the range of the selected partial image. Accordingly, in a case that an extended portion may protrude beyond the range of the selected partial image if the selected quadrangular area is extended by an amount of length determined based on the seventh table 247, the selected quadrangular area is extended to one of the ends of the partial image but might not be extended further beyond the end of the partial image.

The CPU 21 determines a candidate area definition manner based on the seventh table 247 (refer to FIG. 22) and defines a candidate area by extending the selected quadrangular area based on the determined manner. The CPU 21 stores candidate area data representing the defined candidate area in the fourth table 244 (refer to FIGS. 6A and 6B) in association with the selected quadrangular area data.

Referring to FIG. 22, the seventh table 247 will be described in detail. In the seventh table 247, each definition manner is associated with a shape of a punched-hole corresponding to an outline, and a hole orientation. The definition manner includes a candidate area and an extension direction. In FIG. 22, for example, "(XX, YY)" stored as a candidate area represents that a dimension of "XX" is determined as a height Ph of the candidate area in the upper-lower direction and a dimension of "YY" is determined as a width Pw of the candidate area in the width direction. Hereinafter, the height and width of the selected quadrangular area are indicated by "Ch" and "Cw", respectively (refer to FIGS. 18 and 20).

Figure 23:
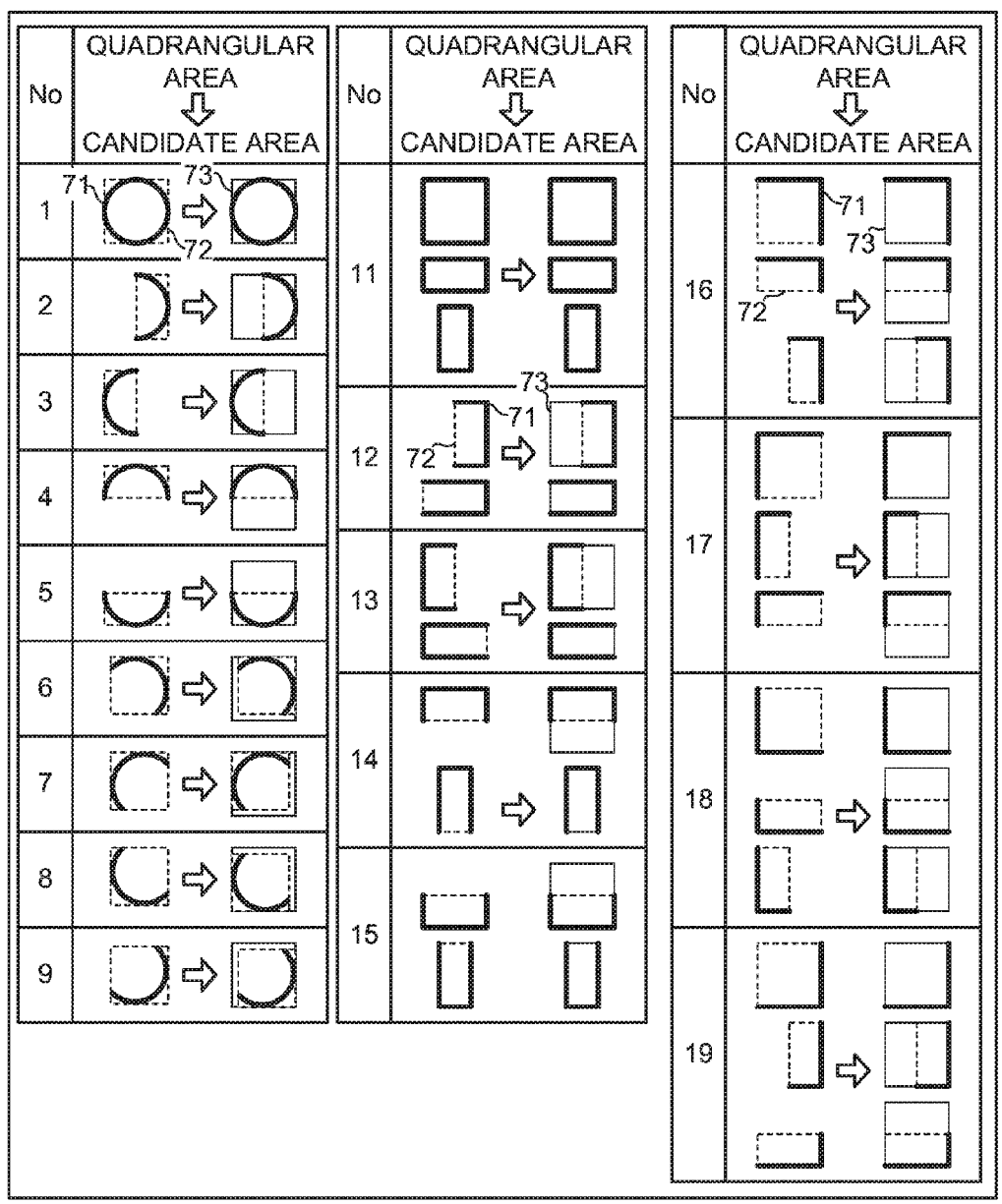
FIG. 23 illustrates how to define a candidate area in the illustrative embodiment according to one or more aspects of the disclosure.

Each definition manner (e.g., the candidate area and the extension direction) in the table 237 is specified in accordance with a shape and a hole orientation. Referring to FIGS. 22 and 23, the definition manner will be described in detail. When the shape is "round" and the hole orientation is "center", the selected quadrangular area itself is defined as a candidate area without any changes applied to the quadrangular area. Thus, as depicted in "No. 1" of FIG. 22, (Ch, Cw) is assigned as the candidate area (Ph, Pw). Therefore, as depicted in "No. 1" of FIG. 23, the height Ch of the selected quadrangular area 72 circumscribing the outline 71 is assigned to the height Ph of a candidate area 73, and the width Cw of the selected quadrangular area 72 is assigned to the width Pw of the candidate area 73.

When the shape is "round" and the hole orientation is "right", a candidate area is defined by extension of the selected quadrangular area in an opposite direction to the hole orientation (e.g., by extension of the selected quadrangular area in the leftward direction). The length of the candidate area in the extension direction is equalized to the height Ch of the selected quadrangular area (e.g., the length of the longer sides of the selected quadrangular area). Therefore, as depicted in "No. 2" of FIG. 22, (Ch, Ch) is assigned as the candidate area (Ph, Pw) and "leftward" is assigned as the extension direction. Therefore, as depicted in "No. 2" of FIG. 23, the height Ch of the selected quadrangular area 72 is assigned to both of the height Ph and the width Pw of the candidate area 73. For an example of "No. 3" in FIGS. 22 and 23, a candidate area may be defined in a similar manner to the example of "No. 2" except that "rightward" is assigned as the extension direction of "No. 3".

For reasons below, in each of the examples of "No. 2" and "No. 3", the selected quadrangular area is extended in the width direction. In the examples of "No. 2" and "No. 3", the hole orientation is one of "right" and "left", and therefore, the circular outline may have a missing portion at a side opposite to the hole orientation. Accordingly, a candidate area is defined as an area enclosed by a quadrangle circumscribing a complete circular outline by extension of the selected quadrangular area to the side where the circular outline has a missing portion, i.e., by extension of the selected quadrangular area to the side opposite to the hole orientation. In many cases, the shape of a punched hole may be round or perfect circle, whereby it may be preferable that the shape of the candidate area circumscribing the complete circular outline be square. Thus, a candidate area is defined by equalizing the length of the shorter sides of the selected quadrangular area to the length of the longer sides of the selected quadrangular area in order to make each pair of opposite sides of the candidate area have an equal length.

When the shape is "round" and the hole orientation is "upper", a candidate area is defined by extension of the selected quadrangular area in an opposite direction to the hole orientation (e.g., by extension of the selected quadrangular area in the downward direction). The length of the candidate area in the extension direction is equalized to the width Cw of the selected quadrangular area (e.g., the length of the longer sides of the selected quadrangular area). Therefore, as depicted in "No. 4" of FIG. 22, (Cw, Cw) is assigned as the candidate area (Ph, Pw) and "downward" is assigned as the extension direction. Therefore, as depicted in "No. 4" of FIG. 23, the width Cw of the selected quadrangular area 72 is assigned to both of the height Ph and the width Pw of the candidate area 73. For an example of "No. 5" in FIGS. 22 and 23, a candidate area may be defined in a similar manner to the example of "No. 4" except that "upward" is assigned as the extension direction of "No. 5". The reason for extending the selected quadrangular area in the upper-lower direction in the examples of "No. 4" and "No. 5" may be the same as the reason for the examples of "No. 2" and "No. 3".

When the shape is "round" and the hole orientation is "upper-right", an opposite direction to the hole orientation may be "lower-left". Among four directions of an upward direction, a downward direction, a rightward direction, and a leftward direction, each of which extends along one of the sides of the selected quadrangular area, each of the leftward direction and the downward direction forms the smallest angle with the lower-left direction (e.g., an opposite direction to the hole orientation). Therefore, a candidate area is defined by extension of the selected quadrangular area both in the leftward direction and in the downward direction. The length of the candidate area in the extension direction is equalized to a length obtained by multiplying the width Cw of the selected quadrangular area (e.g., the length of the longer sides of the selected quadrangular area) by "1.2" (e.g., "Cw×1.2"). Therefore, as depicted in "No. 6" of FIG. 22, (1.2×Cw, 1.2×Cw) is assigned as the candidate area (Ph, Pw) and "downward and leftward" is assigned as the extension direction. Therefore, as depicted in "No. 6" of FIG. 23, "Cw×1.2" is assigned to both of the height Ph and the width Pw of the candidate area 73. For each of examples of "No. 7", "No. 8", and "No. 9" in FIGS. 22 and 23, a candidate area may be defined in a similar manner to the example of "No. 6" except that "downward and rightward" is assigned as the extension direction of "No. 7", "upward and rightward" is assigned as the extension direction of "No. 8", and "upward and leftward" is assigned as the extension direction of "No. 9".

For reasons below, in each of the examples of "No. 6", "No. 7", "No. 8", and "No. 9", the selected quadrangular area is extended in two directions. In the examples of "No. 6", "No. 7", "No. 8", and "No. 9", the hole orientation is one of "upper-right", "lower-right", "upper-right", and "upper-left", and therefore, the circular outline may have a missing portion at a side opposite to the hole orientation. Accordingly, a candidate area is defined as an area enclosed by a quadrangle circumscribing a complete circular outline by extension of the selected quadrangular area to the side where the circular outline has a missing portion, i.e., by extension of the selected quadrangular area to the side opposite to the hole orientation. In most cases, the shape of a punched hole may be round or perfect circle, whereby it may be preferable that the shape of the candidate area circumscribing the complete circular outline be square. Accordingly, on the assumption that the outline has an arc that is a half of the circumference of the circular outline and a straight line (e.g., a diameter) extending between ends of the arc is angled at 45 degrees relative to the height direction and the width direction, a candidate area is defined by equalizing the length of each side of the candidate area to the length obtained by multiplying the length of the longer sides of the selected quadrangular area by 1.2.

When the shape is "quadrangle" and the hole orientation is "center", the selected quadrangular area itself is defined as a candidate area without any changes applied to the quadrangular area. Thus, as depicted in "No. 11" of FIG. 22, (Ch, Cw) is assigned as the candidate area (Ph, Pw). Therefore, as depicted in "No. 11" of FIG. 23, the height Ch of the selected quadrangular area 72 circumscribing the outline 71 is assigned to the height Ph of the candidate area 73, and the width Cw of the selected quadrangular area 72 is assigned to the width Pw of the candidate area 73.

When the shape is "quadrangle" and the hole orientation is "right", a candidate area is defined by extension of the selected quadrangular area in an opposite direction to the hole orientation (e.g., by extension of the selected quadrangular area in the leftward direction). The width Cw of the selected quadrangular area is equalized to one of the height Ch and the width Cw of the selected quadrangular area (e.g., is equalized to the length of the longer sides of the selected quadrangular area). Therefore, as depicted in "No. 12" of FIG. 22, (Ch, (a longer one of Ch and Cw)) is assigned as the candidate area (Ph, Pw) and "leftward" is assigned as the extension direction. When the width Cw of the selected quadrangular area corresponds to the shorter sides, the selected quadrangular area is extended. When the width Cw of the selected quadrangular area corresponds to the longer sides, the selected quadrangular area might not be extended. Therefore, as depicted in "No. 12" of FIG. 23, the length of the longer sides (e.g., height Ch or width Cw) of the selected quadrangular area 72 is assigned to the width Pw of the candidate area 73. When the width Cw of the selected quadrangular area 72 corresponds to the longer sides, the selected quadrangular area 72 itself is defined as the candidate area 73 without any changes applied to the quadrangular area 72. For an example of "No. 13" in FIGS. 22 and 23, a candidate area may be defined in a similar manner to the example of "No. 12" except that "rightward" is assigned as the extension direction of "No. 13".

For reasons below, in each of the examples of "No. 12" and "No. 13", the selected quadrangular area is extended in the width direction. In the examples of "No. 12" and "No. 13", the hole orientation is one of "right" and "left". Therefore, in a case that the sides of the selected quadrangular area in the width direction correspond to the shorter sides, the quadrangular outline may have a missing portion at a side opposite to the hole orientation. Accordingly, a candidate area is defined as an area enclosed by a quadrangle circumscribing a complete quadrangular outline by extension of the selected quadrangular area to the side where the quadrangular outline has a missing portion, i.e., by extension of the selected quadrangular area to the side opposite to the hole orientation. In many cases, the shape of a punched hole may be square, whereby it may be preferable that the shape of the candidate area circumscribing the complete quadrangular outline be square. Thus, a candidate area is defined by equalizing the length of the shorter sides of the selected quadrangular area to the length of the longer sides of the selected quadrangular area in order to make each pair of opposite sides of the candidate area have an equal length. In a case that the sides of the selected quadrangular area in the width direction correspond to the longer sides, if the selected quadrangular area is extended in the width direction, the longer sides may be further extended. As a result, the shape of the selected quadrangular area after extension might not be appropriate according to the standards for punched holes. Thus, it determined that only one of sides of the quadrangular outline is missing and the missing side is located at a side opposite to the hole orientation. Accordingly, the selected quadrangular area might not be extended in any direction.

When the shape is "quadrangle" and the hole orientation is "upper", a candidate area is defined by extension of the selected quadrangular area in an opposite direction to the hole orientation (e.g., by extension of the selected quadrangular area in the downward direction). The height Ch of the selected quadrangular area is equalized to one of the height Ch and the width Cw of the selected quadrangular area (e.g., is equalized to the length of the longer sides of the selected quadrangular area). Therefore, as depicted in "No. 14" of FIG. 22, (Ch, (a longer one of Ch and Cw)) is assigned as the candidate area (Ph, Pw) and "downward" is assigned as the extension direction. When the height Ch of the selected quadrangular area corresponds to the shorter sides, the selected quadrangular area is extended. When the height Ch of the selected quadrangular area corresponds to the longer sides, the selected quadrangular area might not be extended. Therefore, as depicted in "No. 14" of FIG. 23, the length of the longer side (e.g., height Ch or width Cw) of the selected quadrangular area 72 is assigned to the height Ph of the candidate area 73. When the height Ch of the selected quadrangular area 72 corresponds to the longer sides, the selected quadrangular area 72 itself is defined as the candidate area 73 without any changes applied to the quadrangular area 72. For an example of "No. 15" in FIGS. 22 and 23, a candidate area may be defined in a similar manner to the example of "No. 14" except that "upward" is assigned as the extension direction of "No. 15". The reason for extending the selected quadrangular area in the upper-lower direction may be the same as the reason for the examples of "No. 12" and "No. 13".

When the shape is "quadrangle" and the hole orientation is "upper-right", an opposite direction to the hole orientation may be "lower-left". In this case, a candidate area is defined by extension of the selected quadrangular area in one of the leftward direction and the downward direction. When the height Ch of the selected quadrangular area corresponds to the longer sides, the candidate area is defined by extension of the selected quadrangular area in the leftward direction. The width Pw of the candidate area is equalized to the height Ch of the selected quadrangular area. When the width Cw of the selected quadrangular area corresponds to the longer sides, the candidate area is defined by extension of the selected quadrangular area in the downward direction. The height Ph of the candidate area is equalized to the width Cw of the selected quadrangular area. Therefore, as depicted in "No. 16" of FIG. 22, ((a longer one of Ch and Cw), (a longer one of Ch and Cw)) is assigned as the candidate area (Ph, Pw) and "downward or leftward" is assigned as the extension direction. Thus, as depicted in "No. 16" of FIG. 23, one of the height Ch and the width Cw of the selected quadrangular area 72 (e.g., the height Ch or the width Cw, which corresponds to the longer sides) is assigned to both of the height Ph and the width Pw of the candidate area 73. For each of examples of "No. 17", "No. 18", and "No. 19" in FIGS. 22 and 23, a candidate area may be defined in a similar manner to the example of "No. 16" except that "downward or rightward" is assigned as the extension direction of "No. 17", "upward or rightward" is assigned as the extension direction of "No. 18", and "upward or leftward" is assigned as the extension direction of "No. 19".

In many cases, the shape of a punched hole may be square, whereby it may be preferable that the shape of the candidate area circumscribing a complete square outline be square. Thus, the selected quadrangular area is extended in the above-described manner. Accordingly, a candidate area is defined by equalizing the length of the shorter sides of the selected quadrangular area to the length of the longer sides of the selected quadrangular area in order to make each pair of opposite sides of the candidate area have an equal length.

As depicted in FIG. 17, subsequent to step S193, the CPU 21 determines whether the candidate area is in contact with any one of four ends of the selected partial image (e.g., step S194). More specifically, for example, the CPU 21 makes a determination in step S194 by determining, based on the selected partial image data and the candidate area data stored in the fourth table 244, whether any one of four ends of the candidate area coincides with any one of the four ends of the selected partial image.

Figure 24:
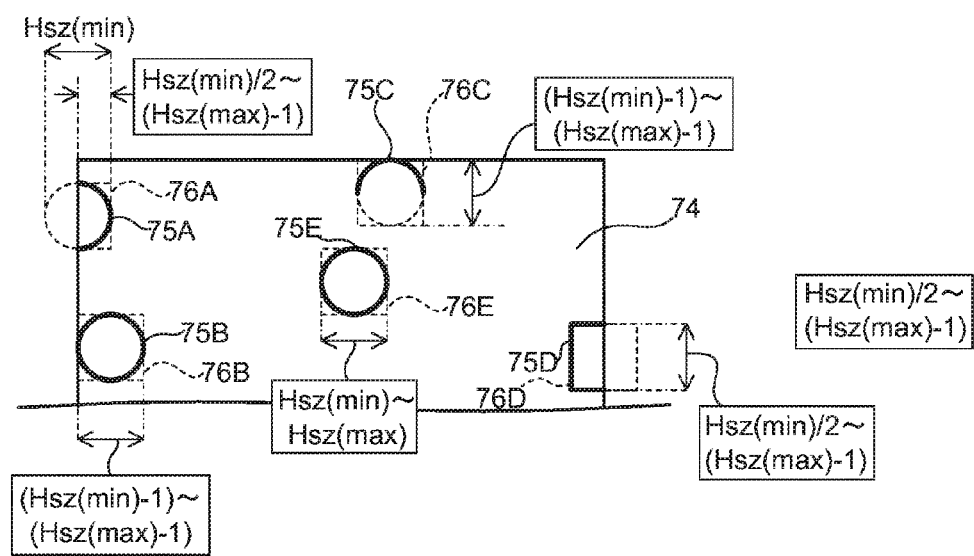
FIG. 24 illustrates outlines included in a partial image in the illustrative embodiment according to one or more aspects of the disclosure.

Step S193 will be described in detail using specific examples. As depicted in FIG. 24, it is assumed that a partial image 74 includes outlines 75A, 75B, 75C, 75D, and 75E and candidate areas 76A, 76B, 76C, 76D, and 76E are defined relative to the outlines 75A, 75B, 75C, 75D, and 75E, respectively. In step S194, the CPU 21 determines that each of the candidate areas 76A and 76B is in contact with a left end of the partial image 74. The CPU 21 determines that the candidate area 76C is in contact with an upper end of the partial image 74. The CPU 21 determines that the candidate area 76D is in contact with a right end of the partial image 74. The CPU 21 determines that the candidate area 76E is not in contact with any of the four ends of the partial image 74.

As depicted in FIG. 17, the CPU 21 determines, based on the determination result in step S194, a minimum judgment size and a maximum judgment size each for determining the size of the candidate area specified in S193, in accordance with the eighth table 248 (refer to FIG. 25) (e.g., step S195). Referring to FIG. 25, the eighth table 248 will be described in detail. In the eighth table 248, a minimum judgment size and a maximum judgment size are associated with a contacting end and a hole orientation. The contacting end represents the end with which a candidate area is in contact among the four ends (e.g., the upper end, the lower end, the right end, and the left end) of the selected partial image. The hole orientation represents the hole orientation determined in step S185 (refer to FIG. 16). The minimum judgment size represents a minimum size used as a criterion for candidate-area size determination. The maximum judgment size represents a maximum size used as a criterion for candidate-area size determination.

In the eighth table 248, the minimum hole size (refer to FIG. 3) and the maximum hole size (refer to FIG. 3) in the setting information are assigned to a minimum judgment size and a maximum judgment size, respectively, corresponding to a candidate area that is not in contact with any of the ends of the selected partial image (e.g., "No. 17"). A value smaller than the minimum hole size in the setting information is assigned to a minimum judgment size corresponding to a candidate area that is in contact with one of the ends of the selected partial image, and a value smaller than the maximum hole size in the setting information is assigned to a maximum judgment size corresponding to a candidate area that is in contact with one of the ends of the selected partial image (e.g., "Nos. 1 to 16"). Different determination manners of determining the minimum judgment size based on the minimum hole size and determining the maximum judgment size based on the maximum hole size may be used in accordance with the hole orientation of the outline included in the candidate area.

Step S195 will be described in detail using specific examples. It is assumed that the CPU 21 has been determined, in step S194, that the candidate area 76E is not in contact with any of the ends of the partial image 74 as depicted in FIG. 24, and in step S185, that the outline 75E of the hole orientation is "center". In this case, in step S195, the CPU 21 determines "minimum hole size (Hsz(min))" as the minimum judgment size and "maximum hole size (Hsz(max))" as the maximum judgment size, for "none" of the contacting end in the eighth table 248 as depicted in FIG. 25 (e.g., "No. 17").

As described above, when the candidate area 76E is not in contact with any of the ends of the partial image 74, the minimum hole size (refer to FIG. 3) in the setting information is determined as the minimum judgment size and the maximum hole size (refer to FIG. 3) in the setting information is determined as the maximum judgment size. In such a case, since an entire portion of the outline included in the candidate area is within the range of the selected partial image, there is a higher possibility that the outline has no missing portion. Therefore, the maximum hole size and the minimum hole size in the setting information (refer to FIG. 3) are used as the minimum judgment size and the maximum judgment size, respectively.

It is assumed that the CPU 21 has been determined, in step S194, that the candidate area 76A is in contact with the left end of the partial image 74 as depicted in FIG. 24, and in step S185, that the hole orientation of the outline 75A is "right". In this case, in step S195, the CPU 21 determines "minimum hole size/2 (Hsz(min)/2)" as the minimum judgment size and "maximum hole size−1 (Hsz(max)−1)" as the maximum judgment size, for "left end" of the contacting end and "right" of the hole orientation in the eighth table 248 as depicted in FIG. 25 (e.g., "No. 1").

As described above, when the hole orientation (e.g., "right") for the candidate area 76A is the direction toward one (e.g., the right end) of the ends of the partial image 74 opposite to the contacting end (e.g., the left end) of the partial image 74, the CPU 21 determines a value obtained by division of the minimum hole size (refer to FIG. 3) by "2" (hereinafter, referred to "minimum hole size/2") in the setting information as the minimum judgment size, and a value obtained by reduction of "1" from the maximum hole size (refer to FIG. 3) in setting information (hereinafter, referred to as "maximum hole size−1 (e.g., a length of one pixel)") as the maximum judgment size. In the eighth table 248, in each of examples of "Nos. 2, 3, 5, 6, 7, 9, 10, 11, 13, 14, and 15", similar to the example of "No. 1", a value obtained by "minimum hole size/2" is determined as the minimum judgment size and a value obtained by "maximum hole size−1 (e.g., a length of one pixel)" is determined as the maximum judgment size. The minimum judgment size and the maximum judgment size are determined for the candidate area 76D in the same or similar manner.

For reasons below, "minimum hole size/2" is assigned to the minimum judgment size in the eighth table 248 in each of the above examples. For example, the outline 75A included in the candidate area 76A may be a right portion of the outline corresponding to the punched hole and a left portion of the outline may be missing at the end of the partial image 74. Therefore, a half of the minimum hole size ("Hsz(min)/2") (refer to FIG. 24) is assigned to the minimum judgment size, whereby when a half or more portion of the candidate area 76A is included in the partial image 74, the punched-hole image included in the candidate area 76A may be determined as a target of elimination.

For reasons below, "maximum hole size−1" is assigned to the maximum judgment size in the eighth table 248 in each of the above examples. When filtering using the Sobel filter is executed in step S109 (refer to FIG. 14), the thickness of the outline may be increased by one pixel. Nevertheless, in a case that the outline is in contact with one of the ends of the partial image, even when filtering using the Sobel filter is executed, the outline might not protrude beyond the range of the partial image. As described above, after filtering, there may be a difference in thickness by one pixel between the case where the outline is in contact with one of the ends of the partial image and the case where the outline is not in contact with any of the ends of the partial image. Therefore, "maximum hole size−1" in which a length of one pixel is reduced from the maximum hole size is assigned to the maximum judgment size when the candidate area is in contact with one of the ends of the partial image. Thus, the maximum judgment size when the candidate area is in contact with one of the ends of the partial image is distinguished from the maximum judgment size (e.g. "maximum hole size") when the candidate area is not in contact with any of the ends of the partial image.

It is assumed that the CPU 21 has been determined, in step S194, that the candidate area 76C is in contact with the upper end of the partial image 74 as depicted in FIG. 24, and in step S185, that the hole orientation of the outline 75C is "upper". Therefore, the CPU 21 determines "minimum hole size−1" (Hsz(min)−1) as the minimum judgment size and "maximum hole size−1" (Hsz(max)−1) as the maximum judgment size, for "upper end" of the contacting end and "others" of the hole orientation in the eighth table 248 as depicted in FIG. 25 (e.g., "No. 12").

As described above, when the hole orientation (e.g., "upper") for the candidate area 76C is the direction toward the contacting end (e.g., the upper end) of the partial image 74, the CPU 21 determines a value obtained by reduction of "1" from the minimum hole size (refer to FIG. 3) in the setting information (hereinafter, referred to as "minimum hole size−1 (e.g., a length of one pixel)") as the minimum judgment size, and a value obtained by reduction of "1" from the maximum hole size (refer to FIG. 3) in the setting information (hereinafter, referred to as "maximum hole size−1 (e.g., a length of one pixel)" as the maximum judgment size. The candidate area 76C is defined by extension of the quadrangular area in the downward direction. Therefore, a calculation that the minimum hole size is divided by "2" for obtaining the minimum judgment size might not necessarily be executed. In the eighth table 248, in each of examples of "No. 4", "No. 8", and "No. 16", similar to the example of "No. 1", a value obtained by "minimum hole size−1" is determined as the minimum judgment size and "maximum hole size−1" as the maximum judgment size.

For reasons below, in the eighth table 248, "minimum hole size−1" is assigned to the minimum judgment size corresponding to the above examples. For example, the outline 75C included in the candidate area 76C may be an upper portion of the outline corresponding to the punched hole. In contrast to the example of the candidate area 76A, the hole orientation for the candidate area 76C is the same direction (e.g., "upper") as the direction in which the contacting end (e.g., "the upper end) of the partial image 74 is located. Therefore, there is a higher possibility that no portion of the outline 75C may be missing at the upper end of the partial image 74.

When filtering using the Sobel filter is executed in step S109 (refer to FIG. 14), the thickness of the outline may be increased by one pixel. Nevertheless, in a case that the outline is in contact with one of the ends of the partial image, even when filtering using the Sobel filter is executed, the outline might not protrude beyond the range of the partial image. As described above, after filtering, there may be a difference in thickness by one pixel between the case where the outline is in contact with one of the ends of the partial image and the case where the outline is not in contact with any of the ends of the partial image. Therefore, "minimum hole size−1" in which a length of one pixel is reduced from the minimum hole size is assigned to the minimum judgment size when the candidate area is in contact with one of the ends of the partial image is determined. Thus, the minimum judgment size when the candidate area is in contact with one of the ends of the partial image is distinguished from the minimum judgment size (e.g., "minimum hole size") when the candidate area is not in contact with any of the ends of the partial image. The reason for assigning "maximum hole size−1" to the maximum judgment size may be the same as the reason for assigning "minimum hole size−1" to the minimum judgment size.

It is assumed that the CPU 21 has determined, in step S194, that the candidate area 76B is in contact with the left end of the partial image 74 as depicted in FIG. 24, and in step S185, that the hole orientation of the outline 75B is "center". Therefore, the CPU 21 determines "minimum hole size−1" as the minimum judgment size and "maximum hole size−1" as the maximum judgment size, for "left end" of the contacting end and "others" of the hole orientation in the eighth table 248 depicted in FIG. 25 (refer to "No. 4"). As described above, when the hole orientation corresponding to the candidate area 76C is "center", the CPU 21 determines "minimum hole size−1 (e.g., a length of one pixel)" as the minimum judgment size and "maximum hole size−1 (e.g., a length of one pixel)" as the minimum hole size. The reasons for assigning "minimum hole size−1" and "maximum hole size−1" may be the same as the reasons for the example of the candidate area 76C.

As depicted in FIG. 17, when the selected quadrangular area data remains in the fourth table 244 after step S192 has been executed, subsequent to step S195 in which the minimum judgment size and the maximum judgment size are determined, the CPU 21 compares the height and the width of the candidate area with the minimum judgment size. When the CPU 21 determines that at least one of the height and the width of the candidate area is smaller than the minimum judgment size, the CPU 21 deletes the candidate area data and the selected quadrangular area data from the fourth table 244 (refer to FIGS. 6A and 6B) (e.g., step S197). The CPU 21 also compares the height and the width of the candidate area with the maximum judgment size. When the CPU 21 determines that at least one of the height and the width of the candidate area is greater than the maximum judgment size, the CPU 21 deletes the candidate area data and the selected quadrangular area data from the fourth table 244 (e.g., step S199).

When the selected quadrangular area data remains in the fourth table 244 after step S199 has been executed, the CPU 21 determines a particular central area (hereinafter, referred to as a "second central area") (e.g., step S200). The shape of the second central area may vary in accordance with the shape (e.g., round or quadrangle) determined in step S191 (refer to FIG. 16) based on the outline included in the candidate area. The CPU 21 stores second central area data representing the determined second central area in the fourth table 244 in accordance with the selected quadrangular area data and its corresponding candidate area data.

Figure 26:
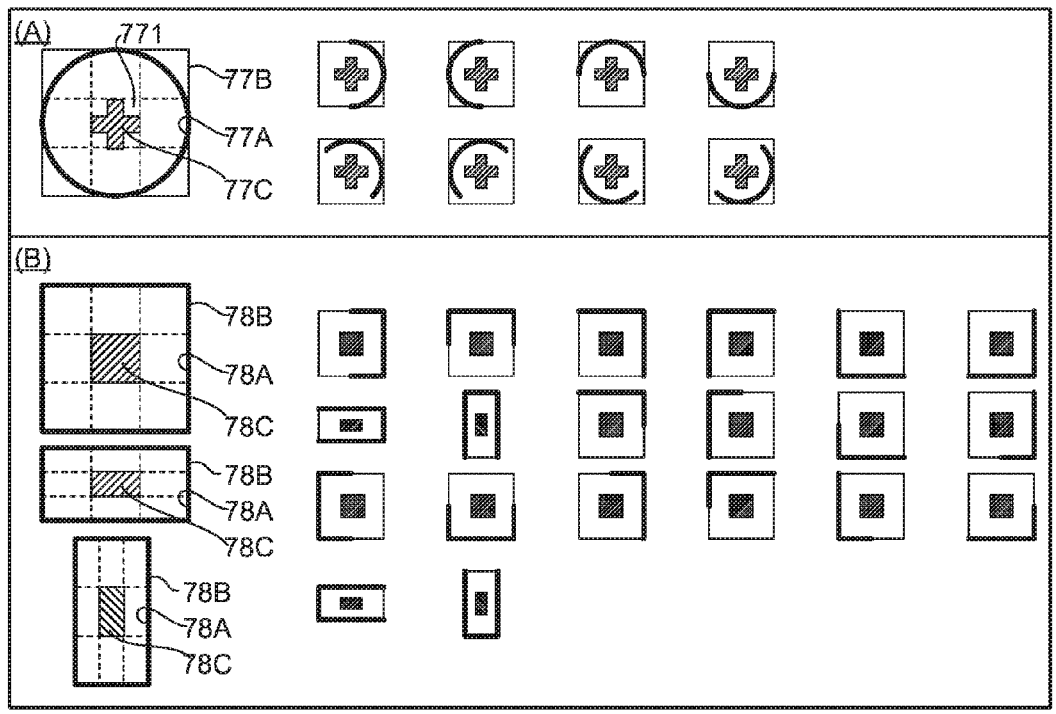
FIG. 26 illustrates second central areas in the illustrative embodiment according to one or more aspects of the disclosure.

Referring to FIG. 26, the second central area will be described in detail. As depicted in (A) of FIG. 26, it is assumed that the shape of an outline 77A included in a candidate area 77B has been determined as "circle". In this case, the CPU 21 divides the candidate area 77B into three equal areas both in the height direction and in the width direction to define nine segment areas in the candidate area 77B. The CPU 21 determines a central segment area 771 from the nine segment areas. The CPU 21 further divides the central segment area 771 into three equal areas both in the height direction and in the width direction to define further nine segment areas in the central segment area 771. The CPU 21 determines a cross-shaped second central area 77C including the segments areas other than the upper-left segment area, the upper-right segment area, the lower-left segment area, and the lower-right segment area of the nine segment areas. In a case that a circular outline includes a missing portion (e.g., a partially-missing circular outline), the CPU 21 determines a second central area 77C in a similar manner to the manner for determining a second central area in the complete circular outline 77A. The second central area 77C is larger in size than the first central area 645 (refer to FIG. 18) since the second central area is determined with relative to the candidate area defined by extension of the quadrangular area while the first central area is determined relative to the quadrangular area.

As depicted in (B) of FIG. 26, it is assumed that the shape of an outline 78A included in a candidate area 78B has been determined as "quadrangle". The shape of the candidate area determined based on the outline 78A may be square or rectangles having longer sides in one of the width direction and the height direction. In any cases above, the CPU 21 divides the candidate area 78B into three equal areas both in the height direction and in the width direction to define nine segment areas in the candidate area 78B. The CPU 21 determines a quadrangular central segment area from the nine segment areas, as a second central area 78C. In a case that a quadrangular outline includes a missing portion (e.g., a partially-missing quadrangular outline), the CPU 21 determines a second central area 78C in a similar manner to the manner for determining a second central area in the complete quadrangular outline 78A. The second central area 78C is larger in size than the first central area 695 (refer to FIG. 20). The second central area 77C depicted in (A) of FIG. 26 has a shape in which four corner portions of the second central area 78C depicted in (B) of FIG. 26 are removed in a quadrangular shape.

Figure 27:
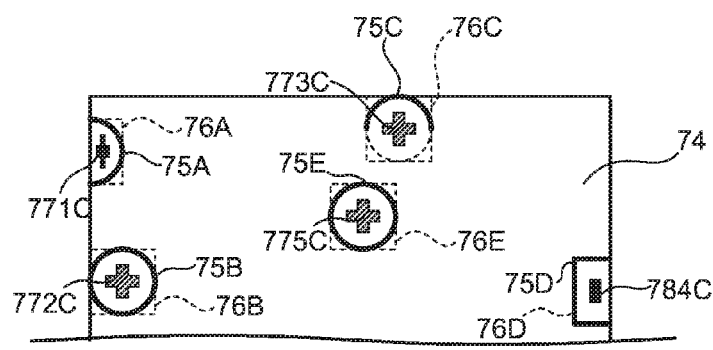
FIG. 27 illustrates outlines and second central areas included in a partial image in the illustrative embodiment according to one or more aspects of the disclosure.

As depicted in FIG. 27, it is assumed that the partial image 74 includes the outlines 75A, 75B, 75C, 75D, and 75E that are the same as those depicted in FIG. 24 and the candidate areas 76A, 76B, 76C, 76D, and 76E are defined relative to the outlines 75A, 75B, 75C, 75D, and 75E, respectively. In this case, second central areas 771C, 772C, 773C, 775C, and 784C are determined in the candidate areas 76A, 76B, 76C, 76D, and 76E, respectively.

For the candidate area 76A, while the outline 75A has a circular shape, the candidate area 76A has a rectangular shape because the candidate area 76A is in contact with one of the end of the partial image 74. In this case, the second central area 771C which is reduced in size in the width direction as compared with the second central area 77C depicted in (A) of FIG. 26 is determined (e.g., step S200). In the candidate area 76A having a rectangular shape, the width of the second central area 771C may be a quarter of the width of the candidate area 76A. When a candidate area has a square shape, the width of a second central area may be one-third of the width of the candidate area. In some cases, due to an influence of a shadow cast along the punched hole, the outline may have a thickness thicker than the outline on which no shadow is cast along the punched hole. In a case that the outline includes a missing portion because the outline is in contact with one of the ends of the partial image, the size of the second central area 771C is determined based on the rectangular candidate area 76A including the outline having a missing portion. Therefore, the second central area 771C may be closer to the outline having a missing portion than to an outline having no missing portion. Accordingly, in the example of the candidate area 76A, the CPU 21 determines a smaller second central area in order to avoid overlapping of an image corresponding to the shadow with the second central area. A relationship between the candidate area 76D and the second central area 784C is the same as the relationship between the candidate area 76A and the second central area 771C.

Subsequent to step S200, as depicted in FIG. 17, the CPU 21 determines whether a first-color pixel is included in the determined second central area. When the CPU 21 determines that a first-color pixel is included in the determined second central area, the CPU 21 deletes the candidate area data and the selected quadrangular area data from the fourth table 244 (e.g., step S201). The deletion of such data is executed because when the second central area includes a first-color pixel, there is a higher possibility that the outline does not have a shape of circle or quadrangle or the candidate area includes noise at its central portion. In such a case, there is a lower possibility that the image corresponding to the outline is a punched-hole image, whereby the CPU 21 deletes the candidate area data and the selected quadrangular area data from the fourth table 244.

For example, there may be a case that the selected quadrangular area data including the line segment 66J not corresponding to a punched hole might not be deleted from the fourth table 244 in step S192 because the CPU 21 determines that a first-color pixel is not included in the first central area as depicted in (J) of FIG. 20. In such a case, in steps S200 and S201, the presence or absence of a first-color pixel is determined with respect to the second central area. Therefore, when the CPU 21 determines that a first-color pixel is included in the second central area, the candidate area data and the selected quadrangular area data are deleted from the fourth table 244 in step S201.

In step S192 (refer to FIG. 16), when the first central area includes a first-color pixel, the selected quadrangular area data is deleted. The second central area is larger in size than the first central area. Therefore, through steps S200 and S201, any of selected quadrangular area data corresponding to an image other than a punched-hole image and having a shape similar to an outline corresponding to a punched-hole image may be deleted from the fourth table 244 with higher accuracy.

Figure 28:
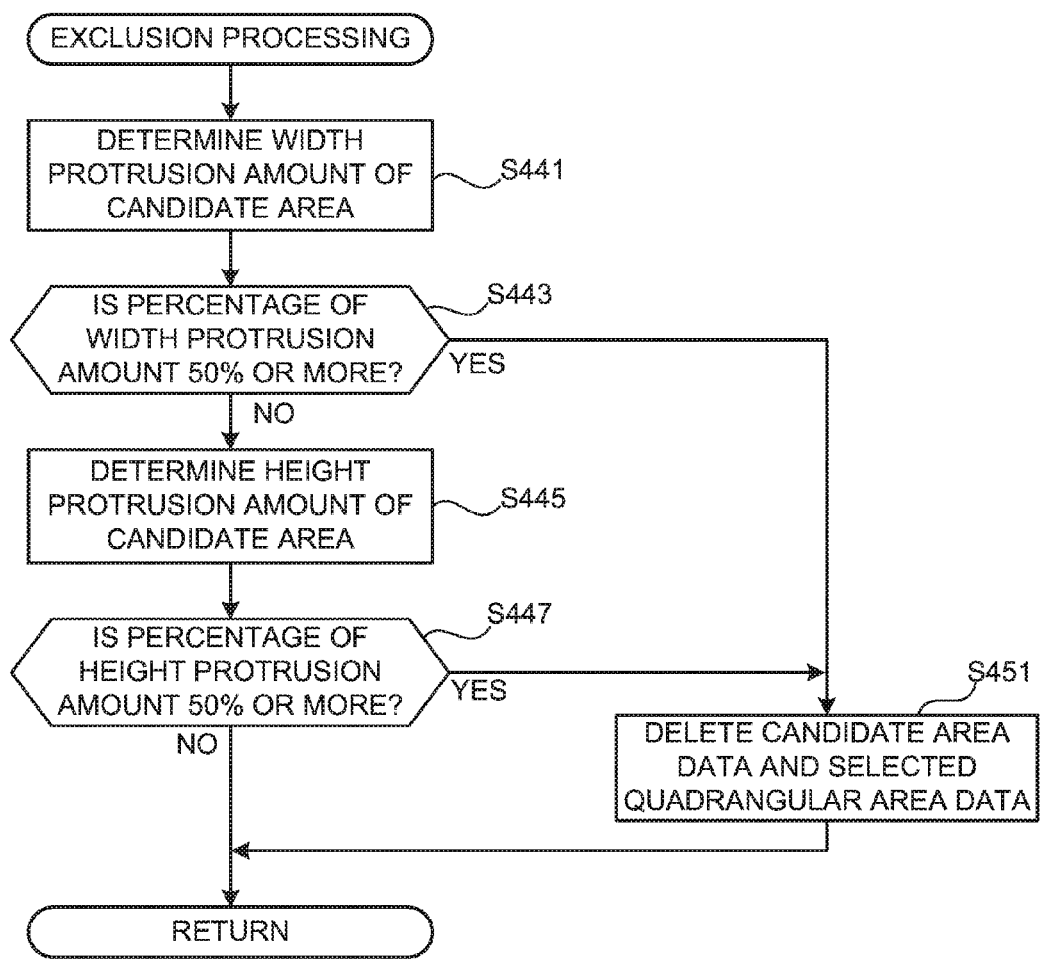
FIG. 28 is a flowchart depicting an example of exclusion processing in the illustrative embodiment according to one or more aspects of the disclosure.

When the selected quadrangular area data remains in the fourth table 244 after step S201 has been executed, the CPU 21 executes exclusion processing (refer to FIG. 28) (e.g., step S203). Referring to FIG. 28, the exclusion processing will be described in detail. The CPU 21 identifies a portion of the candidate area included in the processing-target area (hereinafter, referred to as an "in-area portion"). The CPU 21 identifies another portion of the candidate area that is included in the extended area but not included in the processing-target area (hereinafter, referred to as an "out-of-area portion"). The CPU 21 determines a length of the out-of-area portion of the candidate area in the width direction (e.g., step S441). Hereinafter, the length of the out-of-area portion of the candidate area in the width direction may be referred to as a "width protrusion amount".

The CPU 21 determines whether a percentage of the width protrusion amount relative to the entire length of the candidate area in the width direction is 50% or more (e.g., step S443). When the CPU 21 determines that the percentage of the width protrusion amount relative to the entire length of the candidate area in the width direction is 50% or more (e.g., YES in step S443), the CPU 21 deletes the candidate area data and the selected quadrangular area data from the fourth table 244 (e.g., step S451). The CPU 21 ends the exclusion processing and the routine returns to the extraction processing (refer to FIG. 17). When the CPU 21 determines that a percentage of the width protrusion amount relative to the entire length of the candidate area in the width direction is less than 50% (e.g., NO in step S443), the routine proceeds to step S445.

Figure 29:
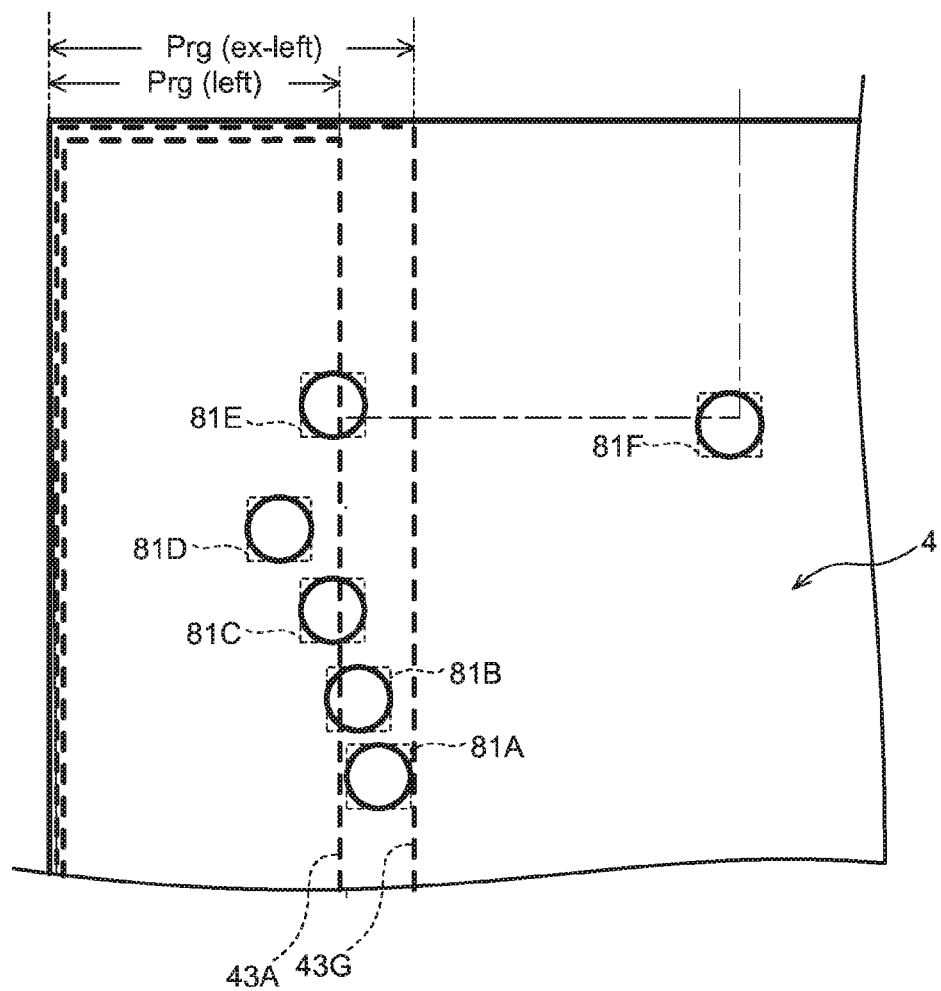
FIG. 29 illustrates outlines and quadrangular areas included in the original image in the illustrative embodiment according to one or more aspects of the disclosure.

Steps S441 and S443 will be described in detail using specific examples. As depicted in FIG. 29, it is assumed that the left extended area 43G has been defined by extension of the left processing-target area 43A in the width direction in the second obtaining processing. The original image 4 includes candidate areas 81A, 81B, 81C, 81D, 81E, and 81F relative to respective outlines. A partial image corresponding to the left extended area 43G includes the candidate areas 81A, 81B, 81C, 81D, and 81E.

An entire portion of the candidate area 81A is out of the left processing-target area 43A. In this case, the entire portion of the candidate area 81A is determined as an out-of-area portion, whereby the percentage of the width protrusion amount relative to the entire length of the candidate area 81A is 100%. An entire portion of the candidate area 81D is within the left processing-target area 43A. In this case, the entire portion of the candidate area 81D is determined as an in-area portion, whereby the percentage of the width protrusion amount relative to the entire portion of the candidate area 81D is 0%. A portion of each of the candidate areas 81B, 81C, and 81E is within the left processing-target area 43A and a remainder of each of the candidate areas 81B, 81C, and 81E is out of the left processing-target area 43A. The percentage of the length of the portion located to the right of the left processing-target area 43A in the width direction (e.g., an out-of-area portion of the candidate area) relative to the entire length of the candidate area in the width direction is calculated as the width protrusion amount. It is assumed that the percentage of the width protrusion amount of the candidate area 81B relative to the entire length of the candidate area 81B in the width direction is greater than 50% and the percentage of the width protrusion amount of each of the candidate areas 81C and 81E relative to the entire length of each of the candidate areas 81C and 81E, respectively, in the width direction is less than 50%.

In the above cases, the CPU 21 determines that the width protrusion amount of each of the candidate areas 81A and 81B relative to the entire length of each of the candidate areas 81A and 81B in the width direction is 50% or more (e.g., YES in step S443). Therefore, the CPU 21 deletes the candidate area data and the selected quadrangular area data corresponding to each of the candidate areas 81A and 81B from the fourth table 244 (e.g., step S451). In contrast to this, the CPU 21 determines that the width protrusion amount of each of the candidate areas 81C, 81D, and 81E in the width direction is less than 50% (e.g., NO in step S443). In this case, the CPU 21 might not delete the candidate area data and the selected quadrangular area data corresponding to each of the candidate areas 81C, 81D, and 81E from the fourth table 244.

Figure 30:
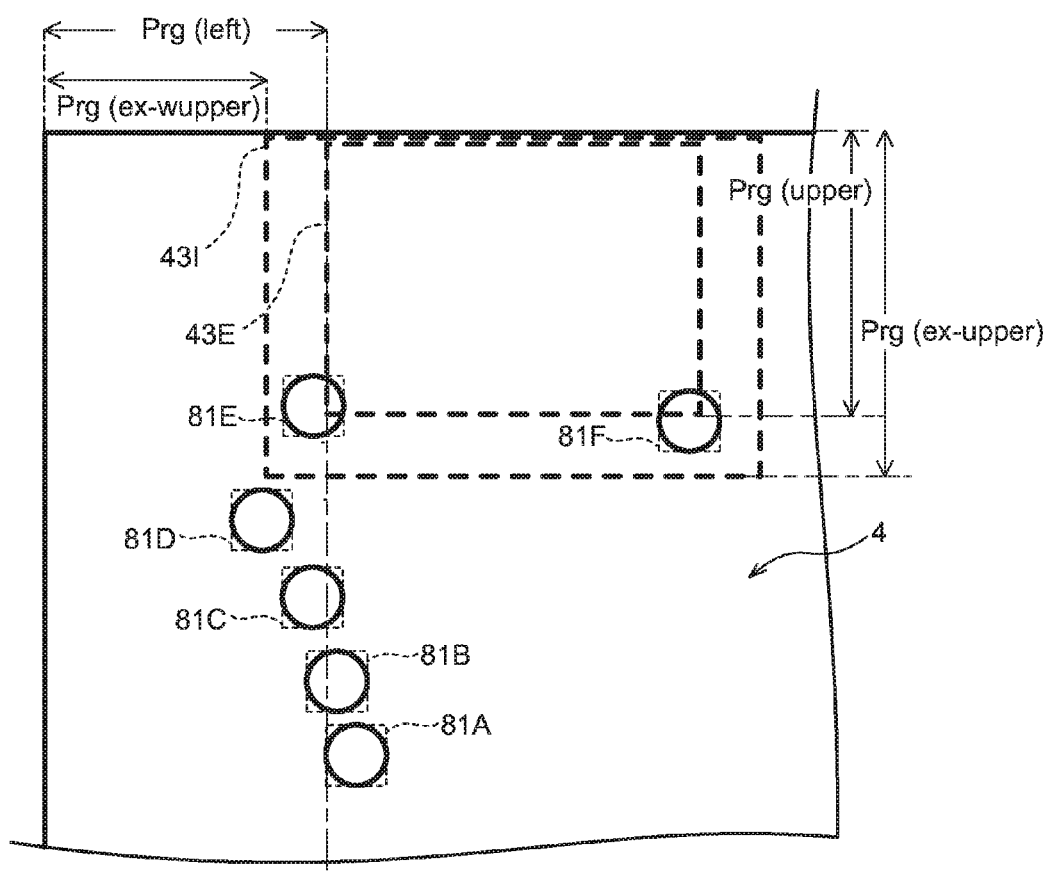
FIG. 30 illustrates the outlines and the quadrangular areas included in the original image in the illustrative embodiment according to one or more aspects of the disclosure.

As depicted in FIG. 30, it is assumed that the upper extended area 43I has been defined by extension of the upper processing-target area 43E in the width direction and in the height direction in the second obtaining processing (refer to step S63 in FIGS. 11A and 11B). A partial image corresponding to the upper extended area 43I includes the candidate areas 81E and 81F. A portion (e.g., an upper-right portion) of the candidate area 81E is within the upper processing-target area 43E and a remainder of the candidate area 81E is out of the upper processing-target area 43E. A portion (e.g., an upper-left portion) of the candidate area 81F is within the upper processing-target area 43E and a remainder of the candidate area 81F is out of the upper processing-target area 43E. In this case, the percentage of the length of the portion each located to the right or the left of the upper processing-target area 43E in the width direction (e.g., an out-of-area portion of the candidate area) relative to the entire length of the candidate area in the width direction is calculated as the width protrusion amount. In this case, the percentage of the width protrusion amount of the candidate area 81B relative to the entire length of the candidate area 81E may be greater than 50% and the percentage of the width protrusion amount of the candidate area 81F in the width direction may be less than 50%.

In the above example, in step S443, the CPU 21 determines that the width protrusion amount of the candidate area 81E relative to the entire length of the candidate area 81E in the width direction is 50% or more (e.g., YES in step S443). Therefore, the CPU 21 deletes, from the fourth table 244, the candidate area data and the selected quadrangular area data each corresponding to the candidate area 81E (e.g., step S451). The CPU 21 determines that the width protrusion amount of the candidate area 81F relative to the entire length of the candidate area 81F in the width direction is less than 50%. In this case, the CPU 21 might not delete, from the fourth table 244, the candidate area data and the selected quadrangular area data each corresponding to the candidate area 81F.

As depicted in FIG. 28, when the selected partial image is a partial image corresponding to one of the upper extended area and the lower extended area (refer to FIG. 30), the CPU 21 executes steps S445 and S447. When the selected partial image is a partial image corresponding to one of the left extended area and the right extended area (refer to FIG. 29), a candidate area might not protrude upward nor downward relative to the processing-target area. Thus, the CPU 21 ends the exclusion processing and the routine returns to the extraction processing (refer to FIG. 17).

The CPU 21 determines a length of the out-of-area portion of the candidate area in the height direction (e.g., step S445). Hereinafter, the length of the out-of-area portion of the candidate area in the height direction may be referred to as a "length protrusion amount". The CPU 21 determines whether a percentage of the height protrusion amount relative to the entire length of the candidate area in the height direction is 50% or more (e.g., step S447). When the CPU 21 determines that the percentage of the height protrusion amount relative to the entire length of the candidate area in the height direction is 50% or more (e.g., YES in step S447), the CPU 21 deletes the candidate area data and the selected quadrangular area data from the fourth table 244 (e.g., step S451). The CPU 21 ends the exclusion processing and the routine returns to the extraction processing (refer to FIG. 17). When the CPU 21 determines that the percentage of the height protrusion amount relative to the entire length of the candidate area in the height direction is less than 50% (e.g., NO in step S447), the CPU 21 ends the exclusion processing and the routine returns to the extraction processing (refer to FIG. 17).

Step S445 and S447 will be described in detail using specific examples. As depicted in FIG. 30, it is assumed that the upper extended area 43I has been defined by extension of the upper processing-target area 43E both in the width direction and in the height direction in the second obtaining processing (refer to step S63 in FIGS. 11A and 11B). A partial image corresponding to the upper extended area 43I includes the candidate areas 81E and 81F. It is assumed that the percentage of the height protrusion amount of the candidate area 81F in the height direction is 50% or more while it is determined that the percentage of the width protrusion amount of the candidate area 81F in the width direction is less than 50% in step S443 (refer to FIG. 28). In this case, the CPU 21 determines, in step S447, that the height protrusion amount of the candidate area 81F in the height direction is 50% or more (e.g., YES in step S447). Therefore, the CPU 21 deletes the candidate area data and the selected quadrangular area data each corresponding to the candidate area 81F from the fourth table 244 (e.g., step S451).

That is, when determination of the percentage of the width protrusion amount (e.g., step S443) is executed based on the partial image corresponding to the left extended area 43G, the candidate area data and the selected quadrangular area data each corresponding to each of the candidate areas 81C, 81D, and 81E remain in the fourth table 244 after step S443 has been executed (refer to FIG. 29). In this case, determination of the percentage of the height protrusion amount (e.g., step S447) might not be executed based on the partial image corresponding to the left extended area 43G. When determination of the percentage of the width protrusion amount (e.g., step S443) is executed based on the partial image corresponding to the upper extended area 43I, the candidate area data and the selected quadrangular area data each corresponding to the candidate area 81F remain in the fourth table 244. Nevertheless, when determination of the percentage of the height protrusion amount (e.g., step S447) is further executed based on the partial image corresponding to the upper extended area 43I, the candidate area data and the selected quadrangular area data each corresponding to the candidate area 81F are deleted from the fourth table 244.

Subsequent to the exclusion processing (e.g., step S203), as depicted in FIG. 17, when the resolution of the selected partial image has been reduced to 100 dpi in step S83 (refer to FIG. 13), the CPU 21 converts image data of the portion included in the candidate area in the selected partial image such that the image data of the portion included in the candidate area in the selected partial image has the same resolution (refer to FIG. 2) as the resolution in the attribution information (e.g., step S205). The CPU 21 determines whether all of the one or more pieces of quadrangular area data stored in the fourth table 244 (refer to FIGS. 6A and 6B) have been selected in step S175 (refer to FIG. 16) (e.g., step S207). When the CPU 21 determines that there is quadrangular area data that has not been selected yet remaining in the fourth table 244 (e.g., NO in step S207), the routine returns to step S175 (refer to FIG. 16). The CPU 21 selects one of the one or more pieces of not-yet-selected quadrangular area data from the fourth table 244 (e.g., step S175), and executes steps S177 to S205 (refer to FIG. 16) on the selected quadrangular area data. When the CPU 21 determines that all of the one or more pieces of quadrangular area data stored in the fourth table 244 (refer to FIGS. 6A and 6B) have been selected in step S175 (e.g., YES in step S207), the CPU 21 ends the extraction processing and the routine returns to the main processing (refer to FIGS. 5A and 5B).

As depicted in FIGS. 5A and 5B, the CPU 21 executes the extraction processing (e.g., step S13) on the first image data stored in the fourth table 244 (refer to FIG. 4) and then executes the extraction processing on the second image data stored in the fourth table 244 (refer to FIGS. 6A and 6B) (e.g., step S15). The extraction processing to be executed on the second image data may be the same or similar to the extraction processing executed on the first image data, and therefore, a detailed description of the extraction processing to be executed on the second image data will be omitted. Through the extraction processing of steps S13 and S15, the quadrangular area data and the candidate area data each corresponding to the first image and the quadrangular area data and the candidate area data each corresponding to the second image are stored in the fourth table 244. Subsequent to step S15, the CPU 21 executes hole identification processing (refer to FIG. 31) based on the quadrangular area data and the candidate area data corresponding to the first image (e.g., step S17).

<Stage B2: Hole Identification Processing>

Figure 31:
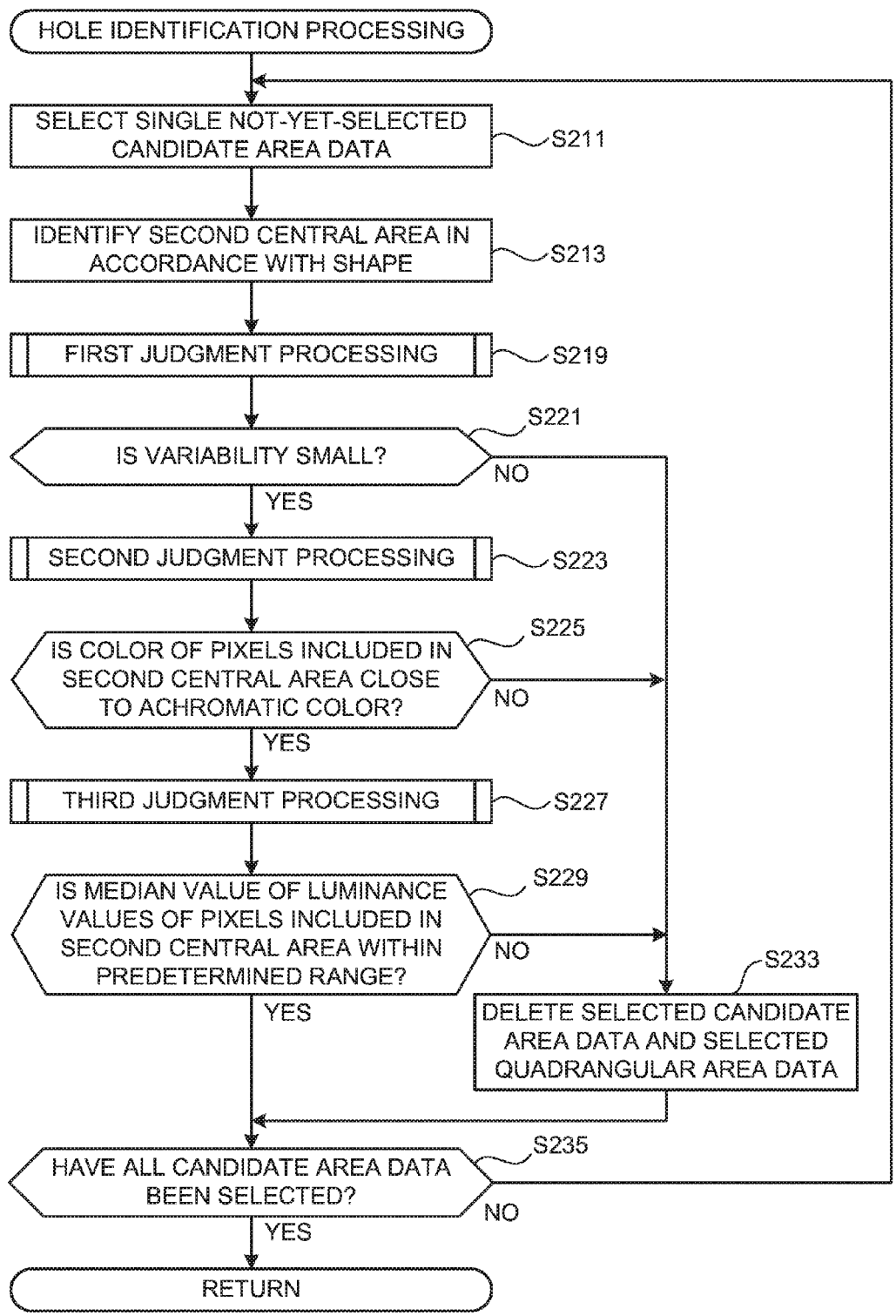
FIG. 31 is a flowchart depicting an example of hole identification processing in the illustrative embodiment according to one or more aspects of the disclosure. in the illustrative embodiment according to one or more aspects of the disclosure

Referring to FIG. 31, the hole identification processing will be described in detail. The CPU 21 selects one of the one or more pieces of candidate area data stored in the fourth table 244 (refer to FIGS. 6A and 6B) (e.g., step S211). Hereinafter, the candidate area data selected in step S211 may be referred to as "selected candidate area data" and a candidate area corresponding to the selected candidate area data may be referred to as a "selected candidate area". Quadrangular area data corresponding to the selected candidate area data may be referred to as "selected quadrangular area data". A quadrangular area corresponding to the selected quadrangular area data may be referred to as a "selected quadrangular area".

The CPU 21 extracts the second central area data associated with the selected candidate area data from the fourth table 244. The CPU 21 identifies the second central area represented by the second central area data (e.g., step S213). The second central area data in the fourth table 244 may be stored in step S200 (refer to FIG. 17) and represents the area (refer to FIG. 26) corresponding to the shape (e.g., round or quadrangle). More specifically, for example, as depicted in (A) of FIG. 26, when the shape is round, the identified second central area 77C may have a cross shape. The cross-shaped area is defined by the segment areas other than the upper-left segment area, the upper-right segment area, the lower-left segment area, and the lower-right segment area in the central segment area 771 which is divided into nine equal segment areas. The central segment area 771 may be the center of nine segment areas which are defined by which the candidate area 77B is divided into three equal segment areas both in the height direction and in the width direction. As depicted in (B) of FIG. 26, when the shape is quadrangle, the identified second central area 78C may have a quadrangular shape and may be the center of nine segment areas which are defined by which the candidate area 78B is divided into three equal segment areas both in the height direction and in the width direction.

Figure 32:
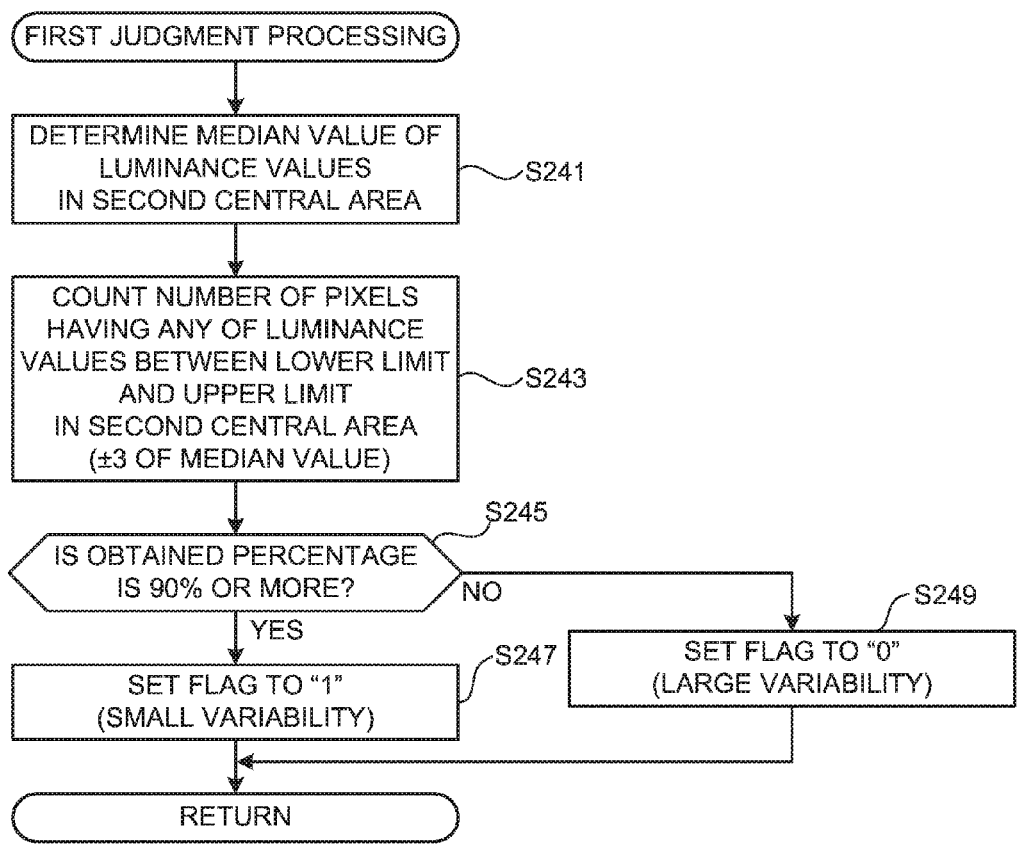
FIG. 32 is a flowchart depicting an example of first judgment processing in the illustrative embodiment according to one or more aspects of the disclosure.

Subsequent to determination of the second central area based on the fourth table 244, the CPU 21 executes first judgment processing (refer to FIG. 32) (e.g., step S219). Referring to FIG. 32, the first judgment processing will be described in detail. The CPU 21 calculates a luminance value of each pixel included in the second central area determined in step S213 in the selected partial image, using Equation (1). The CPU 21 determines a median value of the calculated luminance values (e.g., step S241). The CPU 21 obtains a lower limit by reducing "3" from the determined median value and an upper limit by adding "3" to the determined median value. The CPU 21 counts the number of pixels having any of luminance values between the lower limit and the upper limit inclusive in the pixels included in the second central area (e.g., step S243). Subsequent to step S243, the CPU 21 calculates a percentage of the number of pixels having any of luminance values between the lower limit and the upper limit inclusive relative to the total number of pixels included in the second central area. The CPU 21 determines whether the obtained percentage is 90% or higher (e.g., step S245).

When the CPU 21 determines that the obtained percentage is 90% or higher (e.g., YES in step S245), the CPU 21 sets a flag stored in the RAM 23 to "1" that represents that variability is small (e.g., step S247). Then, the CPU 21 ends the first judgment processing and the routine returns to the hole identification processing (refer to FIG. 31). When the CPU 21 determines that the obtained percentage is lower than 90% (e.g., NO in step S245), the CPU 21 sets the flag stored in the RAM 23 to "0" that represents that variability is large (e.g., step S249). Then, the CPU 21 ends the first judgment processing and the routine returns to the hole identification processing (refer to FIG. 31).

Subsequent to the first judgment processing (e.g., step S219), as depicted in FIG. 31, the CPU 21 determines, based on the value of the flag stored in the RAM 23, whether the variability of the luminance values of the pixels included in the second central area of the selected partial image is small (e.g., step S221). When the CPU 21 determines that the flag represents "1", the CPU 21 determines that the variability of the luminance values is small (e.g., YES in step S221). Then, the routine proceeds to step S223. When the CPU 21 determines that the flag represents "0", the CPU 32 determines that variability of the luminance values is large (e.g., NO in step S221). In this case, the CPU 21 deletes the selected candidate area data and the selected quadrangular area data from the fourth table 244 (refer to FIGS. 6A and 6B) (e.g., step S233), and the routine proceeds to step S235.

For reasons below, when the variability of the luminance values is large, the selected candidate area data and the quadrangular area data are deleted from the fourth table 244. The image included in the second central area corresponds to the background member read by the image scanner of the image reader 1 through the punched hole formed in the document. Therefore, all of the pixels of the image included in the second central area are supposed to have the same luminance values and thus the variability of the luminance values is supposed to be small. Thus, when the variability of the luminance values of the pixels included in the second central area is large, there is a higher possibility that the image might not correspond to the background member, resulting in that the image might not be a punched-hole image. In this case, there is a higher possibility that the candidate area is defined based on an image other than a punched-hole image. Accordingly, the selected candidate area data and the selected quadrangular area data each corresponding to the image are deleted from the fourth table 244.

Figure 33:
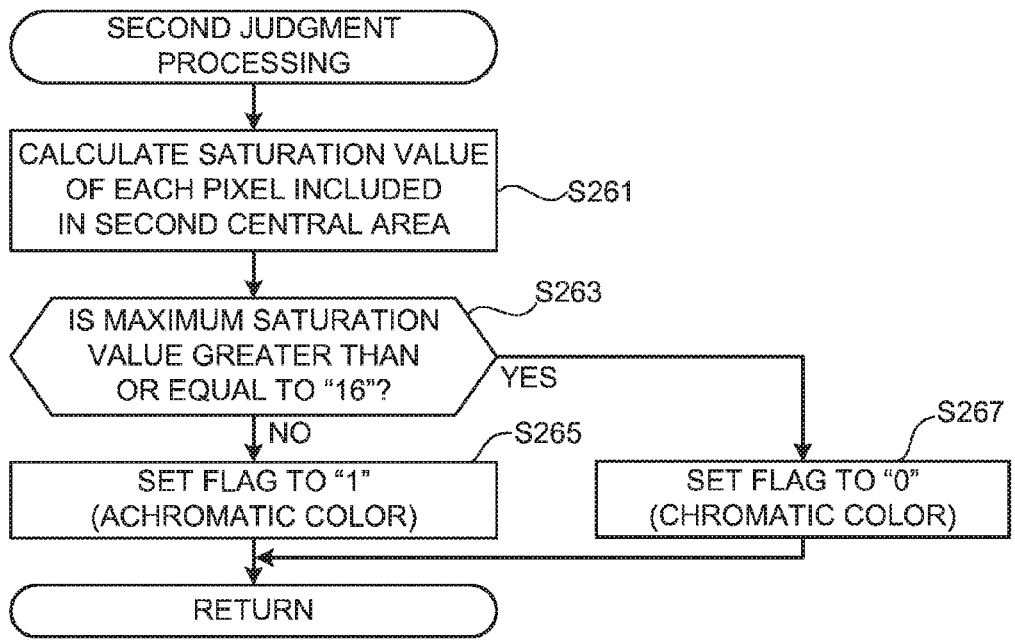
FIG. 33 is a flowchart depicting an example of second judgment processing in the illustrative embodiment according to one or more aspects of the disclosure.

When the CPU 21 made a positive determination in step S221 (e.g., YES in step S221), the CPU 21 executes second judgment processing (refer to FIG. 33) (e.g., step S223). Referring to FIG. 33, the second judgment processing will be described in detail. The CPU 21 calculates a saturation value of each pixel included in the second central area in the selected partial image, using Equation (4) (e.g., step S261). The CPU 21 determines a maximum value among the calculated saturation values. The CPU 21 determines whether the determined maximum saturation value is greater than or equal to "16" (e.g., step S263). When the CPU 21 determines that the determined maximum saturation value is smaller than "16" (e.g., NO in step S263), the CPU 21 sets a flag stored in the RAM 23 to "1" that represents the second central area has color close to achromatic color (e.g., step S265). Then, the CPU 21 ends the second judgment processing and the routine returns to the hole identification processing (refer to FIG. 31). When the CPU 21 determines that the determined maximum saturation value is greater than or equal to "16" (e.g., YES in step S263), the CPU 21 sets the flag stored in the RAM 23 to "0" that represents the second central area has color close to chromatic color (e.g., step S267). Then, the CPU 21 ends the second judgment processing and the routine returns to the hole identification processing (refer to FIG. 31).

Subsequent to the second judgment processing (e.g., step S223), as depicted in FIG. 31, the CPU 21 determines, based on the value of the flag stored in the RAM 23, whether the color of the pixels included in the second central area of the selected partial image is close to achromatic color (e.g., step S225). When the CPU 21 determines that the flag represents "1", the CPU 21 determines that the color of the pixels included in the second central area of the selected partial image is close to achromatic color (e.g., YES in step S225). In this case, the routine proceeds to step S227. When the CPU 21 determines that the flag represents "0", the CPU 21 determines that the color of the pixels included in the second central area of the selected partial image is close to chromatic color (e.g., NO in step S225). In this case, the CPU 21 deletes the selected candidate area data and the selected quadrangular area data from the fourth table 244 (refer to FIGS. 6A and 6B) (e.g., step S233) and the routine proceeds to step S235.

For reasons below, when the color of the pixels included in the second central area of the selected partial image is close to chromatic color, the selected candidate area data and the quadrangular area data are deleted from the fourth table 244. The color of the background member is gray or white, each of which is achromatic color. Therefore, when the color of the pixels included in the second central area of the selected partial image is close to chromatic color, there is a higher possibility that the image might not correspond to the background member, resulting in that the image might not be a punched-hole image. In this case, there is a higher possibility that the candidate area is defined based on an image other than the punched-hole image. Accordingly, the selected candidate area data and the selected quadrangular area data each corresponding to the image are deleted from the fourth table 244.

Figure 34:
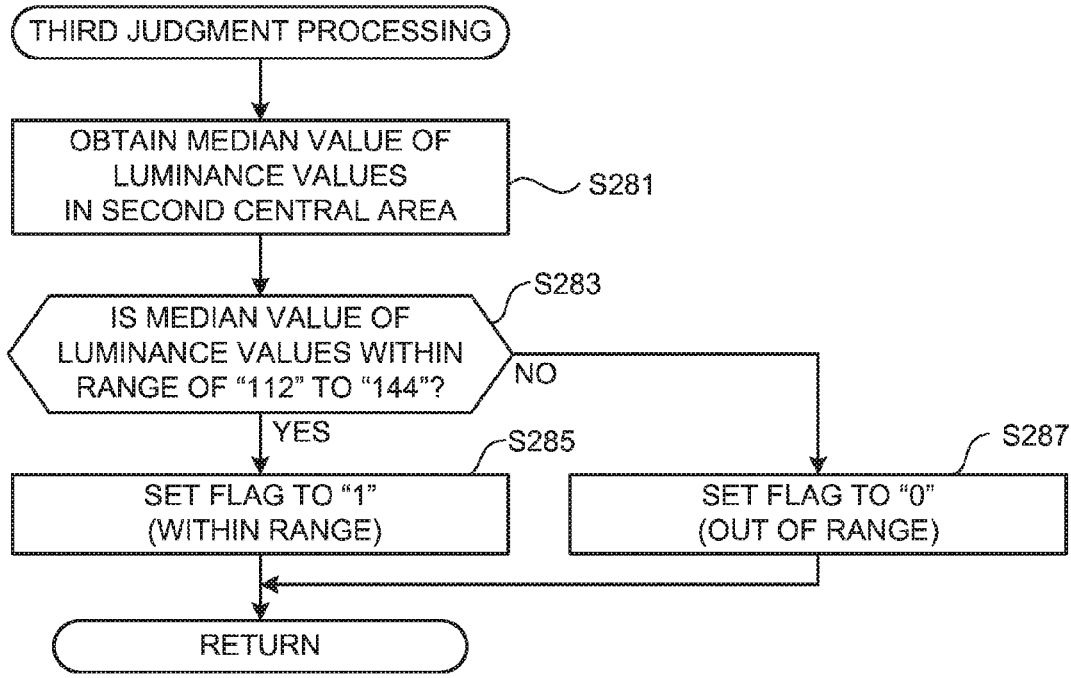
FIG. 34 is a flowchart depicting an example of third judgment processing in the illustrative embodiment according to one or more aspects of the disclosure.

When the CPU 21 made a positive determination in step S225 (e.g., YES in step S225), the CPU 21 executes third judgment processing (refer to FIG. 34) (e.g., step S227). Referring to FIG. 34, the third judgment processing will be described in detail. The CPU 21 obtains a median value of the calculated luminance values of the pixels included in the second central area determined in step S241 (refer to FIG. 32) (e.g., step S281). Subsequent to step S281, the CPU 21 determines whether the median value of the luminance values is within a predetermined range (e.g., a range of "112" to "144") (e.g., step S283). When the CPU 21 determines that the median value of the luminance values is within the range of "112" to "144" (e.g., YES in step S283), the CPU 21 sets a flag stored in the RAM 23 to "1" that represents that the median value of the luminance values is within the predetermined range (e.g., step S285). Then, the CPU 21 ends the third judgment processing and the routine returns to the hole identification processing (refer to FIG. 31). When the CPU 21 determines that the median value of the luminance values is out of the range of "112" to "144" (e.g., NO in step S283), the CPU 21 sets the flag stored in the RAM 23 to "0" that represents that the median value of the luminance values is out of the predetermined range (e.g., step S287). Then, the CPU 21 ends the third judgment processing and the routine returns to the hole identification processing (refer to FIG. 31).

Subsequent to the third judgment processing (e.g., step S223), as depicted in FIG. 31, the CPU 21 determines, based on the value of the flag stored in the RAM 23, whether the median value of the luminance values of the pixels included in the second central area of the selected partial image is within the predetermined range (e.g., step S229). When the CPU 21 determines that the flag represents "1", the CPU 21 determines that the median value of the luminance values is within the predetermined range (e.g., YES in step S229). In this case, the routine proceeds to step S235. When the CPU 21 determines that the flag represents "0", the CPU 32 determines that the median value of the luminance values is out of the predetermined range (e.g., NO in step S229). In this case, the CPU 21 deletes the selected candidate area data and the selected quadrangular area data from the fourth table 244 (refer to FIGS. 6A and 6B) (e.g., step S233) and the routine proceeds to step S235.

For reasons below, when the median value of the luminance values is out of the predetermined range, the selected candidate area data and the quadrangular area data are deleted from the fourth table 244. The color of the background member is adjusted such that its luminance value falls within the range of "112" to "144". Therefore, when the median value of the luminance values of the pixels included in the second central area of the selected partial image is out of the predetermined range, the pixels included in the second central area may have color far from the color of the background member. Thus, there is a higher possibility that the image might not correspond to the background member, resulting in that the image might not be a punched-hole image. In this case, there is a higher possibility that the candidate area is defined based on an image other than a punched-hole image. Accordingly, the selected candidate area data and the selected quadrangular area data each corresponding to the image are deleted from the fourth table 244.

As depicted in FIG. 31, the CPU 21 determines whether all of the one or more pieces of candidate area data stored have been selected in step S211 (e.g., step S235). When the CPU 21 determines that there is candidate area data that has not been selected yet in step S211 remaining in the fourth table 244 (e.g., NO in step S235), the routine returns to step S211. The CPU 21 selects one of the one or more pieces of not-yet-selected candidate area data from the fourth table 244 (e.g., step S211), and executes steps S213 to S233 on the selected candidate area data. When the CPU 21 determines that all of the one or more pieces of candidate area data stored in the fourth table 244 have been selected (e.g., YES in step S235), the CPU 21 ends the hole identification processing and the routine returns to the main processing (refer to FIGS. 5A and 5B).

Subsequent to the hole identification processing on the first image in step S17, as depicted in FIGS. 5A and 5B, the CPU 21 executes the hole identification processing on the second image (e.g., step S21). The hole identification processing executed on the second image may be the same or similar to the hole identification processing executed on the first image, and therefore, a detailed description of the hole identification processing executed on the second image will be omitted. Subsequent to the hole identification processing on the second image in step S21, the CPU 21 determines whether all of the partial images stored in the fourth table 244 have been selected in step S9 (e.g., step S23). When the CPU 21 determines that there is a partial image that has not been selected yet remaining in the fourth table 244 (e.g., NO in step S23), the routine returns to step S9. The CPU 21 selects one of the one or more not-yet-selected partial images from the fourth table 244 (e.g., step S9), and executes steps S11 to S21 on the selected partial image data. When the CPU 21 determines that all of the partial images stored in the fourth table 244 have been selected in step S9 (e.g., YES in step S23), the routine proceeds to step S25 and the CPU 21 executes determination processing (refer to FIG. 35) (e.g., step S25).

<Stage B3: Determination Processing>

Figure 35:
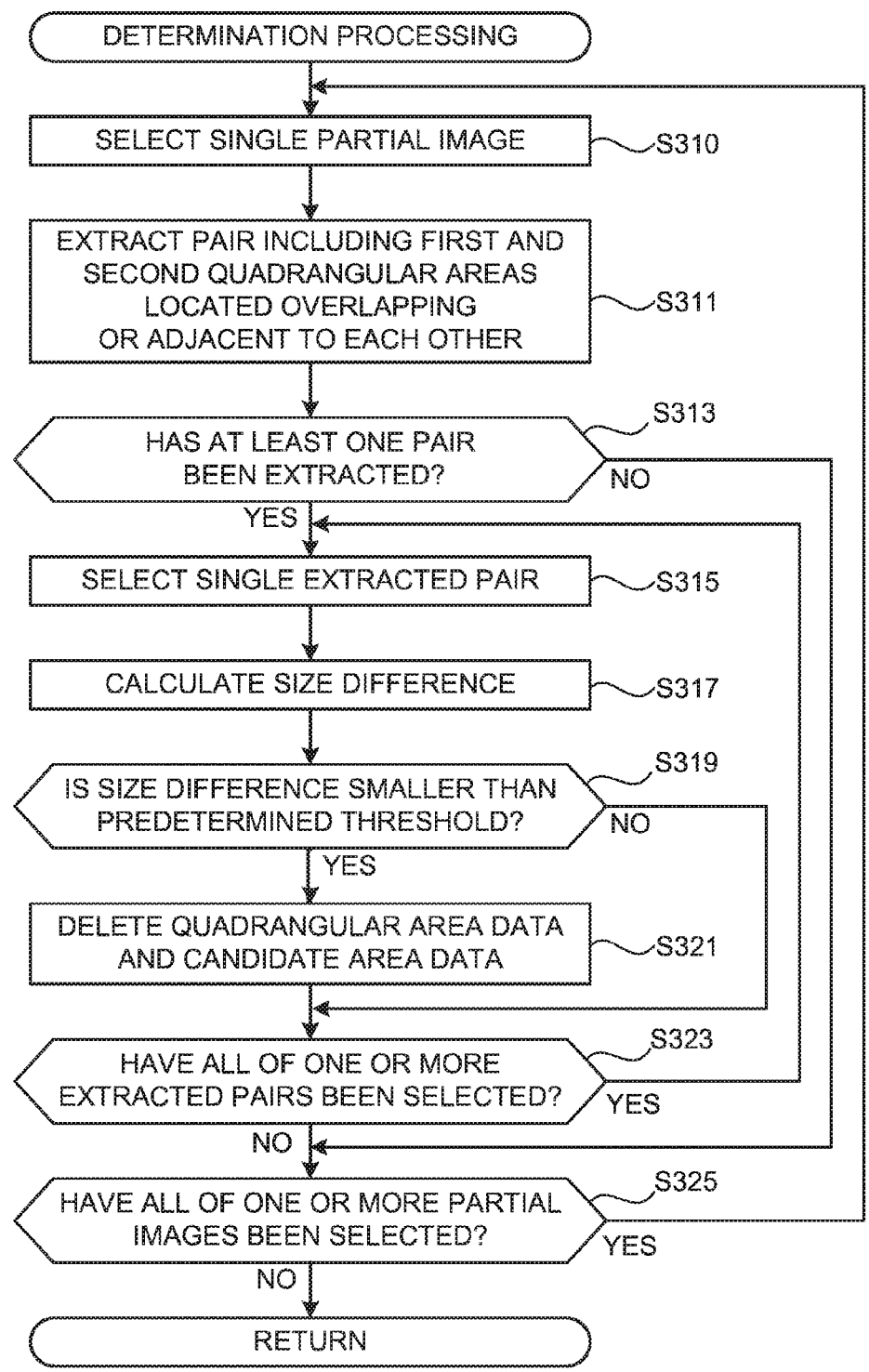
FIG. 35 is a flowchart depicting an example of determination processing in the illustrative embodiment according to one or more aspects of the disclosure.

Referring to FIG. 35, the determination processing will be described in detail. The CPU 21 selects one of the plurality of pieces of partial image data stored in the fourth table 244 as selected partial image data (refer to FIGS. 6A and 6B) (e.g., step S310). The CPU 21 extracts the first image data and the second image data each associated with the selected partial image data and further extracts the one or more pieces of quadrangular area data associated with each of the extracted first and second image data. The CPU 21 locates each of the quadrangular areas based on a corresponding one of the extracted quadrangular area data.

The CPU 21 calculates a difference in position (hereinafter, referred to as a "positional difference") between each of the one or more quadrangular areas determined based on the first image (hereinafter, referred to as a "first quadrangular area") and each of the one or more quadrangular areas determined based on the second image (hereinafter, referred to as a "second quadrangular area"). More specifically, for example, the CPU 21 obtains a positional difference of each pair of first quadrangular area and second quadrangular area. The CPU 21 obtains, as a positional difference of a pair of first quadrangular area and second quadrangular area, an average value (e.g., a mean) of an amount of positional difference in left end between the first quadrangular area and the second quadrangular area in the target pair, an amount of positional difference in right end between the first quadrangular area and the second quadrangular area in the target pair, an amount of positional difference in upper end between the first quadrangular area and the second quadrangular area in the target pair, and an amount of positional difference in lower end between the first quadrangular area and the second quadrangular area in the target pair. When the obtained positional difference is smaller than a predetermined threshold, the CPU 21 determines that the first quadrangular area and the second quadrangular area in the target pair are located overlapping or adjacent to each other, and thus extracts the pair including the first quadrangular area and the second quadrangular area which are located overlapping or adjacent to each other (e.g., step S311).

The CPU 21 determines whether one or more pairs each including the first quadrangular area and the second quadrangular area which are located overlapping or adjacent to each other, have been extracted in step S311 (e.g., step S313). When the CPU 21 determines that no pair has been extracted (e.g., NO in step S313), the routine proceeds to step S325.

When the CPU 21 determines that one or more pairs have been extracted in step S311 (e.g., YES in step S313), the CPU 21 selects one of the one or more extracted pairs (e.g., step S315). Subsequent to step S315, the CPU 21 calculates a difference in size (hereinafter, referred to as a "size difference") between the first quadrangular area and the second quadrangular area corresponding to the selected pair (e.g., step S317). More specifically, for example, the CPU 21 obtains an average value (e.g., a mean) of an amount of size difference in width between the first quadrangular area and the second quadrangular area and an amount of size difference in height between the first quadrangular area and the second quadrangular area.

The CPU 21 compares the obtained size difference with a predetermined threshold (e.g., step S319). When the CPU 21 determines that the obtained size difference is greater than the predetermined threshold (e.g., NO in step S319), the routine proceeds to step S323.

When the CPU 21 determines that the obtained size difference is smaller than or equal to the predetermined threshold (e.g., YES in step S319), the CPU 21 deletes the quadrangular area data and the candidate area data each corresponding to the second quadrangular area (e.g., step S321). In a case that the first quadrangular area and the second quadrangular area are located overlapping or adjacent to each other and the size difference between the first quadrangular area and the second quadrangular area is relatively small, there is a higher possibility that both of the punched-hole image included in the first quadrangular area and the punched-hole image included in the second quadrangular area represent the same punched hole. Accordingly, the quadrangular area data and the candidate area data each corresponding to the second quadrangular area are deleted. If processing for eliminating the punched-hole image is executed based on both of the quadrangular area data corresponding to the first and second quadrangular areas, the same processing may be duplicated on substantially the same area. Therefore, deletion of the quadrangular area data and the candidate area data each corresponding to the second quadrangular area may avoid execution of duplicate processing on the same area. Subsequent to step S321, the routine proceeds to step S323.

The CPU 21 determines whether all of the one or more extracted pairs have been selected in step S315 (e.g., step S323). When the CPU 21 determines that there is a pair that has not been selected yet (e.g., YES in step S323), the routine returns to step S315. The CPU 21 selects one of the one or more not-yet-selected pairs (e.g., step S315) and executes steps S317 to S321 on the selected pair. When the CPU 21 determines that all of the one or more extracted pairs have been selected (e.g., NO in step S323), the routine proceeds to step S325.

The CPU 21 determines whether all of the one or more pieces of partial image data stored in the fourth table 244 have been selected in step S310 (e.g., step S325). When the CPU 21 determines that there is partial image data that has not been selected yet remaining in the fourth table 244 (e.g., YES in step S325), the routine returns to step S310. The CPU 21 selects one of the one or more pieces of not-yet-selected partial image data (e.g., step S310), and executes steps S311 to S323 on the selected partial image data. When the CPU 21 determines that all of the one or more pieces of partial image data stored in the fourth table 244 have been selected (e.g., NO in step S325), the CPU 21 ends the determination processing and the routine returns to the main processing (refer to FIGS. 5A and 5B).

Subsequent to the determination processing (e.g., step S25), as depicted in FIGS. 5A and 5B, the CPU 21 selects one of the plurality of pieces of the quadrangular area data stored in the fourth table 244, as selected quadrangular area data (e.g., step S27). Subsequent to step S27, the CPU 21 executes color determination processing (refer to FIG. 36) based on the selected quadrangular area data (e.g., step S29).

<Stage B4: Color Determination Processing>

Figure 36:
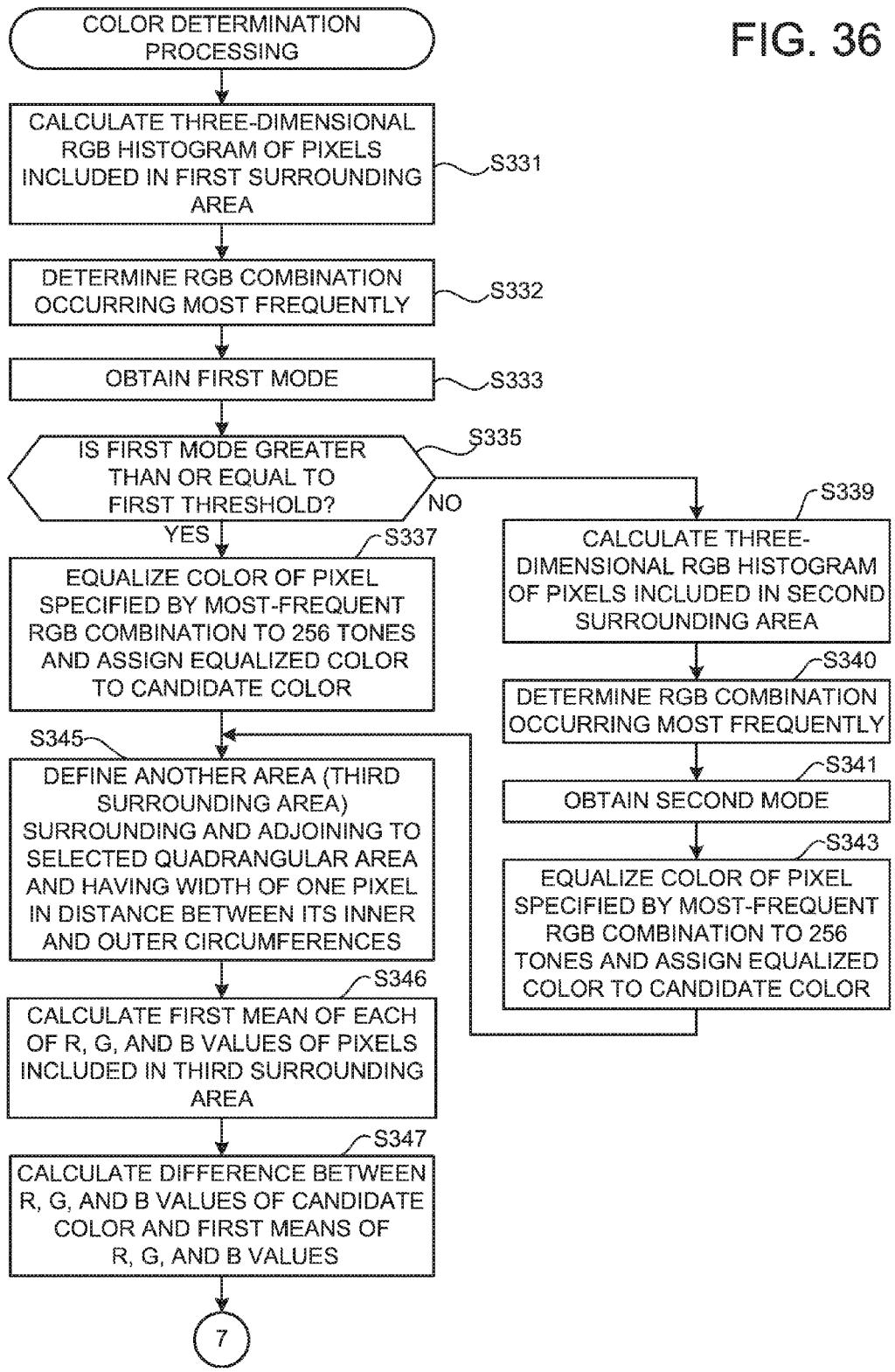
FIG. 36 is a flowchart depicting an example of color determination processing in the illustrative embodiment according to one or more aspects of the disclosure.
Figure 38:
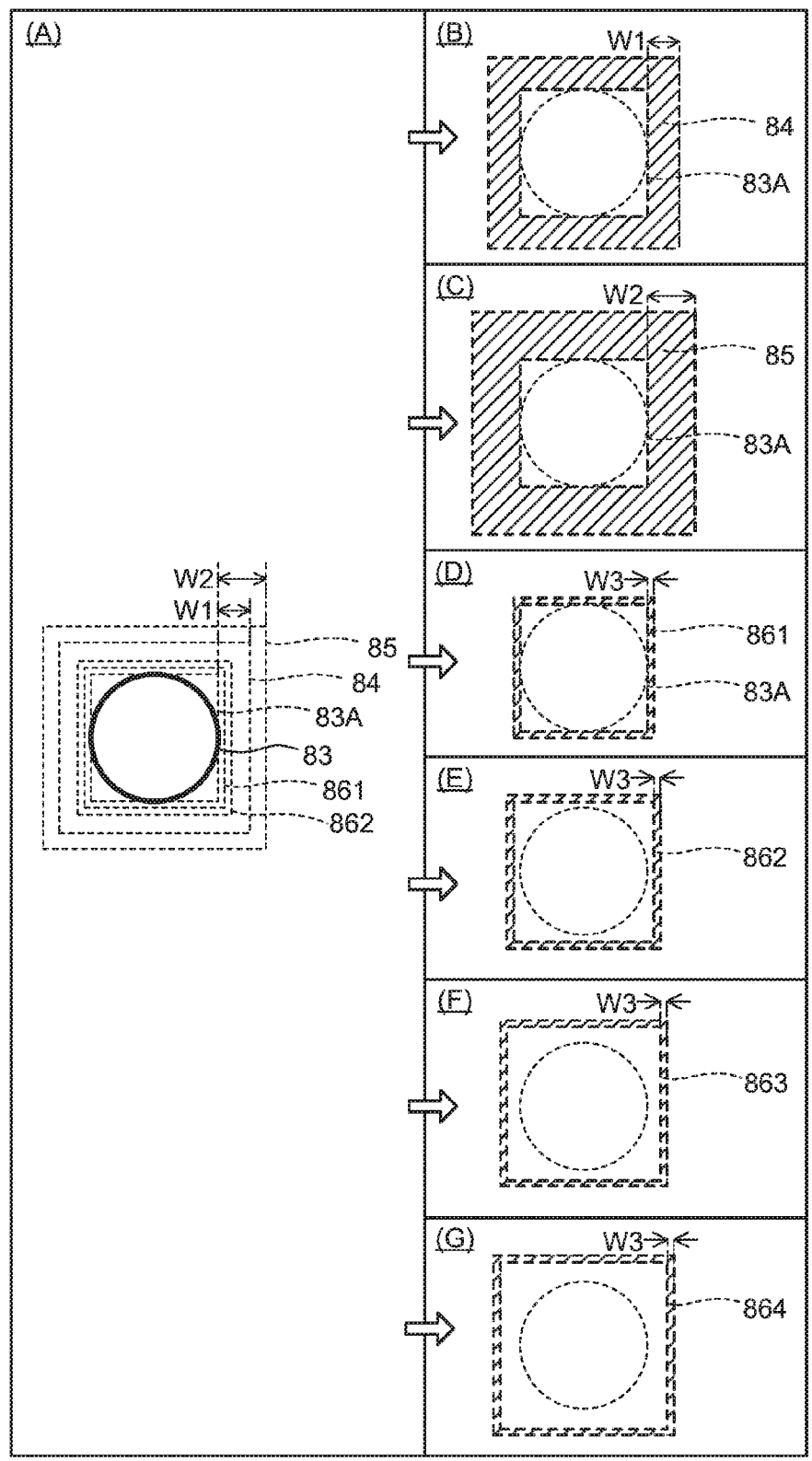
FIG. 38 illustrates surrounding areas in the illustrative embodiment according to one or more aspects of the disclosure.

Referring to FIG. 36, the color determination processing will be described in detail. The CPU 21 defines a first surrounding area, which surrounds and adjoins to the selected quadrangular area. A distance between an inner circumference and an outer circumference of the first surrounding area may be a first distance. As depicted in (A) of FIG. 38, a description will be made using an example in which a quadrangular area 83A circumscribing an outline 83 is selected. In this case, as depicted in (B) of FIG. 38, a first surrounding area 84 corresponds to an area surrounding and adjoining to the quadrangular area 83A and having a first distance W1 between an inner circumference and an outer circumference of the first surrounding area 84. The first distance W1 may be, for example, 1 mm As depicted in FIG. 36, the CPU 21 calculates a three-dimensional histogram representing a frequency distribution of the R, and B values of each pixel included in the defined first surrounding area of the original image (e.g., step S331). A value smaller than "256" (tones) may be used as the number of bins for each of the R, G, and B values to be used for calculating the three-dimensional histogram. For example, the number of bins for each of the R, and B values may be "16" because with increasing the number of bins, a longer time is required for calculating a three-dimensional histogram. In the three-dimensional histogram, a frequency of occurrence of each combination of R, G, and B values (hereinafter, referred to as an "RGB combination") is calculated. The CPU 21 determines, based on the calculated three-dimensional histogram, an RGB combination that occurs most frequently (e.g., step S332). Subsequent to step S332, the CPU 21 obtains the frequency of the determined RGB combination as a first mode (e.g., step S333). Subsequent to step S333, the CPU 21 determines whether the obtained first mode is greater than or equal to a predetermined first threshold (e.g., step S335). When the CPU 21 determines that the first mode is greater than or equal to the first threshold (e.g., YES in step S335), the CPU 21 equalizes the color specified by the most-frequent RGB combination determined in step S333 such that the color of the pixels is represented by 256 tones, and assigns the color to the candidate color (e.g., step S337). Subsequent to step S337, the routine proceeds to step S345.

For reasons below, the candidate color is determined as described above. When the color variability in the first surrounding area surrounding the quadrangular area corresponding to the punched-hole image is relatively small, the color of the first surrounding area may be similar to the ground color of the document. In this case, there is a higher possibility that the color of the first surrounding area is appropriate to be used as the filling color at the time of eliminating the punched-hole image. Therefore, when the CPU 21 determines that the first mode is greater than or equal to the first threshold, the CPU 21 assigns the color obtained based on the pixels included in the first surrounding area, to a candidate for the filling color.

When the CPU 21 determines that the obtained first mode is smaller than the first threshold (e.g., NO in step S335), the CPU 21 defines a second surrounding area, which surrounds and adjoins to the selected quadrangular area. A distance between an inner circumference and an outer circumference of the second surrounding area may be a second distance that is greater than the first distance. The second distance is determined such that the second surrounding area has an area approximately twice as large as the first surrounding area. As depicted in (C) of FIG. 38, a second surrounding area 85 corresponds to an area surrounding and adjoining to the quadrangular area 83A and having a second distance W2 between an inner circumference and an outer circumference of the second surrounding area 85. The second distance W2 is greater than the first distance W1 of the first surrounding area 84. For example, the second distance W2 may be 1.4 mm.

As depicted in FIG. 36, the CPU 21 calculates a three-dimensional histogram representing a frequency distribution of the R, G, and B values of each pixel included in the defined second surrounding area of the original image (e.g., step S339). Subsequent to step S339, the CPU 21 determines, based on the calculated three-dimensional histogram, an RGB combination that occurs most frequently (e.g., step S340). Subsequent to step S340, the CPU 21 obtains the frequency of the determined RGB combination as a second mode (e.g., step S341). Subsequent to step S341, the CPU 21 equalizes the color specified by the most-frequent RGB combination determined in step S341 such that the color of the pixels is represented by 256 tones, and assigns the color to the candidate color (e.g., step S343). Subsequent to step S343, the routine proceeds to step S345.

Figure 39:
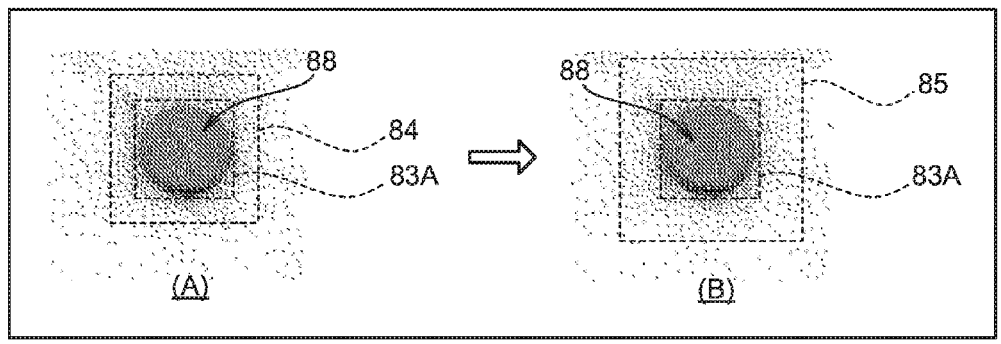
FIG. 39 illustrates surrounding areas in the illustrative embodiment according to one or more aspects of the disclosure.

For reasons below, the candidate color is determined as described above. As depicted in FIG. 39, it is assumed that a pressure-sensitive sheet (e.g., a document) having a punched hole is read by the image reader 1. The document may have color on a circumference of the punched hole due to application of pressure on the circumference of the punched hole when the punched hole is made. Therefore, when such a sheet is read by the image reader 1, as depicted in (A) of FIG. 39, the first surrounding area 84 surrounding the quadrangular area 83A corresponding to the punched-hole image 88 has a different color from the ground color of the document. In this case, there is a higher possibility that the color of the first surrounding area is inappropriate to be used as the filling color. Therefore, when the CPU 21 determines that the first mode is smaller than the first threshold, as depicted in (B) of FIG. 39, the CPU 21 assigns, to a candidate for the filling color, the color obtained based on the pixels included in the second surrounding area 85 that includes the first surrounding area 84 and its surrounding area.

As depicted in FIG. 36, the CPU 21 defines a third surrounding area, which surrounds and adjoins to the selected quadrangular area. A distance between an inner circumference and an outer circumference of the third surrounding area has a width of one pixel (e.g., step S345). As depicted in (D) of FIG. 38, a third surrounding area 861 corresponds to an area surrounding and adjoining to the quadrangular area 83A and having a third distance W3 between an inner circumference and an outer circumference of the third surrounding area 861. The third distance W3 has a width of one pixel, e.g., approximately 0.08 mm.

As depicted in FIG. 36, the CPU 21 calculates an average value (e.g., a mean) (hereinafter, referred to as a "first mean") of each of the R, G, and B values of pixels included in the defined third surrounding area of the original image (e.g., step S346). The CPU 21 calculates a difference between the R, G, and B values of the candidate color obtained in one of steps S337 and S343 and the first means of the R, G, and B values, respectively (hereinafter, referred to as a "first difference"), using Equation (5) (e.g., step S347). The R, G, and B values of the candidate color are indicated by R(0), G(0), and B(0), respectively, and the R, G, and B values of n-th means ("n" is a natural number of 1 or greater) are indicated by R(n), G(n), and B(n), respectively.

$$N\text{-th difference} = |R(0) - R(n)| + |G(0) - G(n)| + |B(0) - B(n)| \quad (5)$$

Figure 37A:
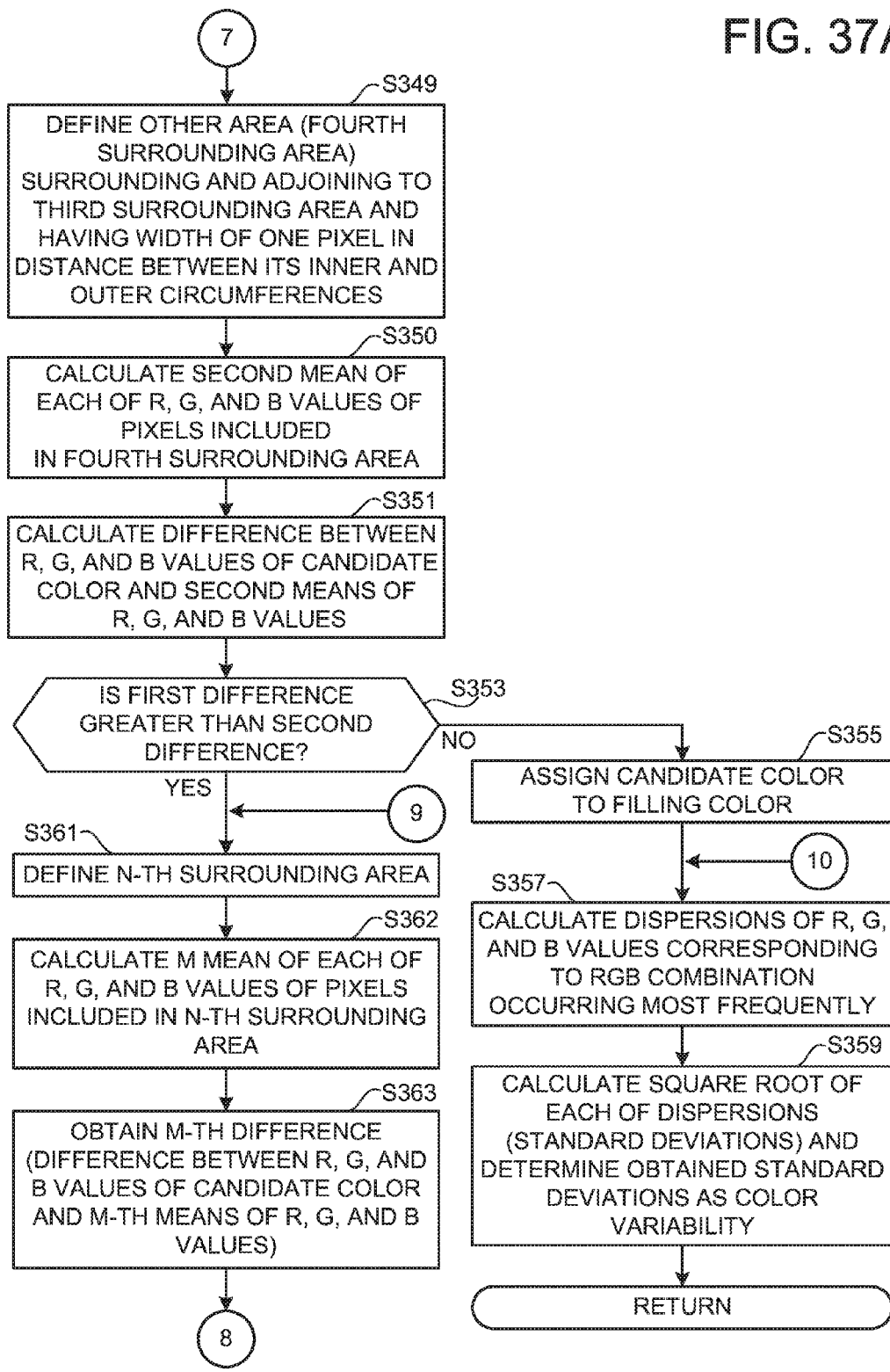
FIGS. 37A and 37B are continuations of the flowchart of FIG. 36 depicting the example of color determination processing in the illustrative embodiment according to one or more aspects of the disclosure.
Figure 37B:
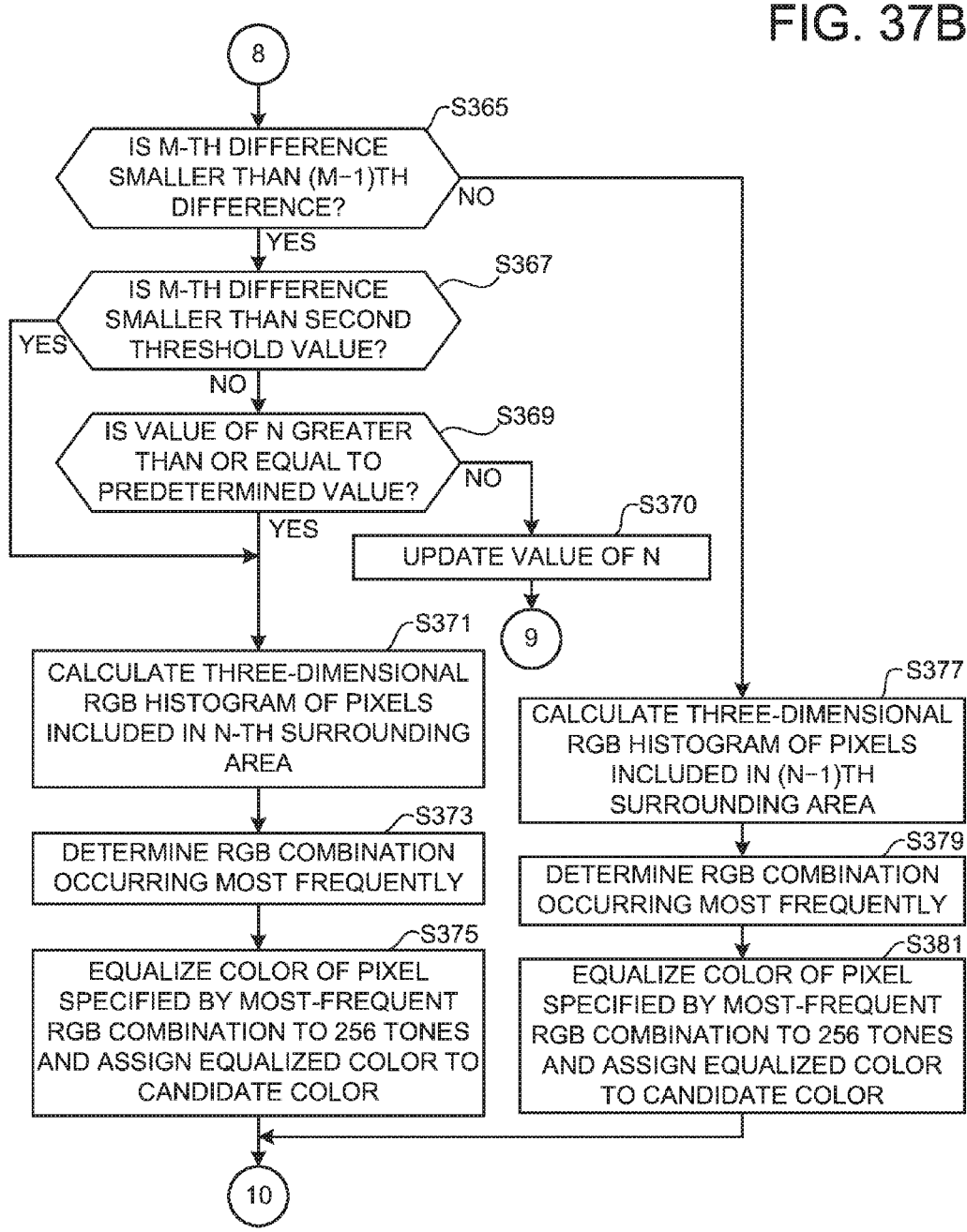

As depicted in FIGS. 37A and 37B, the CPU 21 defines a fourth surrounding area, which surrounds and adjoins to the third surrounding area. A distance between an inner circumference of the fourth surrounding area and an outer circumference of the fourth surrounding area has a width of one pixel (e.g., step S349). As depicted in (E) of FIG. 38, a fourth surrounding area 862 corresponds to an area surrounding and adjoining to the third surrounding area 861 and having the third distance W3 between the inner circumference and the outer circumference of the fourth surrounding area 862.

As depicted in FIGS. 37A and 37B, the CPU 21 calculates an average value (e.g., a mean) (hereinafter, referred to as a "second mean") of each of the R, G, and B values of pixels included in the defined fourth surrounding area of the original image (e.g., step S350). The CPU 21 calculates a difference between the R, G, and B values of the candidate color obtained in one of steps S337 and S343 and the second means of the R, G, and B values, respectively (hereinafter, referred to as a "second difference"), using Equation (5) (e.g., step S351).

The CPU 21 compares the first difference obtained in step S347 (refer to FIG. 36) and the second difference obtained in step S351 (e.g., step S353). When the CPU 21 determines that the first difference is smaller than or equal to the second difference (e.g., NO in step S353), the CPU 21 stores, in the fourth table 244 (refer to FIGS. 6A and 6B), as the filling color, the R, G, and B values representing the candidate color obtained in one of steps S337 and S343, in association with the selected quadrangular area data (e.g., step S355).

Figure 40:
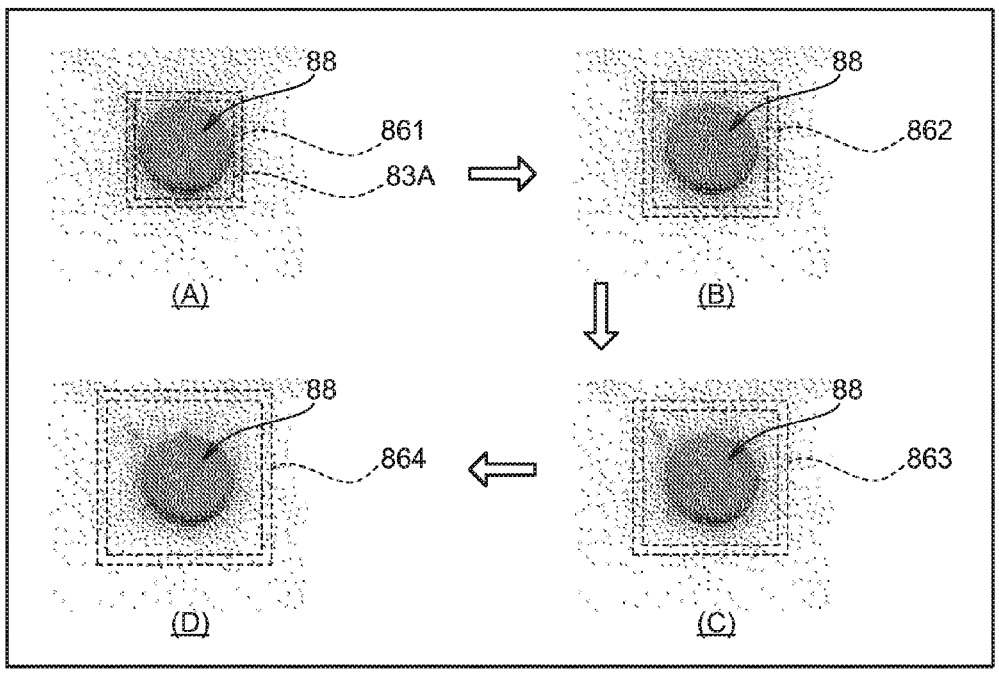
FIG. 40 illustrates surrounding areas in the illustrative embodiment according to one or more aspects of the disclosure.

For reasons below, the candidate color is determined as described above. As depicted in FIG. 40, it is assumed that a pressure-sensitive sheet (e.g., a document) having a punched hole is read by the image reader 1. The document may have color different from the ground color of the document on circumference of the punched hole. An area closer to the punched hole may have color different from the ground color at many locations and an area farther from the punched hole may have color different from the ground color at less locations (e.g., an occupation percentage of different color per unit area is higher at the closer area than the farther area). Therefore, as depicted in (A) and (B) of FIG. 40, the CPU 21 calculates an average value (e.g., a mean) of each of the R, and B values of the pixels included in the defined third surrounding area and an average value (e.g., a mean) of each of the R, G, and B values of the pixels included in the defined fourth surrounding area. Then, the CPU 21 calculates a first difference between the R, G, and B values of the candidate color and the first means of the R, and B values, respectively, and a second difference the R, and B values of the candidate color and the second means of the R, G, and B values, respectively. As depicted in (A) and (B) of FIG. 40, in a case that an area closer to the punched hole has color different from the ground color at more locations than an area farther from the punched hole, the first difference corresponding to the third surrounding area 861 that is closer to the punched hole than the fourth surrounding area 862 is greater than the second difference corresponding to the fourth surrounding area 862. In this case, the CPU 21 changes the candidate color determined in one of steps S337 and S343 (refer to FIG. 36) to another color through steps S361 to S381 and assigns the new color to the filling color. In contrast to the case depicted in FIG. 40, in a case that an area surrounding the punched hole has a color similar to the ground color of the document, the first difference corresponding to the third surrounding area 861 that is closer to the punched hole than the fourth surrounding area 862 is smaller than or equal to the second difference corresponding to the fourth surrounding area 862 (e.g., NO in step S353). In this case, the CPU 21 assigns the candidate color determined in one of steps S337 and S343 to the filling color (e.g., step S355).

Subsequent to step S355, as depicted in FIGS. 37A and 37B, the CPU 21 equalizes the color of the pixels included in the surrounding area used for the calculation of the filling color such that the color of the pixels is represented by 256 tones. The CPU 21 calculates means Rim Gm, and Bm corresponding to the R, G, and B values, respectively, using Equations (6), (7), and (8). The number of pixels included in the target surrounding area is indicated by "T". R, G, and B values of i-th (I=1 to T (any number)) pixel are indicated by "Ri", "Gi", and "Bi", respectively.

$$Rm = \frac{1}{T} \sum_{i=1}^{T} Ri \quad (6)$$

$$Gm = \frac{1}{T} \sum_{i=1}^{T} Gi \quad (7)$$

-continued $$Bm = \frac{1}{T}\sum_{i=1}^{T} Bi \qquad (6)$$

The CPU 21 calculates, based on the obtained means Rm, Gm, and Bm, dispersions $\alpha(r)^2$, $\alpha(g)^2$, and $\alpha(b)^2$ corresponding to the R, G, and B values, respectively, using Equations (9), (10), and (11) (e.g., step S357).

$$\sigma(r)^2 = \frac{1}{T}\sum_{i=1}^{T}(Ri - Rm)^2 \qquad (9)$$

$$\sigma(g)^2 = \frac{1}{T}\sum_{i=1}^{T}(Gi - Gm)^2 \qquad (10)$$

$$\sigma(b)^2 = \frac{1}{T}\sum_{i=1}^{T}(Bi - Bm)^2 \qquad (11)$$

The CPU 21 calculates standard deviations σ(r), σ(g), and σ(b) by calculating a square root of each of the calculated dispersions σ(r)², σ(g)², and σ(b)². The CPU 21 stores, in the fourth table 244 (refer to FIGS. 6A and 6B), the obtained standard deviations σ(r), σ(g), and σ(b), as values representing variation of respective colors (hereinafter, referred to as "variability"), in association with the filling color (e.g., step S359). The CPU 21 ends the color determination processing and the routine returns to the main processing (refer to FIGS. 5A and 5B).

When the CPU 21 determines that the first difference is greater than the second difference (e.g., YES in step S353), the CPU 21 sets a variable N ("N" may be a natural number) to, for example, "5" and defines an N-th surrounding area, which surrounds and adjoins to an (N−1)th surrounding area (e.g., step S361). A distance between an inner circumference and an outer circumference of the N-th surrounding area has a width of one pixel. For example, as depicted in (F) of FIG. 38, when the variable N is "5", the N-th surrounding area may be a fifth surrounding area 863. The fifth surrounding area 863 corresponds to an area surrounding and adjoining to the fourth surrounding area 862 and having the third distance W3 between the inner circumference and the outer circumference of the fifth surrounding area 863. The fourth surrounding area 862 may be the (N−1)th surrounding area relative to the fifth surrounding area 863.

As depicted in FIGS. 37A and 37B, the CPU 21 calculates an average value (e.g., a mean) of each of the R, G, and B values of pixels included in the defined N-th surrounding area of the original image (e g, step S362). Hereinafter, a mean obtained when the variable is N may be referred to as an "M-th mean" ("M" indicates a value that satisfies a relation of "M=N−2"). The CPU 21 calculates a difference between the R, and B values of the candidate color obtained in one of steps S337 and S343 and the M-th means of the R, and B values, respectively (hereinafter, referred to as an "M-th difference"), using Equation (5) (e.g., step S363).

The CPU 21 compares an (M−1)th difference and the M-th difference (e.g., step S365). When the CPU 21 determines that the M-th difference is smaller than the (M−1)th difference (e.g., YES in step S365), the routine proceeds to step S367. The CPU 21 determines that the M-th difference is smaller than the (M−1)th difference when a particular N-th surrounding area does not include color different from the ground color of the document because the N-th surrounding area defined around the punched-hole image 88 is located farther enough from the punched-hole image 88. As depicted in (A), (B), (C), and (D) in FIG. 40, a farther surrounding area from the punched hole has different color at less locations.

The CPU 21 compares the M-th difference and the predetermined second threshold (e.g., step S367). When the CPU 21 determines that the M-th difference is greater than or equal to the second threshold (e.g., NO in step S367), the CPU 21 determines whether the value of N is greater than or equal to a predetermined value (e.g., step S369). When the CPU 21 determines that the value of N is smaller than the predetermined value (e.g., NO in step S369), the CPU 21 updates the value of N by adding "1" to the value of N (e.g., step S370) and the routine returns to step S361. The CPU 21 defines another N-th surrounding area based on the value of the updated N (e.g., step S361) and executes steps S361 to S367 on the defined N-th surrounding area. When the CPU 21 determines, in step S367, that the M-th difference is smaller than the second threshold (e.g., YES in step S367), the routine proceeds to step S371. In this case, the color close to the ground color of the document may be assigned as the filling color by assignment of the filling color based on the pixels included in the N-th surrounding area. When the CPU 21 determines, in step S369, that the value of N is greater than or equal to the predetermined value (e.g., YES in step S369), the routine proceeds to step S371.

The CPU 21 calculates a three-dimensional histogram representing a frequency distribution of the R, and B values of each pixel included in the last (i.e., N-th) surrounding area of the original image (e.g., step S371). The CPU 21 determines, based on the calculated three-dimensional histogram, an RGB combination that occurs most frequently (e.g., step S373). The CPU 21 equalizes the color specified by the most-frequent RGB combination such that the color of the pixels is represented by 256 tones, and stores the color in the fourth table 244 (refer to FIGS. 6A and 6B) as the filling color (e.g., step S375). Subsequent to step S375, the routine proceeds to step S357. The CPU 21 calculates dispersions based on the color of the pixels included in the N-th surrounding area (e.g., step S357). The CPU 21 calculates standard deviations based on the dispersions, as color variability of the pixels included in the N-th surrounding area (e.g., step S359). The CPU 21 stores the obtained variability in the fourth table 244 (refer to FIGS. 6A and 6B) in association with the filling color stored in step S375. The CPU 21 ends the color determination processing and the routine returns to the main processing (refer to FIGS. 5A and 5B).

When the CPU 21 determines that the M-th difference is greater than or equal to the (M−1)th difference (e.g., NO in step S365), the routine proceeds to step S377. The CPU 21 calculates a three-dimensional histogram representing a frequency distribution of the R, G, and B values of each pixel included in the next previous (i.e., (N−1)th) surrounding area of the original image (e.g., step S377). Subsequent to step S377, the CPU 21 determines, based on the calculated three-dimensional histogram, an RGB combination that occurs most frequently (e.g., step S379). Subsequent to step S379, the CPU 21 equalizes the color specified by the most-frequent RGB combination such that the color of the pixels is represented by 256 tones, and stores the color in the fourth table 244 (refer to FIGS. 6A and 6B) as the filling color (e.g., step S381). Subsequent to step S381, the routine proceeds to step S357. The CPU 21 calculates dispersions based on the color of the pixels included in the (N−1)th surrounding area (e.g., step S357). Subsequent to step S357, the CPU 21 calculates standard deviations based on the obtained dispersions, as color variability of the pixels included in the (N−1)th surrounding area (e.g., step S359). Subsequent to step S359, the CPU 21 stores the obtained variability in the fourth table 244 (refer to FIGS. 6A and 6B) in association with the filling color stored in step S381. The CPU 21 ends the color determination processing and the routine returns to the main processing (refer to FIGS. 5A and 5B).

Subsequent to the color determination processing (e.g., step S29), as depicted in FIGS. 5A and 5B, the CPU 21 executes elimination processing (refer to FIG. 41) for eliminating the punched-hole image corresponding to the selected quadrangular area data, based on the filling color and the variability stored in the fourth table 244 (refer to FIGS. 6A and 6B) in the color determination processing (e.g., step S31).

<Stage B5: Elimination Processing>

Figure 41:
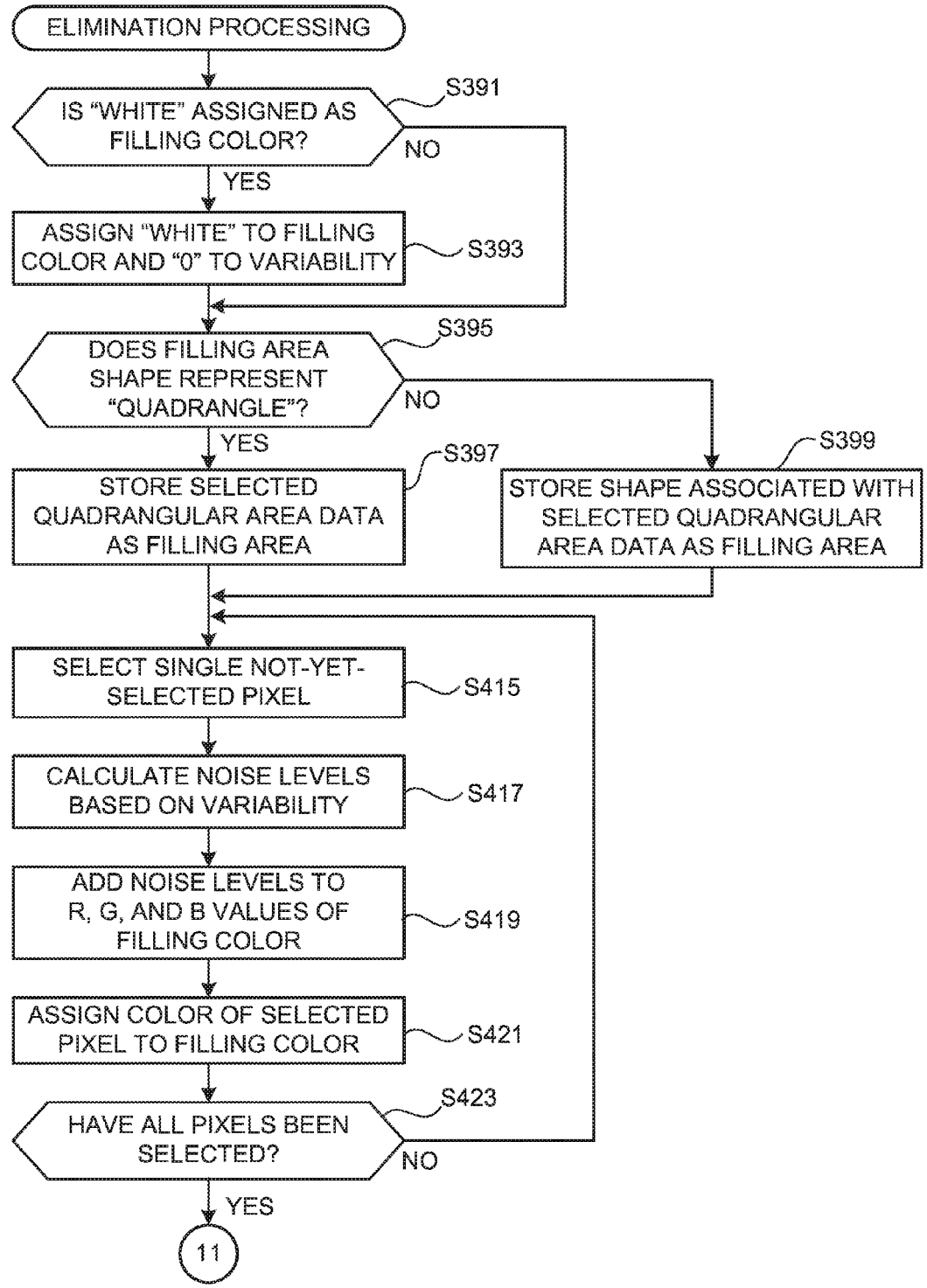
FIG. 41 is a flowchart depicting an example of elimination processing in the illustrative embodiment according to one or more aspects of the disclosure.

Referring to FIG. 41, the elimination processing will be described in detail. The CPU 21 determines whether "white" is assigned as the filling color in the setting information (refer to FIG. 3) (e.g., step S391). When the CPU 21 determines that "white" is assigned (e.g., YES in step S391), the CPU 21 assigns "white" to the filling color associated with the selected quadrangular area data in the fourth table 244 (refer to FIGS. 6A and 6B) (e.g., step S393). The CPU 21 also assigns "0" to the variability associated with the selected quadrangular area data in the fourth table 244 (e.g., step S393) and the routine proceeds to step S395. When the CPU 21 determines that "white" is not assigned as the filling color in the setting information (e.g., NO in step S391), the CPU 21 might not change the current settings of the filling color and the variability in the fourth table 244 and the routine proceeds to step S395.

The CPU 21 determines whether the filling area shape (refer to FIG. 3) in the setting information represents "quadrangle" (e.g., step S395). When the CPU 21 determines that the filling area shape represents "quadrangle" (e.g., YES in step S395), the CPU 21 stores the selected quadrangular area data in the fourth table 244 (refer to FIGS. 6A and 6B), as the filling area (e.g., step S397) and the routine proceeds to step S415. When the CPU 21 determines that the filling area shape (refer to FIG. 3) in the setting information represents that the filling area shape is determined in accordance with the shape of the punched-hole image (e.g., NO in step S395), the CPU 21 stores the shape associated with the selected quadrangular area data in the fourth table 244, as the filling area (e.g., step S399) and the routine proceeds to step S415.

The CPU 21 selects one of the pixels included in the area represented by the filling area in the fourth table 244 (e.g., step S415). The CPU 21 obtains a random number based on a known algorism. The CPU 21 obtains, based on the variability stored in the fourth table 244, a noise level of each of the R, G, and B values in the selected pixel, using Equations (12), (13), and (14) (e.g., step S417). Hereinafter, the noise levels corresponding to R, and B values may be indicated by "Pr", "Pg", and "Pb", respectively. The obtained random number is indicated by "S". The maximum value of the obtained random numbers is indicated by "Smax".

$$Pr = \sigma(r) \times (S - Smax/2)/(Smax/2) \quad (12)$$

$$Pg = \sigma(g) \times (S - Smax/2)/(Smax/2) \quad (13)$$

$$Pb = \sigma(b) \times (S - Smax/2)/(Smax/2) \quad (14)$$

The CPU 21 adds the noise level Pr to the R value of the filling color associated with the selected quadrangular area data in the fourth table 244. The CPU 21 adds the noise level Pg to the G value of the filling color associated with the selected quadrangular area data in the fourth table 244. The CPU 21 adds the noise level Pb to the B value of the filling color associated with the selected quadrangular area data in the fourth table 244 (e.g., step S419). Thus, the filling color including noise is generated. The CPU 21 assigns the color of the pixel selected in step S415 to the filling color to which the noise is added (i.e., conversion of the pixel value) (e.g., step S421).

The CPU 21 determines whether all of the pixels included in the area represented by the filling area have been selected in step S415 (e.g., step S423). When the CPU 21 determines that all of the pixels included in the filling area have not been selected (e.g., NO in step S423), the routine returns to step S415. The CPU 21 selects a not-yet-selected pixel from the pixels included in the area represented by the filling area (e.g., step S415) and executes steps S417 to S421 on the selected pixel. When the CPU 21 determines that all of the pixels included in the area represented by the filling area have been selected in step S415 (e.g., YES in step S423), the routine proceeds to step S431 (refer to FIG. 42).

Figure 42:
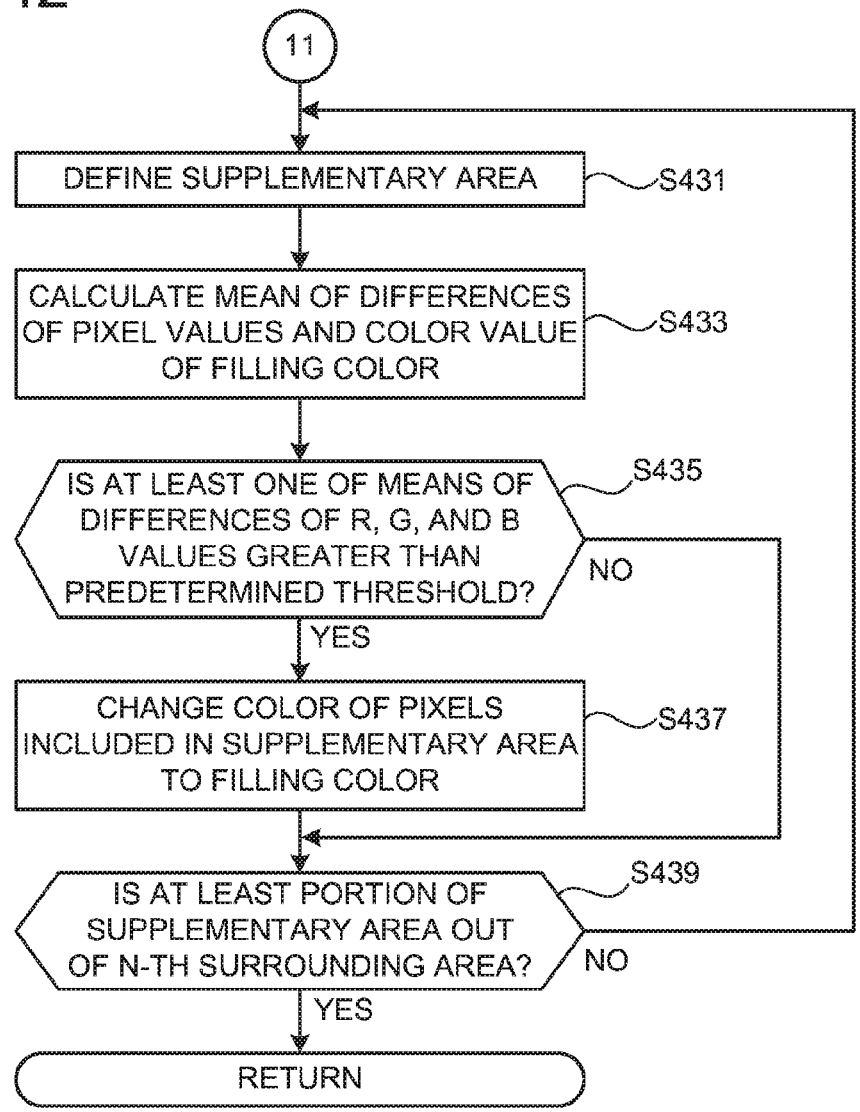
FIG. 42 is a continuation of the flowchart of FIG. 41 depicting the example of elimination processing in the illustrative embodiment according to one or more aspects of the disclosure.

As depicted in FIG. 42, the CPU 21 defines a supplementary area, which surrounds and adjoins to the filling area. A distance between an inner circumference and an outer circumference of the supplementary area has a width of one pixel (e.g., step S431). The CPU 21 calculates an absolute value for each pixel. The absolute value may be obtained by reduction of the R, G, and B values of the filling color stored in the fourth table 244 from the respective R, and B values of one of pixels included in the defined supplementary area of the original image. The CPU 21 calculates an average value (e.g., a mean) of differences of each of R, G, and B values, based on the obtained absolute values of the R, and B values (e.g., step S433). The CPU 21 determines whether at least one of the means of the differences of the R, and B values is greater than a predetermined threshold (e.g., step S435). When the CPU 21 determines that at least one of the means of the differences of the R, G, and B values is greater than the predetermined threshold (e.g., YES in step S435), the CPU 21 changes the color of the pixels included in the supplementary area to the filling color (e.g., step S437). Subsequent to step S437, the routine proceeds to step S439. When the CPU 21 determines that all of the means of the differences of the R, G, and B values are smaller than or equal to the predetermined threshold (e.g., NO in step S435), the routine proceeds to step S439.

Through steps S431 to S437, the CPU 21 determines the presence or absence of the necessity to change the color of the pixels included in the N-th ("N" is 3 or greater) surrounding area used in determination in the color determination processing (refer to FIGS. 36 and 37) to the filling color. When the CPU 21 determines that it is necessary to change the color, the color of the pixels included in the N-th surrounding area is changed to the filling color. With this processing, for example, as depicted in FIGS. 39 and 40, when an area surrounding the punched-hole image has color different from the ground color of the document, the CPU 21 changes both of the color of the pixels in the punched-hole image and the color of the pixels included in the area surrounding the punched-hole image, to the filling color.

When the CPU 21 determines, in step S353 (refer to FIGS. 37A and 37B), that the first difference is smaller than or equal to the second difference (e.g., NO in step S353), the CPU 21 determines whether at least a portion of the supplementary area is out of the fourth surrounding area (e.g., step S439). When the CPU 21 determines, in step S353 (refer to FIGS. 37A and 37B), that the first difference is greater than the second difference (e.g., YES in step S353), the CPU 21 determines whether at least a portion of the supplementary area is out of the N-th surrounding area (e.g., step S439). When the CPU 21 determines that the entire portion of the supplementary area is within one of the fourth surrounding area and the N-th surrounding area (e.g., NO in step S439), the routine returns to S431. The CPU 21 defines, as a new supplementary area, an area that surrounds and adjoins to the supplementary area and has a particular distance (e.g., a width of one pixel) between an inner circumference and an outer circumference of the area (e.g., step S431), and executes steps S433 to S437 on the new supplementary area. When the CPU 21 determines that at least a portion of the supplementary area is out of one of the fourth surrounding area and the N-th surrounding area (e.g., YES in step S439), the CPU 21 ends the elimination processing and the routine returns to the main processing (refer to FIGS. 5A and 5B).

Subsequent to the elimination processing (e.g., step S31), as depicted in FIGS. 5A and 5B, the CPU 21 determines whether all of the quadrangular area data stored in the fourth table 244 have been selected in step S27 (e.g., step S33). When the CPU 21 determines that there is quadrangular area data that has not been selected yet in step S27 remaining in the fourth table 244 (e.g., NO in step S33), the routine returns to step S27. The CPU 21 selects one of the one or more pieces of not-yet-selected quadrangular area data from the fourth table 244 (e.g., step S27) and executes steps S29 and S31 on the selected quadrangular area data. When the CPU 21 determines that all of the one or more pieces of quadrangular area data stored in the fourth table 244 have been selected in step S27 (e.g., YES in step S33), the CPU 21 ends the main processing.

Effects Obtained by Illustrative Embodiment

In the illustrative embodiment, the CPU 21 of the PC 2 generates a first image and a second image (e.g., steps S129 and S131) by binarization (e.g., steps S121 and S123) using two thresholds (e.g., a first threshold and a second threshold). The CPU 21 extracts a quadrangular area including an outline corresponding to a punched-hole image from each of the first image and the second image (e.g., steps S13 and S15). The CPU 21 determines an area corresponding to a punched hole based on the extracted quadrangular area corresponding to the first image and the extracted quadrangular area corresponding to the second image. The CPU 21 executes binarization using two different thresholds (e.g., the luminance values of "128" and "208"), thereby enabling determination of the quadrangular area corresponding to the punched hole in at least one of the first image and the second image even when the density of the punched-hole image has been changed or varied in the original image.

Binarization using the first threshold (e.g., the luminance value of "128") may enable detection of an image having an image density greater than or equal to a median value of a range of the image density, whereby the detected image may be included in the first image. Binarization using the second threshold (e.g., the luminance value of "208") may enable generation of the second image in which the shape of the punched hole appears more clearly. Therefore, even when the variation of the density of the punched-hole image is large, the CPU 21 may define a quadrangular area corresponding to a punched hole. For example, in a case that the density of the punched-hole image is smaller than the first threshold, the CPU 21 may include the punched-hole image in the second image through binarization using the second threshold. For example, in a case that a ground color of a document and a color of a background member are both white, an outline may appear faintly depending on the degree of shadow cast along an edge of a punched hole. Even in such a case, the CPU 21 may include the outline in the second image on which binarization using the second threshold has been executed. Therefore, the CPU 21 may detect the punched-hole image accurately even when the ground color and the color of the background member are both white.

In the illustrative embodiment, when the positional difference between a first quadrangular area defined in the first image and a second quadrangular area defined in the second image is relatively small (e.g., YES in step S313) and the size difference between the first quadrangular area and the second quadrangular area is relatively small (e.g., YES in step S319), the CPU 21 deletes the second quadrangular area data from the fourth table 244 to exclude the second quadrangular area data from targets of punched hole elimination. Thus, when the first quadrangular area and the second quadrangular area are located overlapping or adjacent to each other, the CPU 21 may avoid to duplicate the same processing (e.g., the punched hole elimination) on both of the first quadrangular area and the second quadrangular area. When the first quadrangular area and the second quadrangular area are located overlapping or adjacent to each other and have a similar size, the CPU 21 may also avoid to duplicate the same processing (e.g., the punched hole elimination) on both of the first quadrangular area and the second quadrangular area. In a case that the positions and sizes of the first quadrangular area and the second quadrangular area are relatively similar to each other, the punched-hole image may be made less obstructive even when the punched hole elimination is executed on only one of the first and second quadrangular areas.

In the illustrative embodiment, in the punched-hole image separation processing, the CPU 21 eliminates one or more pixels having a saturation value of "16" or greater from the pixels included in the partial image (e.g., step S93 or S101) to generate a second intermediate image. Therefore, even when an area corresponding to a punched hole includes a ground color of an original image and an object (not corresponding to the punched hole) having a bright color in the original image, the CPU 21 may generate the second intermediate image having no influence of the ground color and the object, thereby determining a quadrangular area corresponding to the punched hole accurately.

In the illustrative embodiment, the CPU 21 executes binarization (e.g., step S121 or S131) on the second intermediate image generated by elimination of the one or more pixels having a saturation value of "16" or greater from the pixels included in the partial image (e.g., step S93 or S101). Therefore, even when the area corresponding to the punched hole includes the ground color of the original image and the object (not corresponding to the punched hole) having a bright color in the original image, the CPU 21 may distinguish the punched-hole image from the other portions by binarization, thereby increasing accuracy of determination of the quadrangular area corresponding to the punched hole.

In the illustrative embodiment, the CPU 21 executes filtering using the Sobel filter on the first intermediate image and the second intermediate image (e.g., step S109) to emphasize edges in the first intermediate image and the second intermediate image. The CPU 21 executes binarization on the first intermediate image and the second intermediate image, of which edge has been emphasized (e.g., step S121, S131). The CPU 21 executes a logical AND operation on the first intermediate image and the second intermediate image (e.g., steps S129 and S139). Therefore, the CPU 21 may include the outline cast along the edge of the punched hole in both of the first image and the second image. Accordingly, accuracy of determination of the quadrangular area corresponding to the punched hole may be increased. Further, an object other than a punched hole included in the document may be reduced or prevented from being detected mistakenly as a punched hole.

In the illustrative embodiment, the CPU 21 may make an image of a punched hole less obstructive by changing the color of pixels included in a quadrangular area corresponding to an identified punched hole.

<Variations>

While the disclosure has been described in detail with reference to the specific embodiment thereof, this is merely an example, and various changes, arrangements and modifications may be applied therein without departing from the spirit and scope of the disclosure. According to the illustrative embodiment, in the punched-hole image separation processing (refer to FIGS. 13 and 14), the CPU 21 generates the first image by executing a logical AND operation on the first intermediate image and the second intermediate image, on both of which binarization has been executed using the first threshold (e.g., steps S121 to S129). The CPU 21 further generates the second image by executing a logical AND operation on the first intermediate image and the second intermediate image, on both of which binarization has been executed using the second threshold (e.g., steps S131 to S139). Nevertheless, in a variation of the illustrative embodiment, for example, the CPU 21 may execute steps S461 to S485 depicted in FIGS. 43A and 43B instead of steps S121 to S139 depicted in FIG. 14.

Figure 43A:
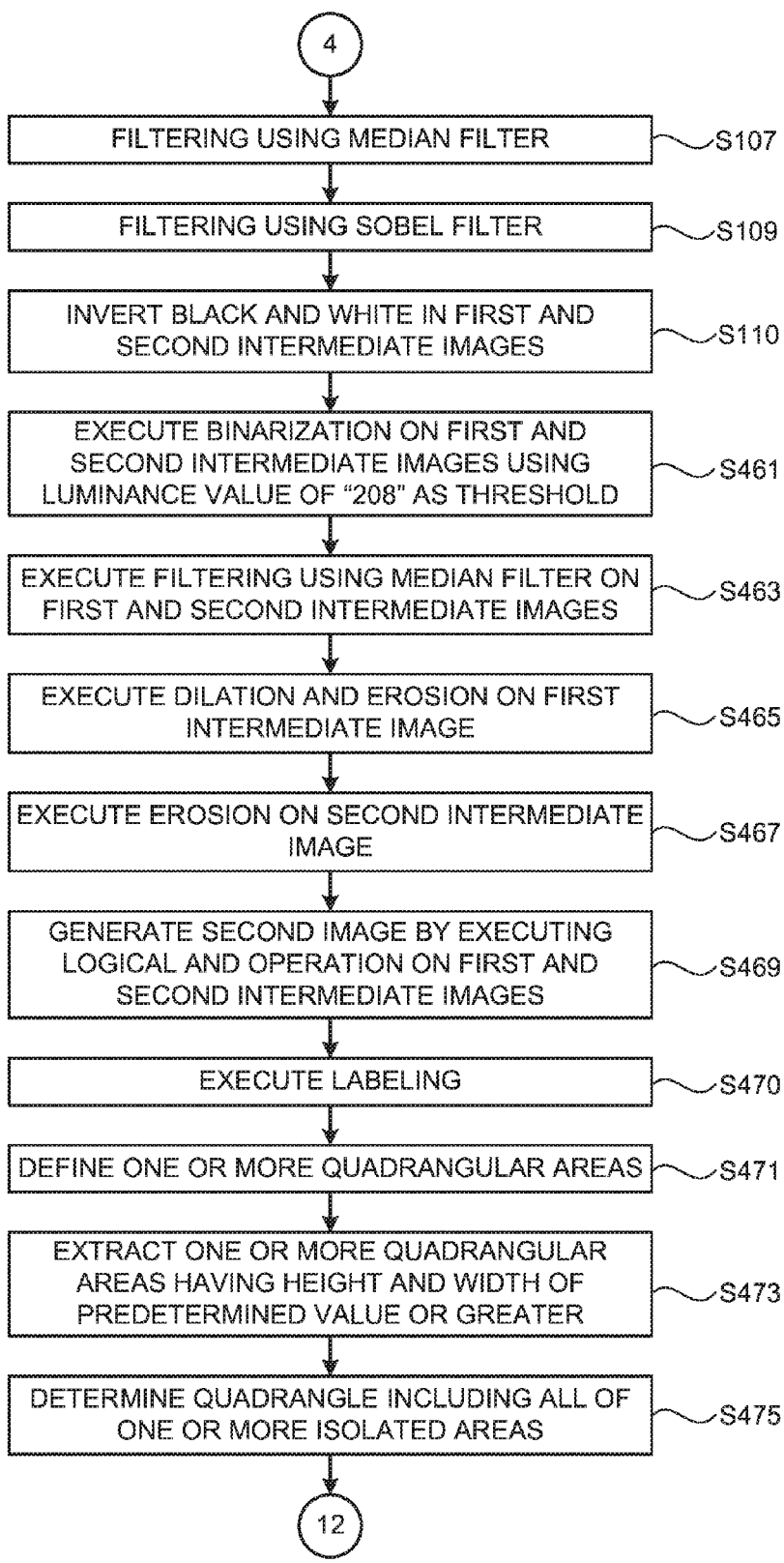

Referring to FIGS. 43A and 43B, the punched-hole image separation processing according to the variation will be described in detail. Subsequent to execution of black-and-white inversion in each of the first intermediate image and the second intermediate image (e.g., refer to step S110 in FIG. 43A), the CPU 21 executes binarization on each of the first and second intermediate images using the second threshold (e.g., the luminance value of "208") (e.g., step S461). Subsequent to step S461, the CPU 21 executes filtering using the median filter, on the first intermediate image and the second intermediate image, on both of which binarization has been executed (e.g., step S463). Subsequent to step S463, the CPU 21 executes dilation on the first intermediate image on which filtering has been executed in step S463 and then executes erosion on the first intermediate image on which dilation has been executed (e.g., step S465). Subsequent to step S465, the CPU 21 executes dilation on the second intermediate image on which filtering has been executed in step S463 (e.g., step S467). Subsequent to step S467, the CPU 21 executes a logical AND operation on the first intermediate image and the second intermediate image to generate a second image (e.g., step S469).

Subsequent step S469, the CPU 21 executes labeling on the second image (e.g., step S470). Subsequent to step S470, the CPU 21 determines a quadrangle circumscribing an isolated area extracted by labeling and defines a quadrangular area (e.g., step S471). When a plurality of isolated areas are extracted, a quadrangular area is defined for each of the isolated areas, whereby a plurality of quadrangular areas are defined. The CPU 21 extracts one or more quadrangular areas having a height and width of a predetermined value or greater, from the one or more defined quadrangular areas (e.g., step S473). For example, the predetermined value may be a value obtained by division of the minimum hole size in the setting information by "2" (e.g., "minimum hole size/2"). Subsequent to the extraction of at least one quadrangular area having a height and width of a predetermined value or greater, the CPU 21 determines a quadrangle including all of the one or more isolated areas corresponding to the one or more extracted quadrangular areas, respectively (e.g., step S475).

The CPU 21 executes binarization using the first threshold (e.g., the luminance value of "128") on an image included in the quadrangle determined in step S475 in each of the first intermediate image and the second intermediate image, on both of which black-and-white inversion has been executed in step S110 (e.g., step S477). Subsequent to step S477, the CPU 21 executes filtering using the median filter on both of the first intermediate image and the second intermediate image in which binarization has been executed on the quadrangle determined in step S475 (e.g., step S479). Subsequent to step S479, the CPU 21 executes dilation on the first intermediate image on which filtering has been executed in step S479 based on the image included in the quadrangle determined in step S475, and then executes erosion on the first intermediate image on which dilation has been executed (e.g., step S481). Subsequent to step S481, the CPU 21 executes dilation on the second intermediate image on which filtering has been executed in S479 based on the image included in the quadrangle determined in step S475 (e.g., step S483). The CPU 21 executes a logical AND operation on the first intermediate image and the second intermediate image generated based on the image included in the quadrangle determined in step S475, to generate a first image (e.g., step S485). Then, the CPU 21 ends the punched-hole image separation processing and the routine returns to the main processing (refer to FIGS. 5A and 5B).

In the variation, in one example, step S479 to S483 may be executed on the first intermediate image and the second intermediate image by batch. In another example, in step S485, the CPU 21 may extract the first intermediate image and the second intermediate image based on the quadrangle determined in step S475, and execute a logical AND operation on the first intermediate image and the second intermediate image.

In contrast to the illustrative embodiment, in the variation, the CPU 21 executes binarization using the second threshold (e.g., step S461) to generate a second image (e.g., step S469) prior to generation of a first image. Then, the CPU 21 determines the quadrangle including all of the one or more isolated areas included in the second image (e.g., step S475). Subsequent to step S475, the CPU 21 executes binarization using the first threshold (e.g., step S477) on the image included in the determined quadrangle to generate a first image in each of the first intermediate image and the second intermediate image (e.g., step S485). Therefore, an area subject to processing for generating a first image may be limited to the area included in the determined quadrangle, whereby reducing a processing load for generating the first image.

The second threshold may be farther from the color value of the first color and closer to the second color relative to the first threshold. That is, in the second image, the shape of the punched hole appears more clearly than the first image. Therefore, in the variation, the quadrangle is determined by generation of the second image which is executed prior to the generation of the first image, and then an area subject to processing when the first image is determined. Accordingly, the quadrangle including all of the one or more outlines corresponding to one or more punched-hole images may be determined.

In the punched-hole image separation processing (refer to FIGS. 13 and 14) according to the illustrative embodiment, the CPU 21 executes binarization on both of the first intermediate image and the second intermediate image using the first threshold that is the luminance value of "128" (e.g., step S121) and executes binarization on both of the first intermediate image and the second intermediate image using the second threshold that is the luminance value of "208" (e.g., step S131). Nevertheless, the thresholds used in each binarization are merely examples. In other embodiments, another value may be used as such thresholds. However, it may be preferable that the first threshold be a value close to the median value (e.g., "128") of the minimum luminance value (e.g., "0") and the maximum luminance value (e.g., "255").

In the determination processing (refer to FIG. 35) according to the illustrative embodiment, when both of the positional difference and the size difference between the first quadrangular area and the second quadrangular area are smaller than the respective predetermined thresholds, the CPU 21 deletes the second quadrangular area data from the fourth table 244 to exclude the second quadrangular area data from the targets of punched hole elimination. Nevertheless, in other embodiments, for example, when one of the positional difference and the size difference between the first quadrangular area and the second quadrangular area is smaller than a corresponding predetermined threshold, the CPU 21 may delete the second quadrangular area data from the fourth table 244 to exclude the second quadrangular area data from the targets of punched hole elimination. In still other embodiments, instead of deleting the second quadrangular area data from the fourth table 244, the CPU 21 may delete the first quadrangular area data from the fourth table 244 to exclude the first quadrangular area data from the targets of punched hole elimination. In yet other embodiments, both of the first quadrangular area and the second quadrangular area may be determined as targets for punched hole elimination.

In the punched-hole image separation processing according to the illustrative embodiment, the CPU 21 eliminates any pixel having a saturation value of "16" or greater from the pixels included in the selected partial image (e.g., step S93, S101) to generate a second intermediate image. Nevertheless, in other embodiments, for example, the CPU 21 may use another saturation value other than "16" as the threshold and may eliminate any pixel having a saturation value that is greater than or equal to the threshold. In still other embodiments, the CPU 21 may execute the pixel elimination based on a luminance value during generation of a second intermediate image, instead of using the saturation value.

In the illustrative embodiment, the CPU 21 executes filtering using the Sobel filter on both of the first intermediate image and the second intermediate image (e.g., step S109) to emphasize an edge in each of the first intermediate image and the second intermediate image. Nevertheless, in other embodiments, for example, the CPU 21 may execute filtering using another filter in which an edge may be extracted in each of the first intermediate image and the second intermediate image, instead of using the Sobel filter. In still other embodiments, the CPU 21 may execute filtering using the Sobel filter only when the CPU 21 generates a first intermediate image and a second intermediate image which are to be used for generating a first image. The CPU 21 might not necessarily execute filtering using the Sobel filter when the CPU 21 generates a first intermediate image and a second intermediate image which are to be used for generating a second image. In yet other embodiments, the CPU 21 may generate a first image and a second image by executing binarization on the first intermediate image and the second intermediate image, on both of which filtering using the Sobel filter has not been executed.

In other embodiments, for example, in step S319, when the CPU 21 determines that the size difference between the first quadrangular area and the second quadrangular area is greater than the respective predetermined thresholds (e.g., NO in step S319), the CPU 21 may delete the quadrangular area data and the candidate area data corresponding to each of the first quadrangular area and the second quadrangular area from the fourth table 244. When the size difference between the first quadrangular area and the second quadrangular area that are located overlapping or adjacent to each other is greater than the predetermined threshold, there is a higher possibility that the image included in the first quadrangular area and the image included in the second quadrangular area might not be to a punched-hole image. Therefore, the CPU 21 determines, as a non-target of punched hole elimination, that the first quadrangular area and the second quadrangular area that are located overlapping or adjacent to each other and whose size difference is greater than the predetermined threshold. Accordingly, any mistaken deletion of an object other than a punched hole may be reduced.

What is claimed is:

1. A non-transitory computer readable storage medium storing computer-readable instructions, when executed by processor of an image processing device, causing the image processing device to perform processes comprising:

obtaining specific image data representing an original image;

generating partial image data from the specific image data;

executing binarization on a first portion of the partial image data using a first threshold and generating first image data from the binarized first portion of the partial image data;

executing binarization on a second portion of the partial image data using a second threshold and generating second image data from the binarized second portion of the partial image data, the second threshold being different from the first threshold;

a first extraction process of extracting a first area from the first image, the first area including pixels with a first color, the first color corresponding to a color of an outline of a punched-hole image in the specific image;

a second extraction process of extracting a second area from the second image, the second area including pixels with the first color; and a first determination process of determining at least one of the first area and the second area as a specific area corresponding to the punched-hole image, wherein the instructions further causing the image processing device to perform processes comprising:

generating a first intermediate image data representing a first intermediate image when the original image is in color, the first intermediate image being a grayscale image converted from the first portion of the partial image data; and generating a second intermediate image data representing a second intermediate image by excluding one or more pixels having a saturation value equal to or greater than a fifth threshold from the first portion of the partial image data, wherein executing binarization on the first portion of the partial image data further comprises:

a first binarization process of binarizing the first and second intermediate image data with the first threshold; and a first logical AND process of executing a logical AND operation on the first intermediate image data binarized by the first binarization process and the second intermediate image data binarized by the first binarization process to generate the first image data.

2. The non-transitory computer readable medium according to claim 1, wherein the first threshold corresponds to a median value of a luminance range of the specific image, and wherein a difference between the second threshold and the first color is greater than a difference between the first threshold and the first color.

3. The non-transitory computer readable medium according to claim 1, wherein the instructions further causes the image processing device to perform processes comprising:

a first specifying process of specifying one or more isolated areas from the second image, the isolated area being a group of pixels with the first color, wherein the first image data representing corresponds to an area including the one or more isolated areas.

4. The non-transitory computer readable medium according to claim 1, wherein the instructions further causes the image processing device to perform processes comprising:

a second specifying process of specifying a pair of the first area and the second area, an amount of a positional difference between the first area and the second area in the pair being smaller than a third threshold; wherein the first determination process comprises determining the one of the first area and the second area in the pair as the specific area.

5. The non-transitory computer readable medium according to claim 1, wherein the instructions further causes the image processing device to perform processes comprising:

a second specifying process of specifying a pair of the first area and the second area, an amount of a positional difference between the first area and the second area in the pair being smaller than a third threshold; and a second determination process of determining whether an amount of a size difference between the first area and the second area in the pair is smaller than or equal to a fourth threshold; wherein when the second determination process determining that the size difference is smaller than or equal to the fourth threshold, the first determination process comprises determining, the one of the first area and the second area in the pair as the specific area, and wherein when the second determination process determining that the size difference is not smaller than or equal to the fourth threshold, the first determination process comprises determining both the one of the first area and the second area and the other one of the first area and the second area in the pair as the specific area.

6. The non-transitory computer readable medium according to claim 1, wherein executing binarization on the second portion of the partial image data further comprises:

a second binarization process of binarizing the first and second intermediate image data with the second threshold; and a second logical AND process of executing a logical AND operation on the first intermediate image data binarized by the second binarization process and the second intermediate image data binarized by the second binarization process to generate the second image, the second portion of the partial image data coinciding with the first portion of the partial image data.

7. The non-transitory computer readable medium according to claim 1, wherein the instructions further causes the image processing device to perform processes comprising:

an edge enhancement process of filtering the first and second intermediate image data using an edge enhancement filter, wherein the first binarization process further comprises binarizing the first and second intermediate image data, which are filtered by the edge enhancement process, with the first threshold.

8. The non-transitory computer readable medium according to claim 1, wherein the instructions further causes the image processing device to perform processes comprising:

a dilation process of filtering the first and second intermediate image data using a dilation filter; and an erosion process of filtering the first intermediate image data using an erosion filter without filtering the second intermediate image data using the erosion filter, wherein the first logical AND process further comprises executing the logical AND operation on the first intermediate image data, which is binarized by the first binarization process and filtered by the dilation process and the erosion process, and the second intermediate image data, which is binarized by the first binarization process and filtered by the dilation process, to generate the first image data.

9. The non-transitory computer readable medium according to claim 1, wherein the instructions further causes the image processing device to perform processes comprising:

a filling process of filling specific pixels in the original image with a filling color, the specific pixels being included in an area corresponding to the specific area.

10. An image processing device comprising:

a processor; and a storage storing computer-readable instructions, when executed by the processor, causing the image processing device to perform processes comprising:

obtaining specific image data representing an original image;

generating partial image data from the specific image data;

executing binarization on a first portion of the partial image data using a first threshold and generating firsts image data from the binarized first portion of the partial image data;

executing binarization on a second portion of the partial image data using a second threshold and generating second image data from the binarized second portion of the partial image data, the second threshold being different from the first threshold;

a first extraction process of extracting a first area from the first image, the first area including pixels with a first color value, the first color corresponding to a color of an outline of a punched-hole image in the specific image;

a second extraction process of extracting a second area from the second image, the second area including pixels with the first color; and a first determination process of determining at least one of the first area and the second area as a specific area corresponding to the punched-hole image wherein the instructions further causing the image processing device to perform processes comprising:

generating a first intermediate image data representing a first intermediate image when the original image is in color, the first intermediate image being a grayscale image converted from the first portion of the partial image data; and generating a second intermediate image data representing a second intermediate image by excluding one or more pixels having a saturation value equal to or greater than a fifth threshold from the first portion of the partial image data, wherein executing binarization on the first portion of the partial image data further comprises:
    a first binarization process of binarizing the first and second intermediate image data with the first threshold; and
    a first logical AND process of executing a logical AND operation on the first intermediate image data binarized by the first binarization process and the second intermediate image data binarized by the first binarization process to generate the first image data.

11. An image processing method comprising:
obtaining specific image data representing an original image;
generating partial image data from the specific image data;
executing binarization on a first portion of the partial image data using a first threshold and generating first image data from the binarized first portion of the partial image data;
executing binarization on a second portion of the partial image data using a second threshold and generating second image data from the binarized second portion of the partial image data, the second threshold being different from the first threshold;

a first extraction step of extracting a first area from the first image, the first area including pixels with a first color, the first color corresponding to a color of an outline of a punched-hole image in the specific image;
a second extraction step of extracting a second area from the second image, the second area including pixels with the first color; and
a first determination step of determining at least one of the first area and the second area as a specific area corresponding to the punched-hole image,
wherein the method further comprises:
generating a first intermediate image data representing a first intermediate image when the original image is in color, the first intermediate image being a grayscale image converted from the first portion of the partial image data; and
generating a second intermediate image data representing a second intermediate image by excluding one or more pixels having a saturation value equal to or greater than a fifth threshold from the first portion of the partial image data,
wherein executing binarization on the first portion of the partial image data further comprises:
    a first binarization process of binarizing the first and second intermediate image data with the first threshold; and
    a first logical AND process of executing a logical AND operation on the first intermediate image data binarized by the first binarization process and the second intermediate image data binarized by the first binarization process to generate the first image data.

\* \* \* \* \*